US011890732B2

(12) United States Patent
Morijiri et al.

(10) Patent No.: US 11,890,732 B2
(45) Date of Patent: Feb. 6, 2024

(54) BINDING MACHINE

(71) Applicant: MAX CO., LTD., Tokyo (JP)

(72) Inventors: Takeshi Morijiri, Tokyo (JP); Nobutaka Tashima, Tokyo (JP); Shinpei Sugihara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 390 days.

(21) Appl. No.: 17/273,779

(22) PCT Filed: Sep. 5, 2019

(86) PCT No.: PCT/JP2019/035086
§ 371 (c)(1),
(2) Date: Mar. 5, 2021

(87) PCT Pub. No.: WO2020/050382
PCT Pub. Date: Mar. 12, 2020

(65) Prior Publication Data

US 2021/0316428 A1 Oct. 14, 2021

(30) Foreign Application Priority Data

Sep. 7, 2018 (JP) ................................ 2018-168247

(51) Int. Cl.
*B25B 25/00* (2006.01)
*B65B 13/04* (2006.01)
(Continued)

(52) U.S. Cl.
CPC .............. *B25B 25/00* (2013.01); *B65B 13/04* (2013.01); *B65B 13/28* (2013.01); *B65B 13/285* (2013.01); *E04G 21/123* (2013.01)

(58) Field of Classification Search
CPC .......... B21F 15/00; B21F 15/02; B21F 15/04; B65B 13/22; B65B 13/28; B65B 13/285; B65B 13/025; B25B 25/00; E04G 21/123
See application file for complete search history.

(56) References Cited

U.S. PATENT DOCUMENTS 1,641,822 A 9/1927 Mattson
5,694,983 A 12/1997 Kusakari et al.
(Continued)

FOREIGN PATENT DOCUMENTS

CL 2017003252 A1 6/2018
CL 2017003253 A1 6/2018
(Continued)

OTHER PUBLICATIONS

Okuda, translation of JP-06156420-A (JPH06156420) (Year: 1994).*
(Continued)

*Primary Examiner* — Adam J Eiseman
*Assistant Examiner* — Bobby Yeonjin Kim
(74) *Attorney, Agent, or Firm* — Banner & Witcoff, Ltd.

(57) ABSTRACT

A binding machine includes a body part, a feeding unit configured to feed a wire, a first guide and a second guide extending in a first direction from an end portion on one side of the body part, arranged with an interval, in which a binding object is inserted, in a second direction orthogonal to the first direction, and configured to guide the wire fed by the feeding unit, a twisting unit configured to twist the wire guided by the first guide and the second guide, and a guide moving part configured to change the interval from a first distance to a second distance shorter than the first distance.

12 Claims, 30 Drawing Sheets

(51) Int. Cl.

| | |
|---|---|
| ***B65B 13/28*** | (2006.01) |
| ***E04G 21/02*** | (2006.01) |
| ***E04G 21/12*** | (2006.01) |

(56) References Cited

U.S. PATENT DOCUMENTS

| | | | | |
|---|---|---|---|---|
| 5,944,064 | A | 8/1999 | Saito et al. | |
| 6,401,766 | B1 | 6/2002 | Ishikawa et al. | |
| 2010/0147411 | A1 | 6/2010 | Kusakari et al. | |
| 2011/0155277 | A1 | 6/2011 | Coles et al. | |
| 2014/0246114 | A1 | 9/2014 | Kusakari et al. | |
| 2015/0267423 | A1 | 9/2015 | Kusakari et al. | |
| 2016/0222683 | A1 | 8/2016 | Kusakari et al. | |
| 2017/0145704 | A1 | 5/2017 | Coles et al. | |
| 2017/0218631 | A1* | 8/2017 | Matsuno | B21F 15/04 |
| 2018/0148943 | A1 | 5/2018 | Itagaki et al. | |
| 2018/0155940 | A1 | 6/2018 | Nagaoka et al. | |
| 2018/0161848 | A1 | 6/2018 | Itagaki et al. | |
| 2018/0363309 | A1 | 12/2018 | Kusakari et al. | |
| 2019/0093374 | A1 | 3/2019 | Machida et al. | |
| 2019/0203486 | A1 | 7/2019 | Coles et al. | |
| 2020/0149279 | A1 | 5/2020 | Matsuno | |
| 2020/0378140 | A1 | 12/2020 | Itagaki et al. | |
| 2020/0399914 | A1 | 12/2020 | Nagaoka et al. | |
| 2021/0114080 | A1 | 4/2021 | Itagaki et al. | |
| 2021/0138527 | A1 | 5/2021 | Itagaki et al. | |
| 2021/0197248 | A1 | 7/2021 | Morijiri et al. | |
| 2021/0237143 | A1 | 8/2021 | Morijiri et al. | |
| 2021/0316428 | A1 | 10/2021 | Morijiri et al. | |
| 2021/0317671 | A1 | 10/2021 | Morijiri et al. | |
| 2021/0339896 | A1 | 11/2021 | Morijiri et al. | |
| 2021/0340781 | A1 | 11/2021 | Morijiri et al. | |
| 2021/0396028 | A1 | 12/2021 | Morijiri et al. | |

FOREIGN PATENT DOCUMENTS

| | | | | | |
|---|---|---|---|---|---|
| CL | 2017003254 | A1 | | 6/2018 | |
| CL | 2021000561 | A1 | | 9/2021 | |
| CN | 101300395 | A | | 11/2008 | |
| CN | 107031891 | A | | 8/2017 | |
| CN | 107366431 | A | | 11/2017 | |
| JP | 06156420 | A | * | 6/1994 | B65B 13/28 |
| JP | H06-156420 | A | | 6/1994 | |
| JP | 07275983 | A | * | 10/1995 | E04G 21/123 |
| JP | H07-275983 | A | | 10/1995 | |
| JP | H08-246675 | A | | 9/1996 | |
| JP | 2001-140471 | A | | 5/2001 | |
| JP | 5182212 | B2 | | 4/2013 | |
| SU | 311515 | A1 | | 12/1977 | |
| TW | 312672 | B | | 8/1997 | |
| WO | 84-04772 | A1 | | 12/1984 | |
| WO | WO-8404772 | A1 | * | 12/1984 | E04G 21/123 |
| WO | 2017-199858 | A1 | | 11/2017 | |
| WO | WO-2018131218 | A1 | * | 7/2018 | B65B 13/28 |

OTHER PUBLICATIONS

Toyoda, translation of JP-07275983-A (JPH07275983) (Year: 1995).*

Runkel, Translation of WO-8404772 (Year: 1984).*

Machida, Translation of WO-2018131218 (Year: 2018).*

International Search Report issued in Application No. PCT/JP2019/035086 dated Nov. 19, 2019, 3 pages.

Written Opinion issued in Application No. PCT/JP2019/035086 dated Nov. 19, 2019, 6 pages.

Russian Office Action for Russian Application No. 2021105652 dated Nov. 23, 2022. (6 pp.).

Chilean Office Action dated Feb. 10, 2022, issued in the corresponding Chilean Patent No. CL-OA 00560-2021. (15 pages).

Extended European Search Report for European Application No. 19857299.2 dated May 6, 2022. (7 pp.).

* cited by examiner

BINDING MACHINE

CROSS REFERENCE TO RELATED APPLICATION

This application is a 35 U.S.C. 371 National Phase Entry Application from PCT/JP2019/035086, filed Sep. 5, 2019, which claims priority to Japanese Patent Application No. 2018-168247, filed Sep. 7, 2018, the disclosures of which are incorporated herein in their entirety by reference, and priority is claimed to each of the foregoing.

TECHNICAL FIELD

The present disclosure relates to a binding machine configured to bind a binding object such as a reinforcing bar and the like with a wire.

BACKGROUND ART

In the related art, suggested is a binding machine referred to as a reinforcing bar binding machine configured to wind a wire fed from a wire feed device into a loop shape around reinforcing bars, and to grip and twist the wire by a twisting hook, thereby tightening and binding the reinforcing bars with the wire (for example, refer to PTL 1).

In the reinforcing bar binding machine disclosed in PTL 1, a curl guide configured to curl the wire fed from a wire reel and to feed the wire downward, and a lower curl guide configured to again guide the wire fed by the curl guide so as to return to a predetermined position of the upper curl guide are arranged protruding forward from a binding machine body. The lower curl guide is rotatably provided to the binding machine body via a support shaft, and a tip end-side of the lower curl guide is urged upward.

CITATION LIST

Patent Literature

[PTL 1] Japanese Patent No. 5,182,212

SUMMARY OF INVENTION

Technical Problem

In the reinforcing bar binding machine disclosed in PTL 1, the lower curl guide is urged so that the tip end-side rotates upward, and an interval between the curl guide and the lower curl guide is defined. The curl guide and the lower curl guide may not be seen depending on a direction of the reinforcing bar binding machine. In this case, when the interval between the curl guide and the lower curl guide is defined, it is difficult to insert the reinforcing bars between the curl guide and the lower curl guide.

The present disclosure has been made in view of the above situations, and an object thereof is to provide a binding machine configured so that reinforcing bars can be easily inserted between a pair of guides.

Solution to Problem

In order to achieve the above object, a binding machine of the present disclosure includes a body part; a feeding unit configured to feed a wire; a first guide and a second guide extending in a first direction from an end portion on one side of the body part, arranged with an interval, in which a binding object is inserted, in a second direction orthogonal to the first direction, and configured to guide the wire fed by the feeding unit; a twisting unit configured to twist the wire guided by the first guide and the second guide; and a guide moving part configured to change the interval between the first guide and the second guide in the second direction from a first distance to a second distance shorter than the first distance.

In the binding machine, the binding object is inserted between the first guide and the second guide in a state where the interval between the first guide and the second guide in the second direction is set to the first distance greater than the second distance. The interval between the first guide and the second guide in the second direction is then changed from the first distance to the second distance shorter than the first distance.

Advantageous Effects of Invention

According to the binding machine of the present disclosure, the binding object can be inserted between the first guide and the second guide in the state where the interval between the first guide and the second guide in the second direction is set to the first distance greater than the second distance. Thereby, the binding object can be easily inserted between the pair of guides.

DESCRIPTION OF EMBODIMENTS

Hereinbelow, examples of the reinforcing bar binding machine as embodiments of the binding machine of the present invention will be described with reference to the drawings.

Example of Reinforcing Bar Binding Machine of First Embodiment

Figure 1:
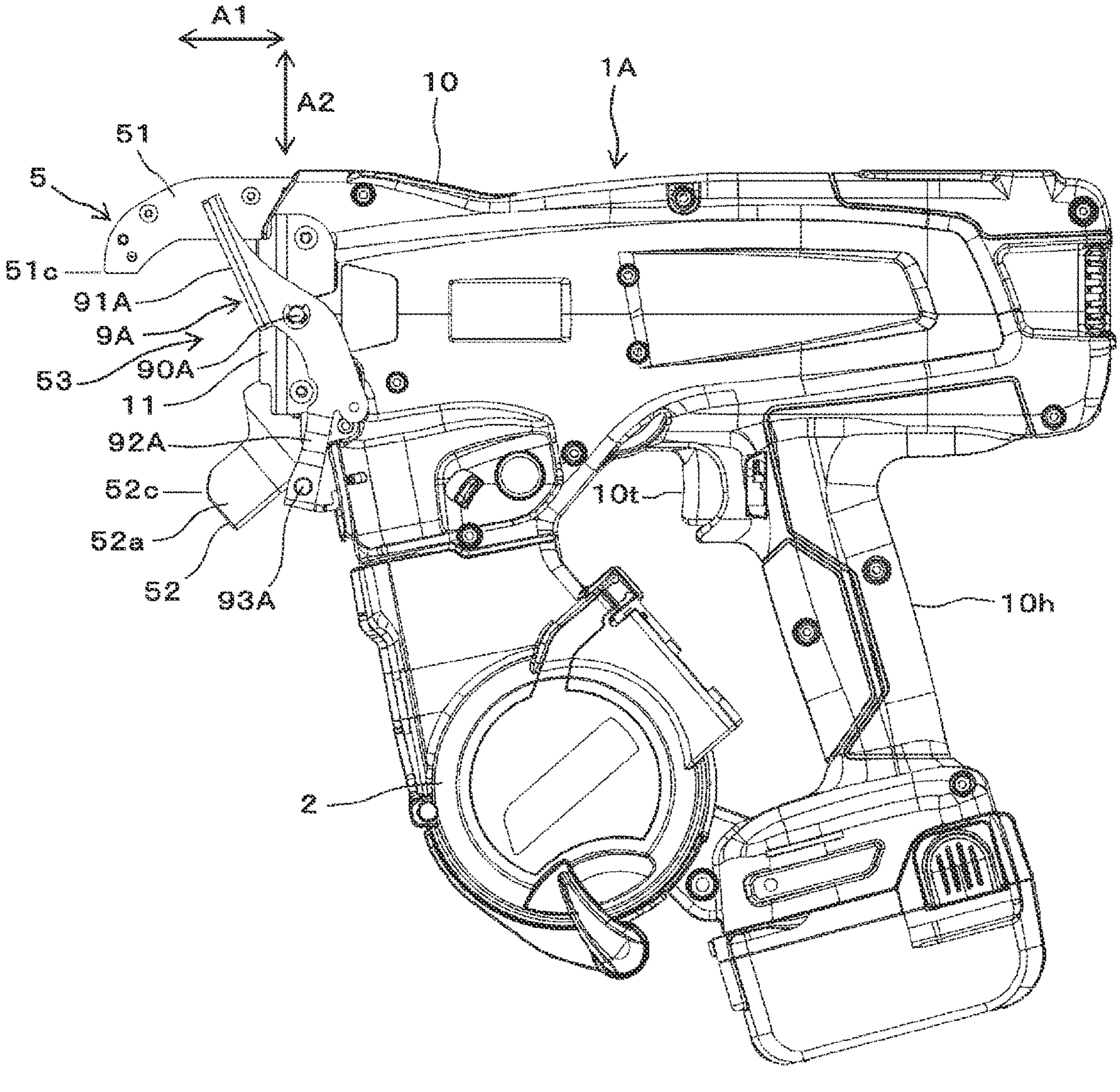
FIG. 1 is a side view depicting an example of an overall configuration of a reinforcing bar binding machine of a first embodiment.
Figure 2:
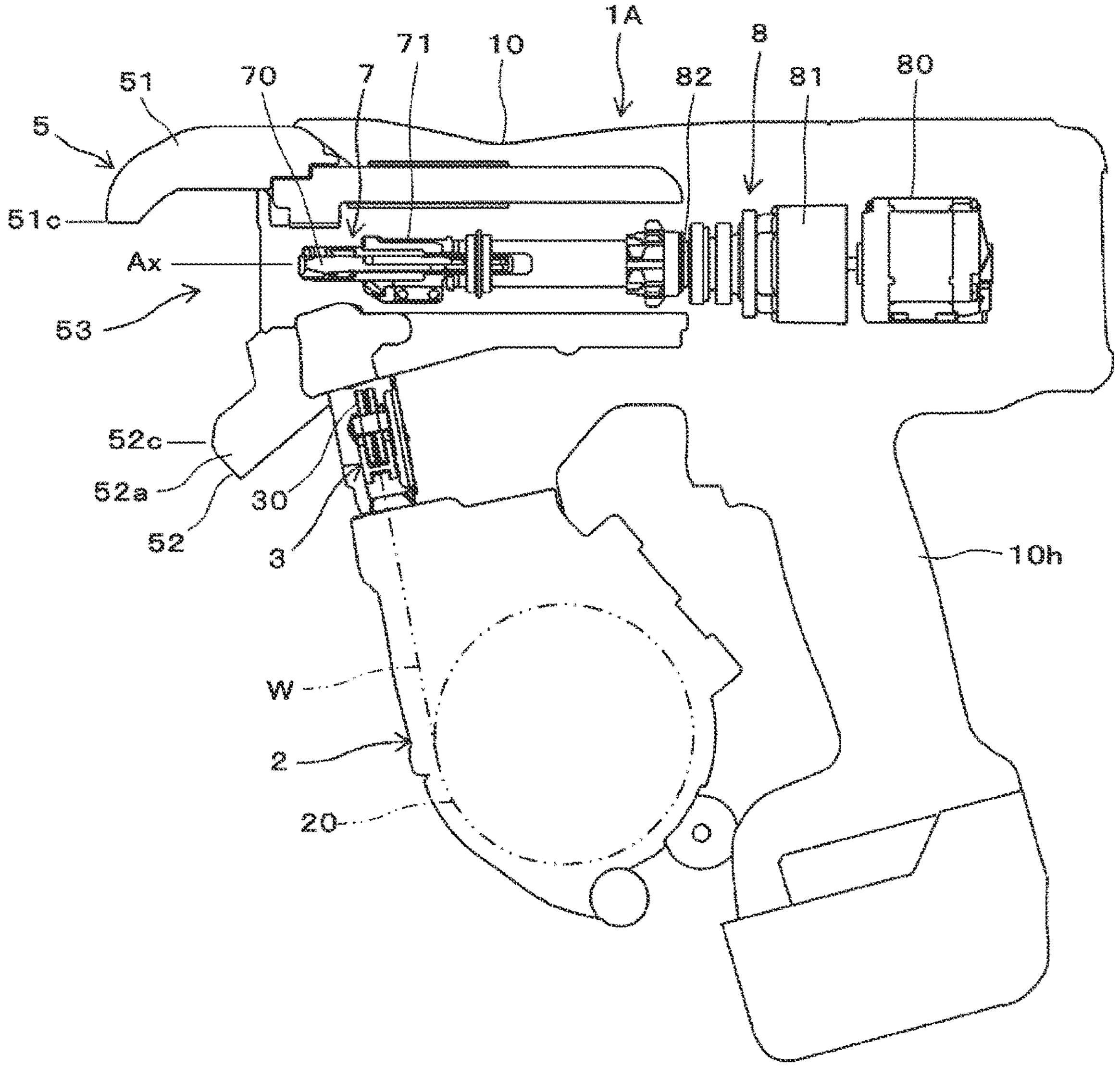
FIG. 2 is a side view depicting an example of an internal configuration of the reinforcing bar binding machine of the first embodiment.
Figure 3:
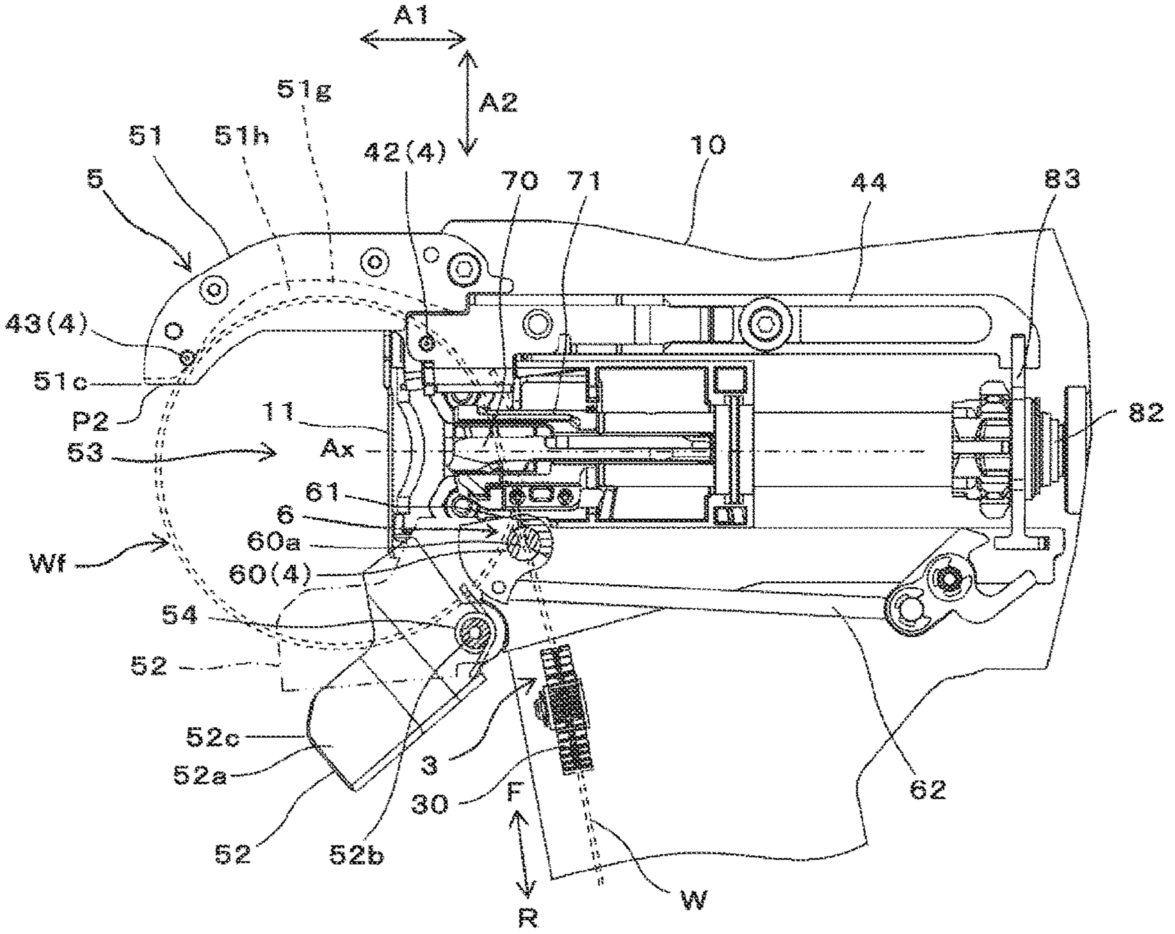
FIG. 3 is a side view depicting main parts of the internal configuration of the reinforcing bar binding machine of the first embodiment.

FIG. 1 is a side view depicting an example of an overall configuration of a reinforcing bar binding machine of a first embodiment, FIG. 2 is a side view depicting an example of an internal configuration of the reinforcing bar binding machine of the first embodiment, and FIG. 3 is a side view depicting main parts of the internal configuration of the reinforcing bar binding machine of the first embodiment.

A reinforcing bar binding machine 1A of the first embodiment includes an accommodation part 2 configured to rotatably accommodate a wire reel 20 on which a wire W is wound, and a feeding unit 3 configured to feed the wire W wound on the wire reel 20 accommodated in the accommodation part 2. The reinforcing bar binding machine 1A also includes a regulation part 4 configured to curl the wire W fed by the feeding unit 3, and a guide part 5 configured to guide the wire W curled by the regulation part 4. The reinforcing bar binding machine 1A also includes a cutting unit 6 configured to cut the wire W, a twisting unit 7 configured to twist the wire W, and a drive unit 8 configured to drive the cutting unit 6, the twisting unit 7, and the like.

In the reinforcing bar binding machine 1A, the guide part 5 is provided on one side of a body part 10. In the present embodiment, the side on which the guide part 5 is provided is defined as the front. In the reinforcing bar binding machine 1A, a handle part 10*h* is provided protruding from the body part 10, and a trigger 10*t* for receiving an operation of actuating the reinforcing bar binding machine 1A is provided on a front side of the handle part 10*h*.

The accommodation part 2 is configured so that the wire reel 20 can be attached/detached and supported. The feeding unit 3 has a pair of feeding gears 30 as a feeding member. When a motor (not shown) rotates the feeding gears 30 in a state where the wire W is sandwiched between the pair of feeding gears 30, the feeding unit 3 feeds the wire W. The feeding unit 3 can feed the wire W in a forward direction denoted with an arrow F and in a reverse direction denoted with an arrow R, according to a rotating direction of the feeding gears 30.

The cutting unit 6 is provided downstream of the feeding unit 3 with respect to the feeding of the wire W in the forward direction denoted with the arrow F. The cutting unit 6 has a fixed blade part 60, and a movable blade part 61 configured to cut the wire W in cooperation with the fixed blade part 60. The cutting unit 6 also has a transmission mechanism 62 configured to transmit motion of the drive unit 8 to the movable blade part 61.

The fixed blade part 60 has an opening 60*a* through which the wire W passes. The movable blade part 61 is configured to cut the wire W passing through the opening 60*a* of the fixed blade part 60 by a rotating operation about the fixed blade part 60 as a support point.

The regulation part 4 has a first regulation member to a third regulation member in contact with the wire W at a plurality of parts, in the present example, at least three places in a feeding direction of the wire W fed by the feeding unit 3, thereby curling the wire W along a feeding path Wf of the wire W shown with the broken line in FIG. 3.

The first regulation member of the regulation part 4 is constituted by the fixed blade part 60. The regulation part 4 also has a regulation member 42 as the second regulation member provided downstream of the fixed blade part 60 with respect to the feeding of the wire W in the forward direction denoted with the arrow F, and a regulation member 43 as the third regulation member provided downstream of the regulation member 42. The regulation member 42 and the regulation member 43 are each constituted by a cylindrical member, and the wire W is in contact with outer peripheral surfaces thereof.

In the regulation part 4, the fixed blade part 60, the regulation member 42 and the regulation member 43 are arranged on a curve in conformity to the spiral feeding path Wf of the wire W. The opening 60*a* of the fixed blade part 60 through which the wire W passes is provided on the feeding path Wf of the wire W. The regulation member 42 is provided on a diametrically inner side with respect to the feeding path Wf of the wire W. The regulation member 43 is provided on a diametrically outer side with respect to the feeding path Wf of the wire W.

Thereby, the wire W fed by the feeding unit 3 passes in contact with the fixed blade part 60, the regulation member 42 and the regulation member 43, so that the wire W is curled to follow the feeding path Wf of the wire W.

The regulation part 4 has a transmission mechanism 44 configured to transmit motion of the drive unit 8 to the regulation member 42. In operations of feeding the wire Win the forward direction by the feeding unit 3 and curling the wire W, the regulation member 42 is configured to move to a position at which it contacts the wire W, and in operations of feeding the wire W in the reverse direction and winding the wire W on the reinforcing bars S, the regulation member 42 is configured to move to a position at which it does not contact the wire W.

Figure 4A:
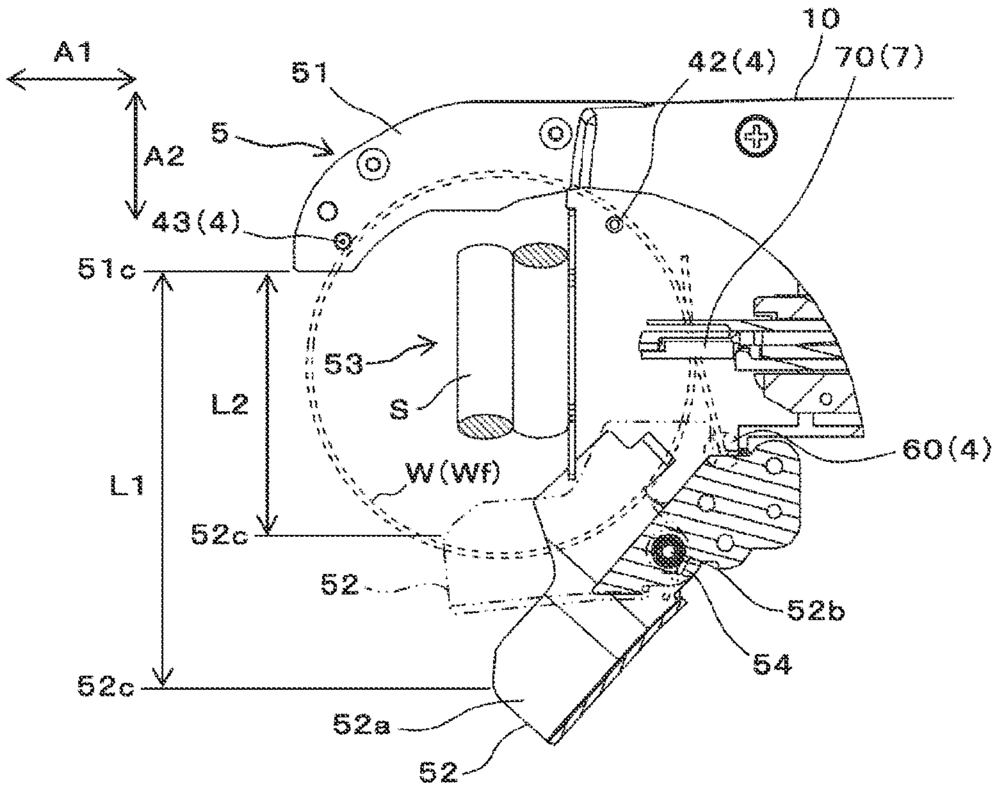
FIG. 4A is a side view depicting an example of a guide part.
Figure 4B:
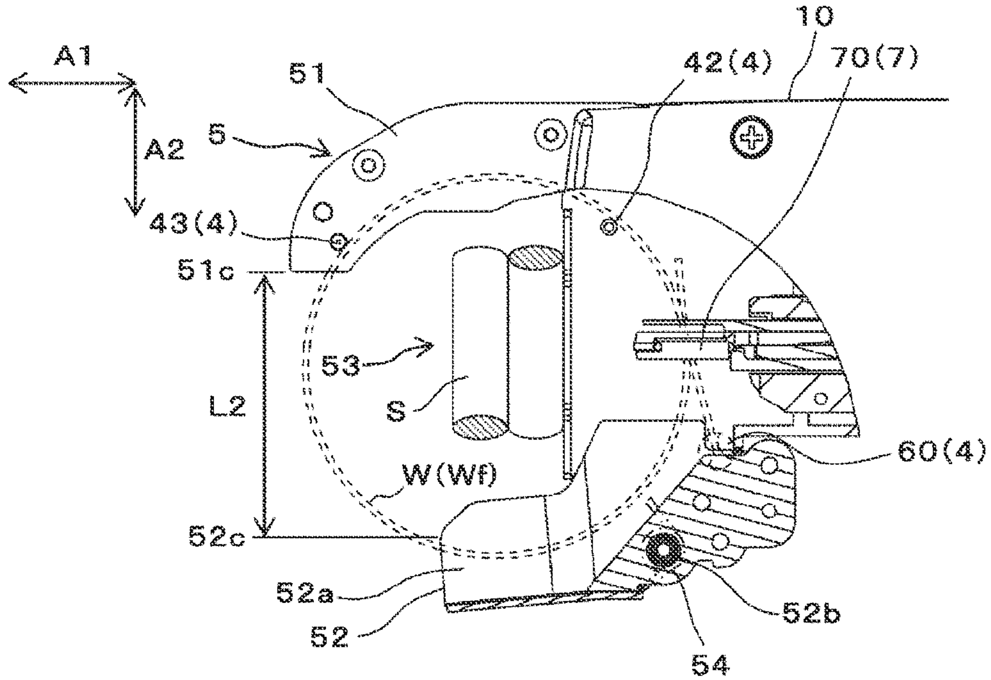
FIG. 4B is a side view depicting the example of the guide part.
Figure 5:
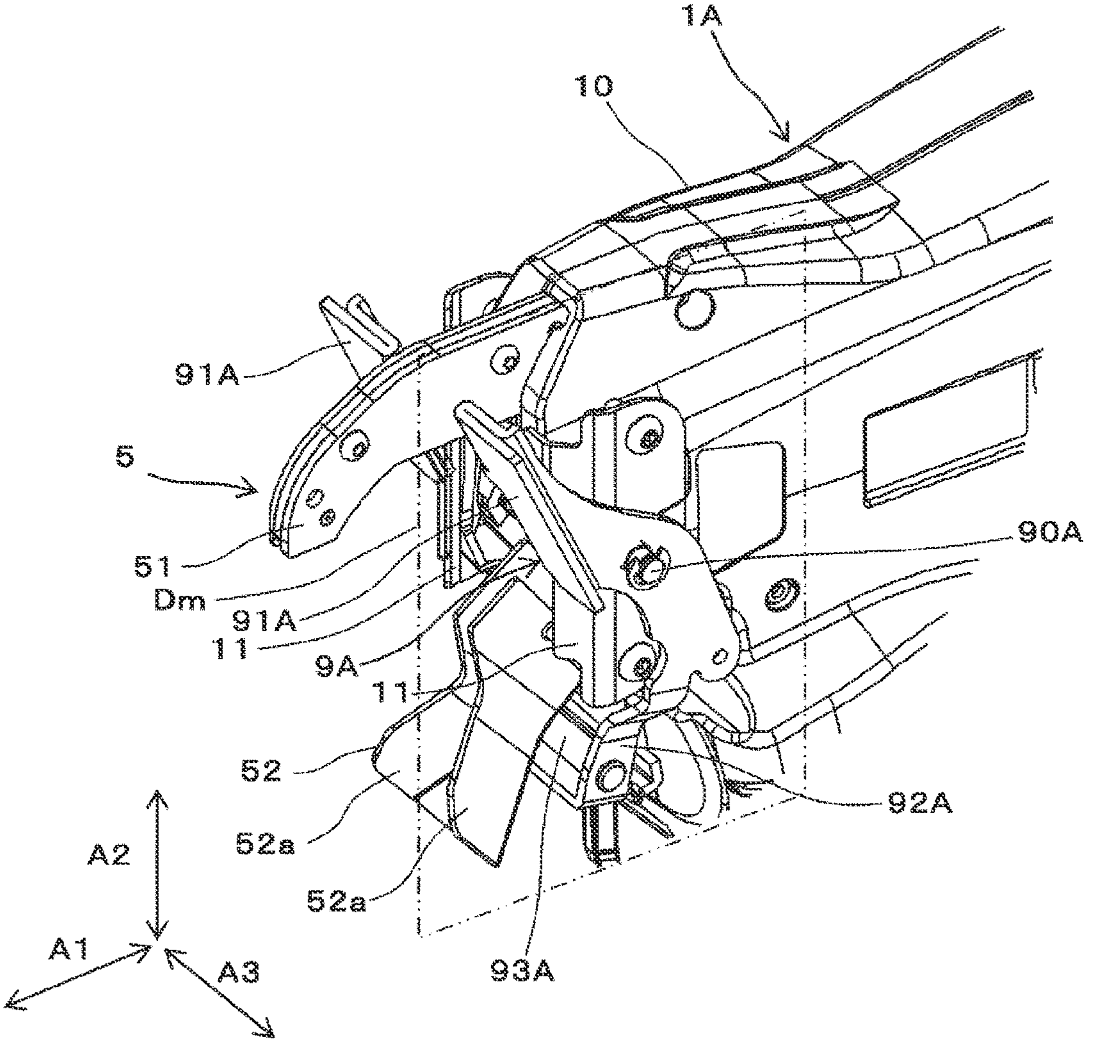
FIG. 5 is a perspective view depicting an example of the guide part and a contact member.
Figure 6A:
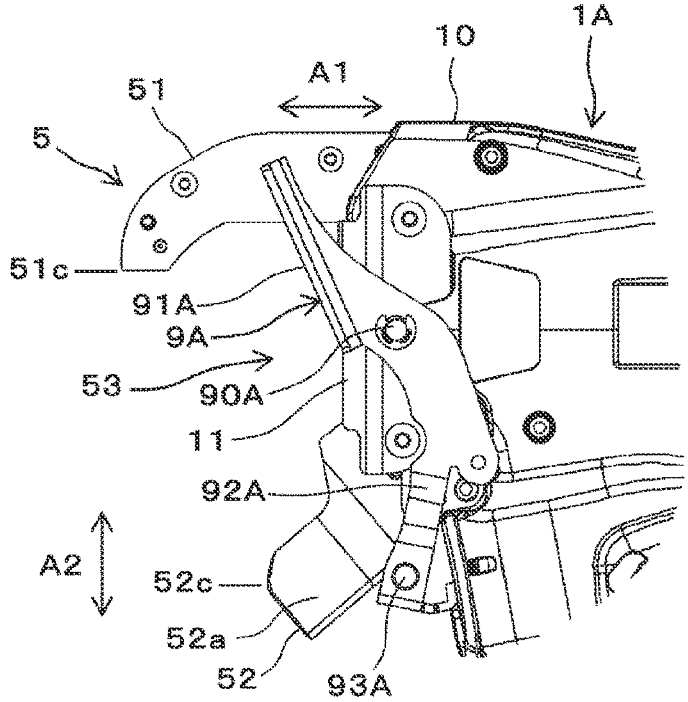
FIG. 6A is a side view depicting an example of the contact member.
Figure 6B:
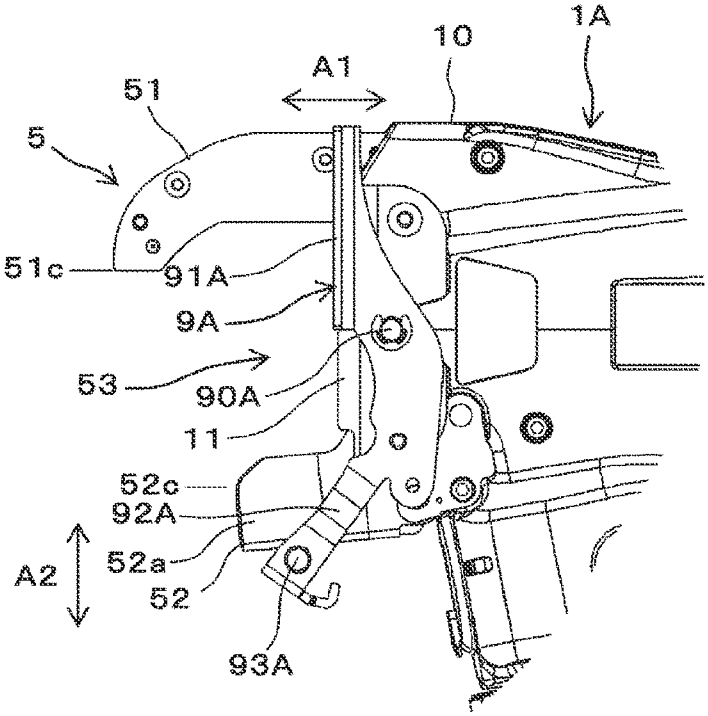
FIG. 6B is a side view depicting the example of the contact member.

FIGS. 4A and 4B are side views depicting an example of the guide part, FIG. 5 is a perspective view depicting an example of the guide part and a contact member, and FIGS. 6A and 6B are side views depicting an example of the contact member. In the below, a configuration of actuating a pair of guides and operational effects are described.

The guide part 5 has a first guide 51 provided with the regulation member 43 of the regulation part 4 and configured to guide the wire W, and a second guide 52 configured to guide the wire W curled by the regulation part 4 and the first guide 51 to the twisting unit 7.

The first guide 51 is attached to an end portion on a front side of the body part 10, and extends in a first direction denoted with an arrow A1. As shown in FIG. 3, the first guide 51 has a groove portion 51*h* having a guide surface 51*g* with which the wire W fed by the feeding unit 3 is in sliding contact. As for the first guide 51, when a side attached to the body part 10 is referred to as a base end-side and a side extending in the first direction from the body part 10 is referred to as a tip end-side, the regulation member 42 is provided to the base end-side of the first guide 51 and the regulation member 43 is provided to the tip end-side of the first guide 51. The base end-side of the first guide 51 is fixed to a metal part of the body part 10 by a screw or the like. As used herein, the fixing does not mean fixing in a strict sense but includes slight movement such as rattling of the first guide 51 with respect to the body part 10. A gap through which the wire W can pass is formed between the guide surface 51*g* of the first guide 51 and the outer peripheral surface of the regulation member 42. A part of the outer peripheral surface of the regulation member 43 protrudes toward the guide surface 51*g* of the first guide 51.

The second guide 52 is attached to an end portion on the front side of the body part 10. The second guide 52 is provided facing the first guide 51 in a second direction orthogonal to the first direction and denoted with an arrow A2 along an extension direction of the handle part 10*h*. The first guide 51 and the second guide 52 are spaced by a predetermined interval in the second direction, and an insertion/pulling-out opening 53 in and from which the reinforcing bars S are inserted/pulled out is formed between the first guide 51 and the second guide 52, as shown in FIGS. 4A and 4B.

As shown in FIG. 5, the second guide 52 has a pair of side guides 52*a* facing in a third direction denoted with an arrow A3 orthogonal to the first direction and the second direction. As for the second guide 52, when a side attached to the body part 10 is referred to as a base end-side and a side extending in the first direction from the body part 10 is referred to as a tip end-side, a gap between the pair of side guides 52*a* gradually decreases from the tip end-side toward the base end-side. In the pair of side guides 52*a*, the base end-sides face each other with a gap through which the wire W can pass.

The second guide 52 is attached to the body part 10 with being supported on the base end-side by a shaft 52*b*. An axis line of the shaft 52*b* faces toward the third direction. The second guide 52 can rotate about the shaft 52*b* as a support point with respect to the body part 10. The second guide 52 can move in directions in which an end portion 52*c* on the tip end-side comes close to and gets away from an end portion 51*c* of the first guide 51 facing the second guide 52 in the second direction denoted with the arrow A2. An end portion P2 of the groove portion 51*h* is exposed to the end portion 51*c* of the first guide 51.

The second guide 52 is configured to rotate about the shaft 52*b* as a support point, thereby moving between a first position (refer to the solid line in FIG. 4A) at which a distance between the end portion 52*c* of the second guide 52 and the end portion 51*c* of the first guide 51 is a first distance L1 and a second position (refer to the dashed-two dotted line in FIG. 4A and the solid line in FIG. 4B) at which the distance between the end portion 52*c* of the second guide 52 and the end portion 51*c* of the first guide 51 is a second distance L2 shorter than the first distance L1.

In a state where the second guide 52 is located at the second position, the end portion 52*c* of the second guide 52 and the end portion 51*c* of the first guide 51 are opened therebetween. In a state where the second guide 52 is located at the first position, the interval between the end portion 52*c* of the second guide 52 and the end portion 51*c* of the first guide 51 is larger, so that the reinforcing bars S can be more easily inserted into the insertion/pulling-out opening 53 between the first guide 51 and the second guide 52.

In the state where the second guide 52 is located at the second position, the side guides 52*a* are positioned on the feeding path Wf of the wire W shown with the broken line in FIGS. 4A and 4B. In the state where the second guide 52 is located at the first position, as long as the interval between the end portion 52*c* of the second guide 52 and the end portion 51*c* of the first guide 51 is greater than the case where the second guide 52 is located at the second position, the side guides 52*a* may be positioned on the feeding path Wf of the wire W or the side guides 52*a* may be positioned on an outer more side than the feeding path Wf of the wire W, as shown with the solid line in FIG. 4A.

The second guide 52 is urged in a moving direction to the first position by an urging member 54 such as a tortional coil spring and is held at the first position.

The reinforcing bar binding machine 1A includes a contact member 9A configured to detect the reinforcing bars S as the reinforcing bars S inserted in the insertion/pulling-out opening 53 between the first guide 51 and the second guide 52 are contacted thereto, and to actuate the second guide 52. The reinforcing bar binding machine 1A also includes a cover part 11 configured to cover the end portion on the front side of the body part 10.

The cover part 11 is attached from the end portion on the front side of the body part 10 over both left and right sides of the body part 10 in the third direction. The cover part 11 is constituted by a metal plate or the like, and has a shape to cover a portion or all of the end portion on the front side of the body part 10 and portions of both left and right sides on the front side of the body part 10, between the base end-side of the first guide 51 and the base end-side of the second guide 52. While the body part 10 is made of resin, the cover part 11 is made of metal, so that even when the contact member 9A and the reinforcing bars S are contacted to the cover part 11 made of metal, the wear can be reduced.

The contact member 9A is an example of the guide moving part, is rotatably supported by a shaft 90A and is attached to the body part 10 via the cover part 11. The contact member 9A has a bent shape, and has contact parts 91A provided on one side with respect to the shaft 90A and to be contacted to the reinforcing bars S and a connecting part 92A provided on the other side with respect to the shaft 90A and connected to the second guide 52. Specifically, the contact parts 91A are provided on one side with respect to the shaft 90A in the second direction, and the connecting part 92A is provided on the other side.

The contact member 9A has the shaft 90A provided adjacent to a center between the first guide 51 and the second guide 52. The contact member 9A also has a pair of contact parts 91A provided between the first guide 51 and the second guide 52 from the vicinity of a part supported by the shaft 90A toward the first guide 51-side. The contact parts 91A are provided on both sides in the third direction with respect to a virtual plane Dm (FIG. 5) including the feeding path Wf of the wire W, which passes through the groove portion 51*h* of the first guide 51 shown in FIG. 3, with an interval through which the wire W binding the reinforcing bars S can pass. The contact parts 91A extend to both left and right sides of the first guide 51.

The contact member 9A also has the connecting part 92A provided from the part supported by the shaft 90A toward the second guide 52-side, and a displacing part 93A in contact with a part on an opposite side to a side of the second guide 52 facing the first guide 51 is provided on a tip end-side of the connecting part 92A.

The contact member 9A is configured to rotate about the shaft 90A as a support point with respect to the body part 10, so that the contact parts 91A move between a standby position (FIG. 6A) at which the contact parts 91A protrude from the cover part 11 into the insertion/pulling-out opening 53 and an actuation position (FIG. 6B) at which the contact parts 91A come close to the cover part 11.

In a state where the contact member 9A is moved to the actuation position shown in FIG. 6B, the contact member 9A has such a shape that the contact parts 91A extend from the shaft 90A toward the first guide 51 along the second direction denoted with the arrow A2. Therefore, the rotation of the contact member 9A about the shaft 90A as a support point causes the contact parts 91A to move in the first direction denoted with the arrow A1 along an arc whose center is the shaft 90A. During an operation of inserting the reinforcing bars S into the insertion/pulling-out opening 53 between the first guide 51 and the second guide 52, the reinforcing bar binding machine 1A is moved in the first direction denoted with the arrow A1. Due to the relative movement of the reinforcing bar binding machine 1A and the reinforcing bars S, the contact parts 91A are pushed by a force along the first direction denoted with the arrow A1, so that the contact member 9A is moved to the actuation position. Thereby, a moving direction of the contact parts 91A due to the rotation about the shaft 90A as a support point becomes a direction along the direction of the force by which the reinforcing bars S push the contact parts 91A by the relative movement of the reinforcing bar binding machine 1A and the reinforcing bars S. Also, in the state where the contact member is moved to the actuation position shown in FIG. 6B, the contact member 9A has such a shape that the connecting part 92A is tilted forward from the shaft 90A with respect to the contact parts 91A and extends toward the second guide 52. Therefore, the rotation of the contact member 9A about the shaft 90A as a support point causes the displacing part 93A to move in the second direction denoted with the arrow A2 along an arc whose center is the shaft 90A. Thereby, in a state where the contact member 9A is urged by the urging member 54 and the second guide 52 is thus located at the first position, the displacing part 93A is pushed away from the first guide 51 by the second guide 52. For this reason, the contact member 9A is moved to the standby position by the rotation about the shaft 90A as a support point, so that the contact parts 91A protrude from the cover part 11. Note that, in the present example, the contact member 9A is configured to move by the force of the urging member 54 for urging the second guide 52. However, another urging member for urging the contact member 9A may also be provided.

When the contact parts 91A are pressed against the reinforcing bars S, the contact parts 91A of the contact member 9A are moved in the first direction. Thereby, the contact member 9A rotates about the shaft 90A as a support point and moves to the actuation position. When the contact member 9A is moved to the actuation position, the displacing part 93A is moved toward the first guide 51 by the rotation of the connecting part 92A about the shaft 90A as a support point. Thereby, the displacing part 93A pushes the second guide 52, so that the second guide 52 is moved to the second position. In this way, the contact of the reinforcing bars S to the contact parts 91A, and the movement of the displacing part 93A due to the contact of the reinforcing bars S to the contact part 91A cause the second guide 52 to move from the first position to the second position. Since the contact member 9A and the second guide 52 are constituted by separate components, a so-called booster mechanism can be realized according to a distance from the contact parts 91A to the shaft 90A, a distance from the displacing part 93A to the shaft 90A, a distance to a part where the shaft 52*b* of the second guide 52 and the displacing part 93A of the contact member 9A come into contact with each other, and the like. Thereby, it is possible to optimize an operation amount of the contact member 9A and an operation amount of the second guide 52.

Figure 7:
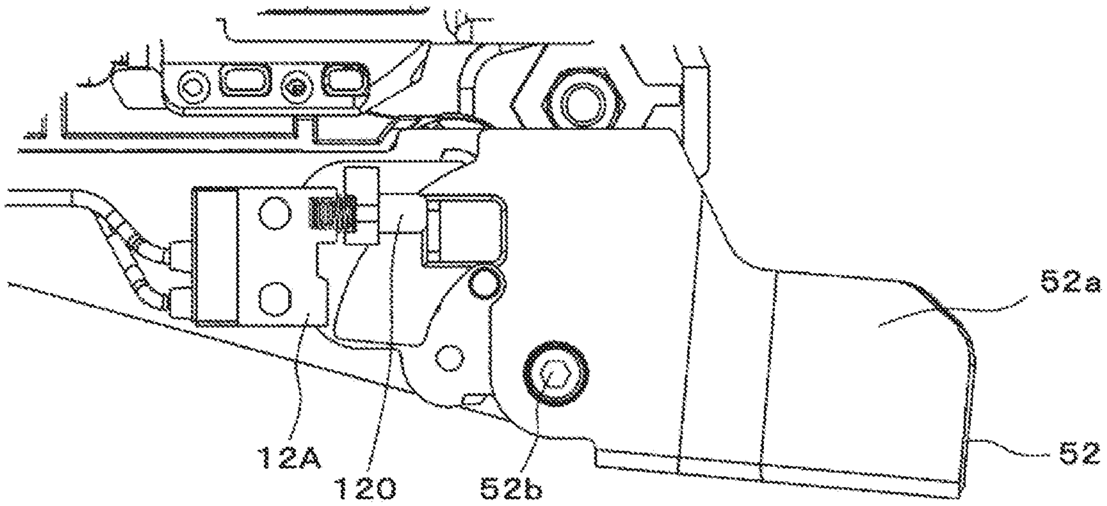
FIG. 7 is a side view depicting an example of an output unit configured to detect a second guide.

FIG. 7 is a side depicting an example of an output unit configured to detect the second guide. In the below, a first output unit 12A is described in detail with reference to each drawing. The reinforcing bar binding machine 1A includes a first output unit 12A configured to detect that the second guide 52 is moved to the second position, thereby performing a predetermined output. The first output unit 12A has a configuration where an output thereof changes by displacement of a movable element 120, for example. In the present example, when the contact member 9A is moved to the standby position and the second guide 52 is thus moved to the first position, the second guide 52 is moved away from the movable element 120. In this way, in a state where the second guide 52 is moved to the first position, an output of the first output unit 12A is set to an off state. In contrast, when the contact member 9A is moved to the actuation position and the second guide 52 is thus moved to the second position, the second guide 52 is moved in a direction of pushing the movable element 120. In this way, in a state where the second guide 52 is moved to the second position, an output of the first output unit 12A is set to an on state.

Subsequently, the twisting unit 7 and the drive unit 8 are described with reference to each drawing. The twisting unit 7 includes an engaging part 70 to which the wire W is engaged, and an actuation part 71 configured to actuate the engaging part 70. The engaging part 70 is configured to rotate by an operation of the actuation part 71, thereby twisting the wire W wound on the reinforcing bars S.

The drive unit 8 includes a twisting motor 80 configured to drive the twisting unit 7 and the like, a decelerator 81 configured to perform deceleration and torque amplification, a rotary shaft 72 configured to drive and rotate via the decelerator 81 by the twisting motor 80, and a movable member 83 configured to transmit a drive force to the cutting unit 6 and the regulation member 42. The twisting unit 7 and the drive unit 8 are arranged so that centers of rotation of the rotary shaft 82, the actuation part 71 and the engaging part 70 are on the same axis. The centers of rotation of the rotary shaft 82, the actuation part 71 and the engaging part 70 are referred to as an axis line Ax.

The engaging part 70 is formed with a first passage through which the wire W fed to the cutting unit 6 by the feeding unit 3 passes, and a second passage through which the wire W curled by the regulation part 4 and guided to the twisting unit 7 by the guide part 5 passes.

The drive unit 8 is configured to move the actuation part 71 along an axis direction of the rotary shaft 82 by a rotating operation of the rotary shaft 82. The actuation part 71 is moved along the axis direction of the rotary shaft 82, so that the engaging part 70 holds a tip end-side of the wire W guided to the twisting unit 7 by the guide part 5.

In the drive unit 8, the movable member 83 is configured to move along the axis direction of the rotary shaft 82 in conjunction with the moving operation of the actuation part 71 along the axis direction of the rotary shaft 82, so that the motion of the movable member 83 is transmitted to the regulation member 42 by the transmission mechanism 44 and the regulation member 42 is thus moved to a position at which it does not contact the wire. In addition, the actuation part 71 is configured to move along the axis direction of the rotary shaft 82, so that the motion of the movable member 83 is transmitted to the movable blade part 61 by the transmission mechanism 62 and the movable blade part 61 is thus actuated to cut the wire W.

The drive unit 8 is configured to rotate the actuation part 71 moved along the axis direction of the rotary shaft 82 by the rotating operation of the rotary shaft 82. The actuation part 71 is configured to rotate about the axis of the rotary shaft 82, thereby twisting the wire W by the engaging part 70.

Figure 8:
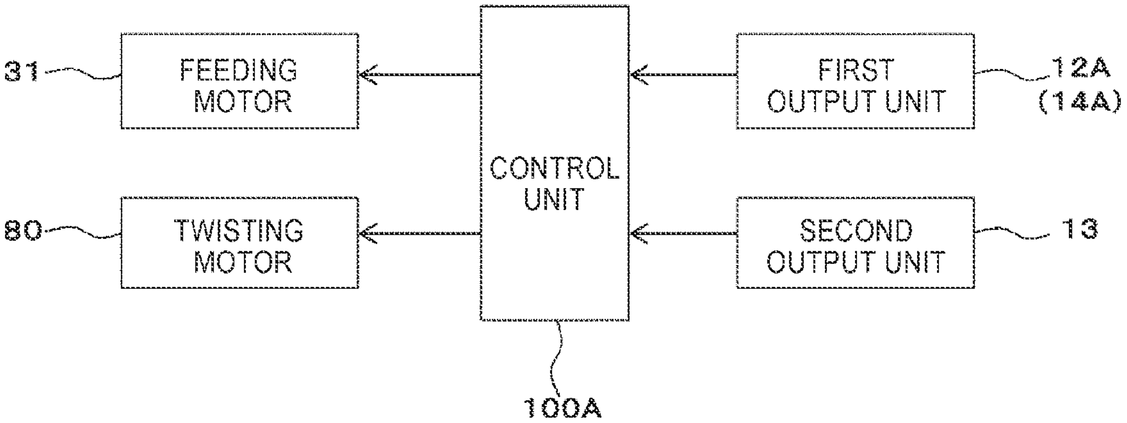
FIG. 8 is a functional block diagram of the reinforcing bar binding machine of the first embodiment.

FIG. 8 is a functional block diagram of the reinforcing bar binding machine of the first embodiment. In the reinforcing bar binding machine 1A, a control unit 100A is configured to detect outputs of the first output unit 12A configured to be actuated as the contact member 9A is pressed against the reinforcing bars S, and a second output unit 13 configured to be actuated as the trigger 10*t* is operated. The control unit 100A is configured to control the feeding motor 31 configured to drive the feeding gears 30 and the twisting motor 80 configured to drive the twisting unit 7 and the like, in response to the outputs of the first output unit 12A and the second output unit 13, thereby executing a series of operations of binding the reinforcing bars S with the wire W.

Subsequently, operations of binding the reinforcing bars S with the wire W by the reinforcing bar binding machine 1A are described. The operator grips the handle part 10*h* of the reinforcing bar binding machine 1A with a hand, aligns a position of the guide part 5 with an intersection point of the two reinforcing bars S, and inserts the reinforcing bars S into the insertion/pulling-out opening 53.

According to the reinforcing bar binding machine 1A, in a state where the reinforcing bars S are not inserted in the insertion/pulling-out opening 53, as shown in FIG. 6A, the second guide 52 is moved to the first position, so that an interval between the end portion 52*c* of the second guide 52 and the end portion 51*c* of the first guide 51 increases. Thereby, it is easier to insert the reinforcing bars S into the insertion/pulling-out opening 53.

The operator presses the reinforcing bars S against the contact parts 91A of the contact member 9A by an operation of moving the reinforcing bar binding machine 1A in the direction of inserting the reinforcing bars S into the insertion/pulling-out opening 53.

Due to the operation of moving the reinforcing bar binding machine 1A in the direction of inserting the reinforcing bars S into the insertion/pulling-out opening 53, the contact member 9A is applied with a force along the moving direction of the reinforcing bar binding machine 1A, so that the contact parts 91A are pushed. Thereby, the contact parts 91A are moved in the first direction denoted with the arrow A1, so that the contact member 9A rotates about the shaft 90A as a support point, thereby moving to the actuation position, as shown in FIG. 6B.

When the two intersecting reinforcing bars S are inserted into the insertion/pulling-out opening 53, one reinforcing bar S is located at one side part of the first guide 51 and the other reinforcing bar S is located at the other side part of the first guide 51. In contrast, the pair of contact parts 91A of the contact member 9A extends from between the first guide 51 and the second guide 52 toward both left and right sides of the first guide 51. Thereby, the reinforcing bars S inserted in the insertion/pulling-out opening 53 are securely contacted to the contact parts 91A, so that the contact member 9A can be moved to the actuation position. In addition, the contact parts 91A of the contact member 9A are moved in the first direction denoted with the arrow A1 by the rotating operation about the shaft 90A as a support point. Thereby, the contact parts 91A can be pushed by the operation of moving the reinforcing bar binding machine 1A in the direction of inserting the reinforcing bars S into the insertion/pulling-out opening 53, and it is not necessary to move the reinforcing bar binding machine 1A in another direction so as to actuate the contact member 9A.

When the contact member 9A is moved to the actuation position, the rotation of the connecting part 92A about the shaft 90A as a support point causes the displacing part 93A to push the second guide 52 toward the first guide 51, so that the second guide 52 is moved to the second position.

When the second guide 52 is moved to the second position, the output of the first output unit 12A becomes on, and the control unit 100A detects that the output of the first output unit 12A becomes on.

The operator operates the trigger 10*t* in a state where the reinforcing bars S are pressed against the contact parts 91A of the contact member 9A. The trigger 10*t* is operated, so that the output of the second output unit 13 becomes on and the control unit 100A detects that the output of the second output unit 13 becomes on.

When it is detected that the output of the second output unit 13 becomes on, in a state where it is detected that the output of the first output unit 12A becomes on, the control unit 100A controls the feeding motor 31 and the twisting motor 80 to execute a series of operations of binding the reinforcing bars S with the wire W. Alternatively, when the operation of pressing the reinforcing bars S against the contact parts 91A of the contact member 9A is performed and it is thus detected that the output of the first output unit 12A becomes on, in a state where the operator operates the trigger 10*t* and the output of the second output unit 13 becomes on, the control unit may control the feeding motor 31 and the twisting motor 80 to execute a series of operations of binding the reinforcing bars S with the wire W.

An example of the series of operations of binding the reinforcing bars S with the wire W is described. The feeding motor 31 is rotated in the forward direction and the feeding gears 30 are thus rotated in the forward direction, so that the wire W is fed in the forward direction denoted with the arrow F. The wire W fed in the forward direction by the feeding unit 3 passes through the fixed blade part 60, which is the first regulation member constituting the regulation part 4, and the regulation member 42 that is the second regulation member. The wire W having passed through the regulation member 42 is contacted to the guide surface 51*g* of the first guide 51 and is thus guided to the regulation member 43 that is the third regulation member.

Thereby, the wire W fed in the forward direction by the feeding unit 3 is contacted to the fixed blade part 60, the regulation member 42, the regulation member 43, and the guide surface 51*g* of the first guide 51 and is thus bent into an arc shape. Then, the wire W fed in the forward direction by the feeding unit 3 is contacted to the fixed blade part 60 and the regulation member 43 from an outer periphery direction of the arc shape and is contacted to the regulation member 42 between the fixed blade part 60 and the regulation member 43 from an inner periphery direction of the arc shape, so that a substantially circular curl is formed.

The end portion 51*c* of the first guide 51 and the end portion 52*c* of the second guide 52 are spaced by a predetermined interval in a state where the second guide 52 is moved to the second position. However, in the state where the second guide 52 is moved to the second position, the pair of side guides 52*a* is positioned on the feeding path Wf of the wire W, and the wire W fed in the forward direction by the feeding unit 3 is curled by the regulation part 4, as described above, so that the wire is guided between the pair of side guides 52*a* of the second guide 52.

The wire W guided between the pair of side guides 52*a* of the second guide 52 is fed in the forward direction by the feeding unit 3, so that the wire is guided to the engaging part 70 of the twisting unit 7 by the pair of side guides 52*a* of the second guide 52. Then, when it is determined that a tip end portion of the wire W is fed to a predetermined position, the control unit 100A stops the drive of the feeding motor 31. Thereby, the wire W is spirally wound around the reinforcing bars S. Note that, in a state where the second guide 52 is not moved to the second position and the output of the first output unit 12A is off, the control unit 100A does not perform the feeding of the wire W. Thereby, the wire W is not engaged to the engaging part 70 of the twisting unit 7, and occurrence of poor feeding is suppressed. That is, when the second guide 52 is located at the second position, the wire W can be guided to the engaging part 70 of the twisting unit 7.

After stopping the feeding of the wire W in the forward direction, the control unit 100A rotates the twisting motor 80 in the forward direction. The twisting motor 80 is rotated in the forward direction, so that the engaging part 70 is actuated by the actuation part 71 and the tip end-side of the wire W is held by the engaging part 70.

When it is determined that the twisting motor 80 is rotated until the wire W is held by the engaging part 70, the control unit 100A stops the rotation of the twisting motor 80, and rotates the feeding motor 31 in the reverse direction. When the twisting motor 80 is rotated until the wire W is held by the engaging part 70, the motion of the movable member 83 is transmitted to the regulation member 42 by the transmission mechanism 44, so that the regulation member 42 is moved to a position at which it is not contacted to the wire.

When the feeding motor 31 is rotated in the reverse direction, the feeding gears 30 are rotated in the reverse direction, so that the wire W is fed in the reverse direction denoted with the arrow R. By the operation of feeding the wire Win the reverse direction, the wire W is wound closely contacted to the reinforcing bars S.

When it is determined that the feeding motor 31 is rotated in the reverse direction until the wire W is wound on the reinforcing bars S, the control unit 100A stops the rotation of the feeding motor 31, and then rotates the twisting motor 80 in the forward direction. The twisting motor 80 is rotated in the forward direction, so that the movable blade part 61 is actuated via the transmission mechanism 62 by the movable member 83 and the wire W is thus cut.

After the wire W is cut, the twisting motor 80 is continuously rotated in the forward direction, thereby rotating the engaging part 70 to twist the wire W.

When it is determined that the twisting motor 80 is rotated in the forward direction until the wire W is twisted, the control unit 100A rotates the twisting motor 80 in the reverse direction. The twisting motor 80 is rotated in the reverse direction, so that the engaging part 70 is returned to the initial position and the held state of the wire W is thus released. Thereby, the wire W binding the reinforcing bars S can be pulled out from the engaging part 70.

When it is determined that the twisting motor 80 is rotated in the reverse direction until the engaging part 70 and the like are returned to the initial position, the control unit 100A stops the rotation of the twisting motor 80.

The operator moves the reinforcing bar binding machine 1A in a direction of pulling out the reinforcing bars S bound with the wire W from the insertion/pulling-out opening 53. When the force of pushing the contact parts 91A of the contact member 9A is not applied by the operation of moving the reinforcing bar binding machine 1A in the direction of pulling out the reinforcing bars S from the insertion/pulling-out opening 53, the second guide 52 is moved from the second position to the first position by the force of the urging member 54.

When the second guide 52 is moved to the first position, the contact member 9A is pushed in a direction in which the displacing part 93A gets away from the first guide 51, and is moved to the standby position by the rotation about the shaft 90A as a support point, so that the contact parts 91A protrude from the cover part 11.

The operator's operation of moving the reinforcing bar binding machine 1A in the direction of pulling out the reinforcing bars S bound with the wire W from the insertion/pulling-out opening 53 causes the second guide 52 to move to the first position, so that the interval between the end portion 52*c* of the second guide 52 and the end portion 51*c* of the first guide 51 increases. Thereby, the reinforcing bars S can be more easily pulled out from the insertion/pulling-out opening 53.

Figure 9A:
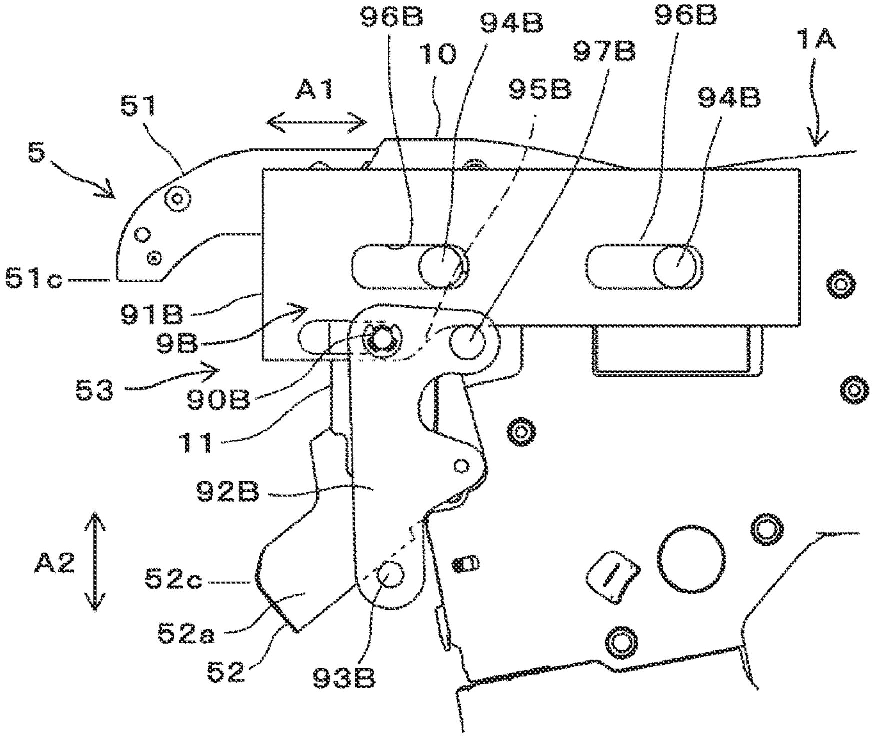
FIG. 9A is a side view depicting a modified embodiment of a guide moving part.
Figure 9B:
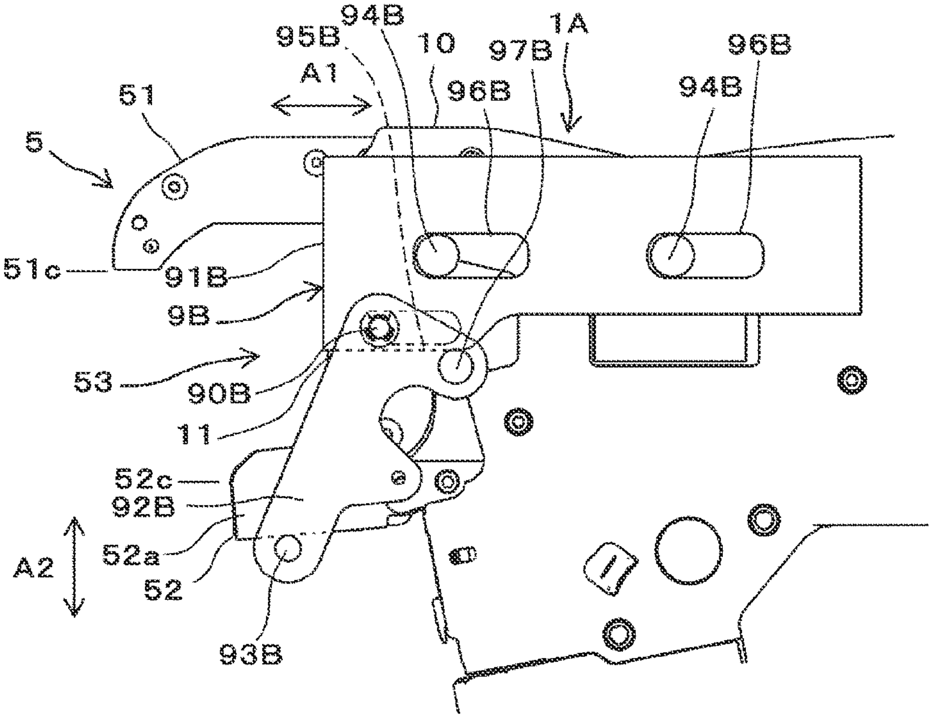
FIG. 9B is a side view depicting the modified embodiment of the guide moving part.

FIGS. 9A and 9B are side views depicting a modified embodiment of the guide moving part. In the guide moving part of the modified embodiment, a contact member 9B to which the reinforcing bars S are contacted, and a connecting part 92B connected to the second guide 52 are constituted by separate components, other than being integrally constituted. The contact member 9B is also configured to linearly move.

The contact member 9B is attached to a side part of the body part 10 with being supported by a plurality of shafts 94B. The contact member 9B has a shape extending in the first direction denoted with the arrow A1, a tip end portion in the first direction is provided with contact parts 91B facing the insertion/pulling-out opening 53, and a part on one side in the second direction denoted with the arrow A2 is provided with an actuation part 95B for actuating the connecting part 92B. The actuation part 95B is constituted by a cam surface having an unevenness in the first direction. The contact parts 91B are provided on both sides in the third direction with an interval through which the wire W binding the reinforcing bars S can pass. The contact parts 91B extend to both left and right sides of the first guide 51. The contact parts 91B may also be configured to extend to both left and right sides of the second guide 52.

The contact member 9B has long holes 96B in the first direction denoted with the arrow A1, and the shafts 94B are inserted in the long holes 96B. Thereby, the contact member 9B can be moved in the first direction denoted with the arrow A1 with respect to the body part 10, and is configured to move between a standby position (FIG. 9A) at which the contact parts 91B protrude from the cover part 11 into the insertion/pulling-out opening 53 and an actuation position (FIG. 9B) at which the contact parts 91B come close to the cover part 11.

The contact member 9B is urged in a moving direction to the standby position by an urging member (not shown), and is held at the standby position.

The connecting part 92B is attached to the cover part 11 with being supported by a shaft 90B. The connecting part 92B is provided with an actuated part 97B, which can be sliding contacted to the actuation part 95B of the contact member 9B, on one side with the shaft 90B being interposed and is provided with a displacing part 93B, which is in contact with a part on an opposite side to a side of the second guide 52 facing the first guide 51, on the other side with the shaft 90B being interposed.

In a state where the reinforcing bars S are not in contact with the contact parts 91B of the contact member 9B, the contact member 9B is urged in a direction, in which the contact parts 91B protrude from the cover part 11, by an urging member (not shown) separate from the urging member 54 for urging the second guide 52, thereby moving to the standby position shown in FIG. 9A. When the contact member 9B is moved to the standby position, the connecting part 92B can rotate about the shaft 90B as a support point in a direction in which the actuated part 97B is moved following an uneven shape of the actuation part 95B of the contact member 9B and the displacing part 93B gets away from the first guide 51. Thereby, the second guide 52 is urged by the urging member 54 and is moved to the first position. The position of the second guide 52 is detected by the first output unit 12A described with reference to FIG. 7, and the output of the first output unit 12A becomes off in a state where the second guide 52 is moved to the first position.

When the reinforcing bars S are pressed against the contact parts 91B, the contact member 9B is moved to the actuation position along the first direction denoted with the arrow A1. When the contact member 9B is moved to the actuation position, the actuated part 97B of the connecting part 92B is moved following an uneven shape of the actuation part 95B of the contact member 9B, and the displacing part 93B is moved toward the first guide 51 by rotation of the connecting part 92B about the shaft 90B as a support point. Thereby, the displacing part 93B pushes the second guide 52, so that the second guide 52 is moved to the second position. In a state where the second guide 52 is moved to the second position, the output of the first output unit 12A becomes on. In this way, the contact of the reinforcing bars S to the contact parts 91B, and the movement of the displacing part 93B due to the contact of the reinforcing bars S to the contact parts 91B cause the second guide 52 to move from the first position to the second position.

When the trigger 10*t* is operated and it is thus detected that the output of the second output unit 13 becomes on, in a state where the contact member 9B is moved to the actuation position, so that the second guide 52 is thus moved to the second position and it is detected that the output of the first output unit 12A becomes on, the control unit 100A shown in FIG. 8 controls the feeding motor 31 and the twisting motor 80 to execute a series of operations of binding the reinforcing bars S with the wire W, as described above. Alternatively, when the reinforcing bars S are pressed against the contact parts 91B of the contact member 9B and it is thus detected that the output of the first output unit 12A becomes on, in a state where the operator operates the trigger 10*t* and the output of the second output unit 13 becomes on, the control unit 100A may control the feeding motor 31 and the twisting motor 80 to execute a series of operations of binding the reinforcing bars S with the wire W.

The contact member 9B is provided with the long holes 96B in the first direction denoted with the arrow A1, and the shafts 94B are inserted in the long hole 96B, so that the contact member 9B linearly moves in the first direction. During the operation of inserting the reinforcing bars S into the insertion/pulling-out opening 53 between the first guide 51 and the second guide 52, the reinforcing bar binding machine 1A is moved in the first direction denoted with the arrow A1. Due to the relative movement of the reinforcing bar binding machine 1A and the reinforcing bars S, the contact parts 91B of the contact member 9B are pushed by the force along the first direction denoted with the arrow A1. Thereby, a moving direction of the contact member 9B becomes a direction along the direction of the force by which the reinforcing bars S push the contact parts 91B by the relative movement of the reinforcing bar binding machine 1A and the reinforcing bars S. In contrast, the contact member 9B and the connecting part 92B are constituted by separate components, so that the connecting part 92B can move the second guide 52 by rotation about the shaft 90B as a support point. Thereby, it is possible to optimize a moving direction of the contact member 9B that is pushed and actuated by the reinforcing bars S and a moving direction of the connecting part 92B for moving the second guide 52, respectively.

Figure 10A:
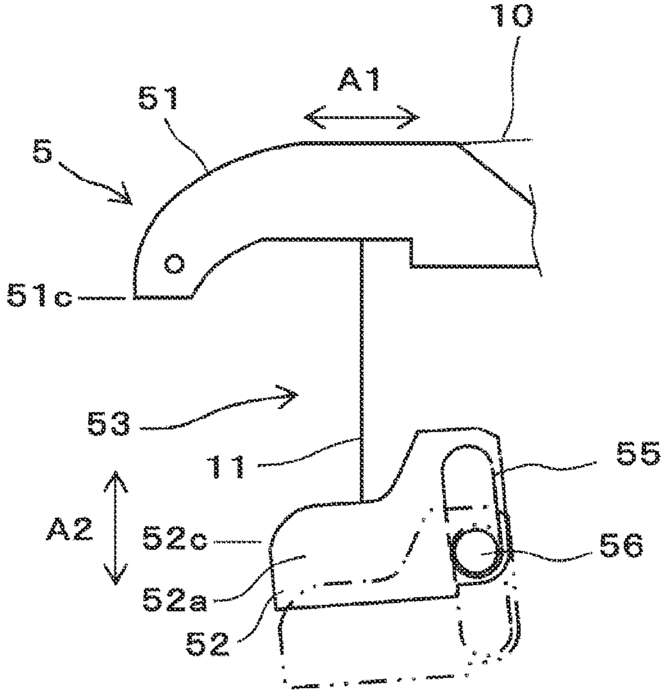
FIG. 10A is a side view depicting a modified embodiment of the guide part.
Figure 10B:
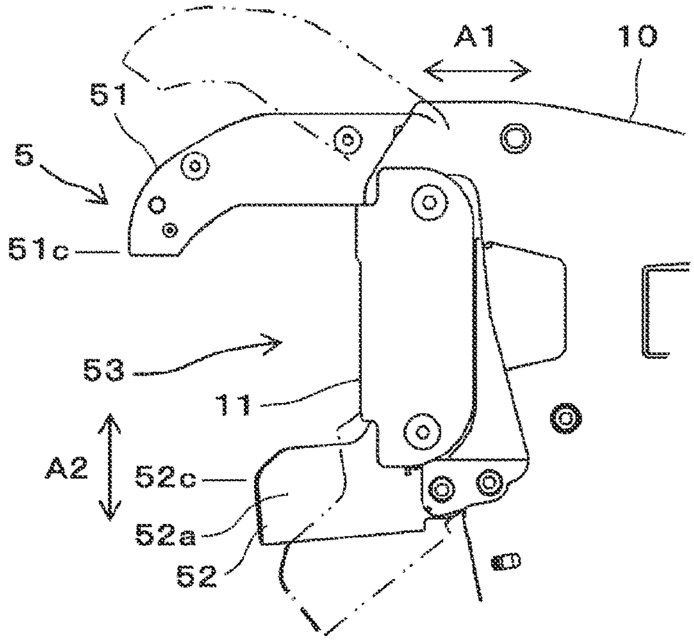
FIG. 10B is a side view depicting the modified embodiment of the guide part.

FIGS. 10A and 10B are side views depicting a modified embodiment of the guide part. In FIG. 10A, the second guide 52 is provided with a long hole 55 extending in the second direction denoted with the arrow A2, and a shaft 56 provided to the body part 10 is inserted in the long hole 55. Thereby, the second guide 52 can linearly move in the second direction denoted with the arrow A2 with respect to the body part 10, and is configured to move a first position shown with the dashed-two dotted line in FIG. 10A and a second position shown with the solid line in FIG. 10A.

In a state where the second guide 52 is located at the first position, the interval between the end portion 52*c* of the second guide 52 and the end portion 51*c* of the first guide 51 increases, so that the reinforcing bars S can be more easily inserted into the insertion/pulling-out opening 53 between the first guide 51 and the second guide 52.

When the reinforcing bars S are inserted in the insertion/pulling-out opening 53 and reaches a predetermined state, the second guide 52 is moved from the first position to the second position by the guide moving part (not shown). In a state where the second guide 52 is moved to the second position, the distance between the end portion 52*c* of the second guide 52 and the end portion 51*c* of the first guide 51 becomes smaller than the state where the second guide 52 is moved to the first position.

In FIG. 10B, any one of the first guide 51 and the second guide 52 or both the first guide 51 and the second guide 52 are configured to be movable toward and away from each other.

In a state where any one of the first guide 51 and the second guide 52 or both the first guide 51 and the second guide 52 are located at the first position shown with the dashed-two dotted line in FIG. 10B, the interval between the end portion 52*c* of the second guide 52 and the end portion 51*c* of the first guide 51 increases, so that the reinforcing bars S can be more easily inserted into the insertion/pulling-out opening 53 between the first guide 51 and the second guide 52.

When the reinforcing bars S are inserted in the insertion/pulling-out opening 53 and reaches a predetermined state, any one of the first guide 51 and the second guide 52 or both the first guide 51 and the second guide 52 are moved from the first position to the second position by the guide moving part (not shown). In a state where any one of the first guide 51 and the second guide 52 or both the first guide 51 and the second guide 52 are moved to the second position, the distance between the end portion 52*c* of the second guide 52 and the end portion 51*c* of the first guide 51 is smaller, as compared to a state where any one of the first guide 51 and the second guide 52 or both the first guide 51 and the second guide 52 are moved to the first position.

Figure 11A:
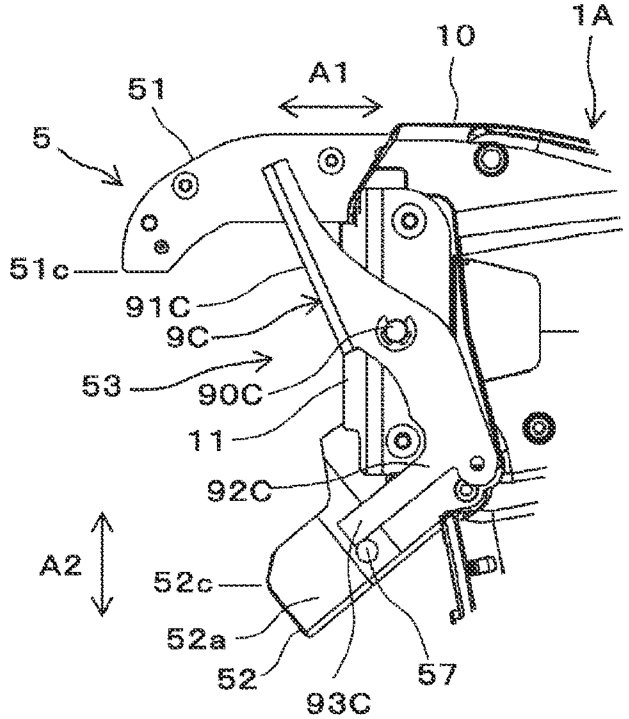
FIG. 11A is a side view depicting another modified embodiment of the guide part.
Figure 11B:
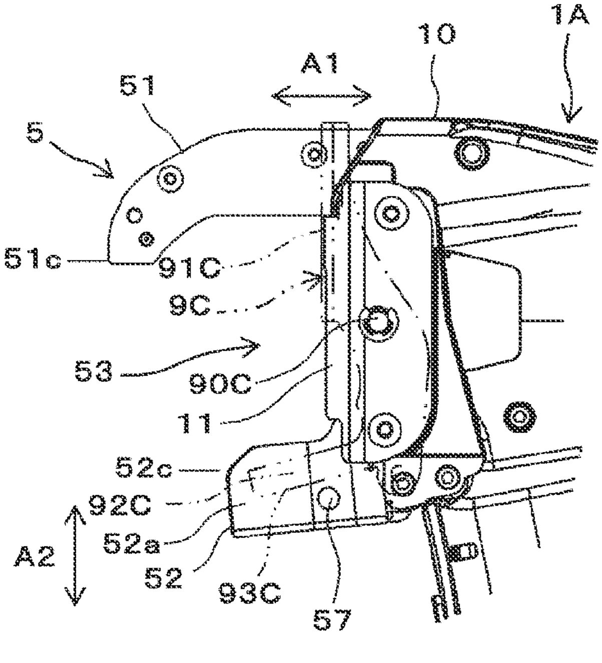
FIG. 11B is a side view depicting another modified embodiment of the guide part.

FIGS. 11A and 11B are side views depicting another modified embodiment of the guide part. In FIGS. 11A and 11B, the second guide 52 is urged in a moving direction from the first position to the second position by an urging member (not shown) such as a tortional coil spring.

A contact member 9C has a connecting part 92C provided from a part supported by a shaft 90C toward the second guide 52-side, and a displacing part 93C, which is in contact with a displaced part 57 provided to the second guide 53 from a side facing the first guide 51, is provided to the connecting part 92C.

The contact member 9C is urged in a moving direction to the standby position by an urging member (not shown) and is held at the standby position. Here, the force of urging the contact member 9C in the moving direction to the standby position by the urging member (not shown) is set higher than the force of urging the second guide 52 in the moving direction from the first position to the second position by the urging member (not shown). Thereby, the contact member 9C is held at the standby position and the second guide 52 is also held at the first position.

In a state where the reinforcing bars S are not in contact with contact parts 91C of the contact member 9C, the contact member 9C is urged in a direction, in which the contact parts 91C protrude from the cover part 11, by the urging member (not shown) and is thus moved to the standby position shown in FIG. 11A. When the contact member 9C is moved to the standby position, the displacing part 93C of the contact member 9C is moved away from the first guide 51. Thereby, the displaced part 57 of the second guide 52 is pushed by the displacing part 93C of the contact member 9C, so that the second guide 52 is moved to the first position. The position of the second guide 52 is detected by the first output unit 12A described with respect to FIG. 7, and the output of the first output unit 12A becomes off in the state where the second guide 52 is moved to the first position.

When the contact parts 91C are pressed against the reinforcing bars S, the contact parts 91C are moved in the first direction denoted with the arrow A1, so that the contact member 9C rotates about the shaft 90C as a support point and moves to the actuation position.

When the contact member 9C is moved to the actuation position, the displacing part 93C is moved toward the first guide 51 by rotation of the connecting part 92C about the shaft 90C as a support point. Thereby, the second guide 52 is urged by the urging member (not shown) and is thus moved to the second position. In a state where the second guide 52 is moved to the second position, the output of the first output unit 12A becomes on. In this way, the contact of the reinforcing bars S to the contact parts 91C, and the movement of the displacing part 93C due to the contact of the reinforcing bars S to the contact parts 91C cause the second guide 52 to move from the first position to the second position.

When the trigger 10*t* is operated and it is thus detected that the output of the second output unit 13 becomes on, in a state where the contact member 9C is moved to the actuation position, so that the second guide 52 is moved to the second position and it is thus detected that the output of the first output unit 12A becomes on, the control unit 100A shown in FIG. 8 controls the feeding motor 31 and the twisting motor 80 to execute the series of operations of binding the reinforcing bars S with the wire W, as described above.

Figure 12A:
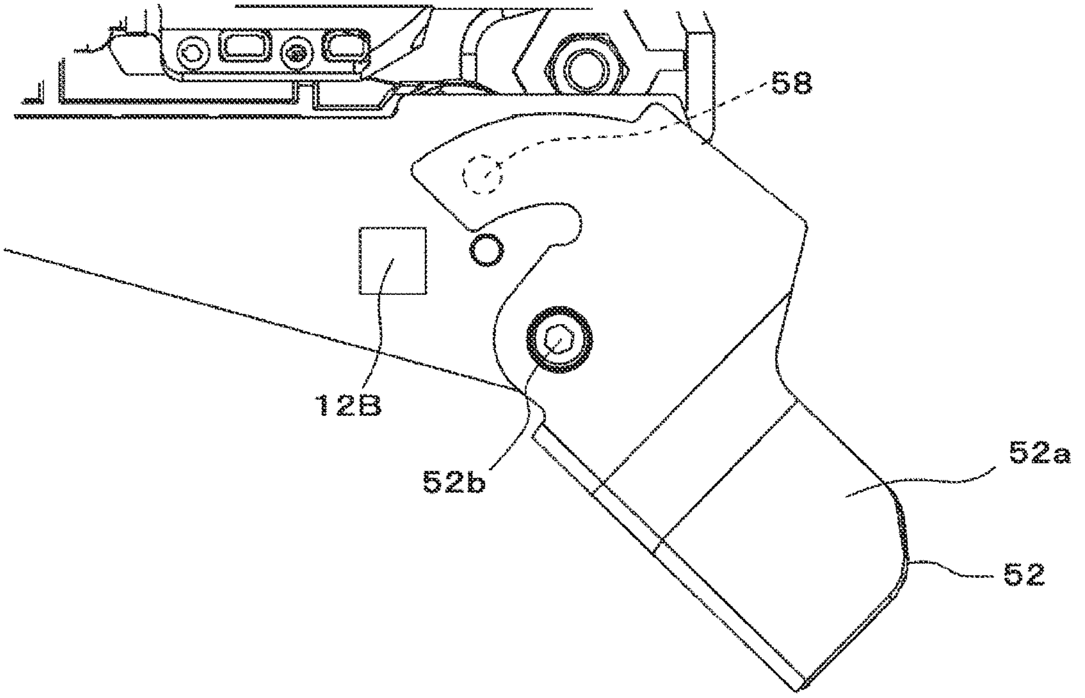
FIG. 12A is a side view depicting a modified embodiment of the output unit configured to detect the second guide.
Figure 12B:
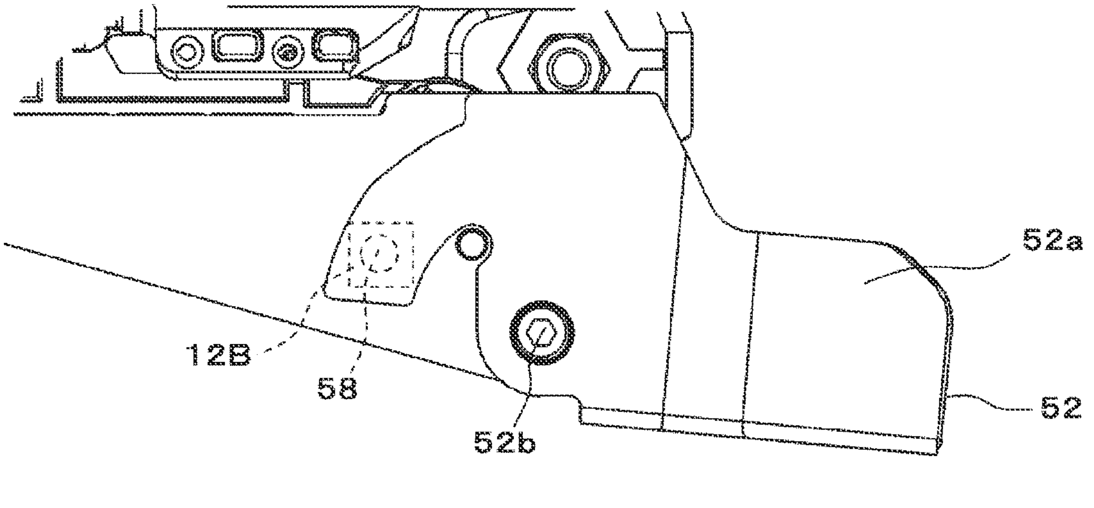
FIG. 12B is a side view depicting the modified embodiment of the output unit configured to detect the second guide.

FIGS. 12A and 12B are side views depicting a modified embodiment of the output unit configured to detect the second guide. FIGS. 12A and 12B depict an example where the first output unit 12B is constituted by a non-contact sensor. In the present example, the first output unit 12B is constituted by a sensor using a Hall element.

The second guide 52 has a detection element 58 configured to move by rotation about the shaft 52*b* as a support point. As shown in FIG. 12A, when the second guide 52 is moved to the first position, the detection element 58 is moved outside a detection position of the first output unit 12B. Also, as shown in FIG. 12B, when the second guide 52 is moved to the second position, the detection element 58 is moved to the detection position of the first output unit 12B.

When the contact member 9A is moved to the standby position, as shown in FIG. 6A, and the second guide 52 is thus moved to the first position, the detection element 58 is moved outside the detection position of the first output unit 12B. In this way, in a state where the detection element 58 of the second guide 52 is moved outside the detection position of the first output unit 12B, the output of the first output unit 12B is set to an off state. In contrast, when the contact member 9A is moved to the actuation position, as shown in FIG. 6B, and the second guide 52 is thus moved to the second position, the detection element 58 is moved to the detection position of the first output unit 12B. In this way, in a state where the detection element 58 of the second guide 52 is moved to the detection position of the first output unit 12B, the output of the first output unit 12B is set to an on state.

When the trigger 10*t* is operated and it is thus detected that the output of the second output unit 13 becomes on, in a state where the second guide 52 is moved to the second position and it is thus detected that the output of the first output unit 12B becomes on, the control unit 100A shown in FIG. 8 controls the feeding motor 31 and the twisting motor 80 to execute the series of operations of binding the reinforcing bars S with the wire W, as described above. Alternatively, when the second guide 52 is moved to the second position and it is thus detected that the output of the first output unit 12B becomes on, in a state where the operator operates the trigger 10*t* and thus the output of the second output unit 13 becomes on, the control unit 100A may control the feeding motor 31 and the twisting motor 80 to execute the series of operations of binding the reinforcing bars S with the wire W.

The first output unit 12B is constituted by the non-contact sensor, so that an erroneous detection due to wastes and the like can be reduced.

FIGS. 13A, 13B, 14A, 14B, 15A and 15B are side views depicting modified embodiments of the output unit configured to detect the contact member. In FIGS. 13A, 13B, 14A, 14B, 15A and 15B, when it is detected that the contact member is moved to the actuation position, it is determined that the second guide 52 is moved to the second position.

As described with reference to FIGS. 6A and 6B, FIGS. 13A and 14B depict a configuration where the second guide 52 is moved to the first position and the second position by the rotating operation about the shaft 52*b* as a support point and the second guide 52 is urged in the moving direction from the second position to the first position by the urging member 54 and is held at the first position. In this configuration, the first output unit 14A configured to detect that the contact member is moved to the actuation position is provided. Note that, in the present example, the contact member 9A is moved by the force of the urging member 54 for urging the second guide 52. However, another urging member for urging the contact member 9A may be provided.

Figure 13A:
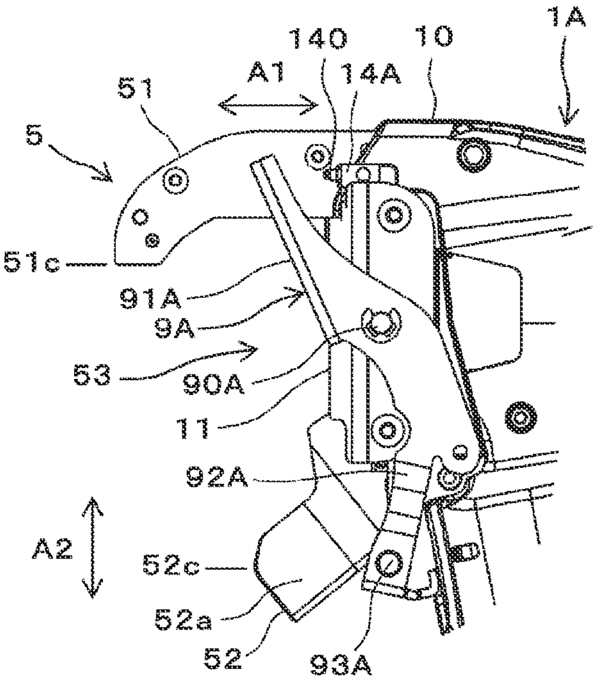
FIG. 13A is a side view depicting a modified embodiment of the output unit configured to detect the contact member.
Figure 13B:
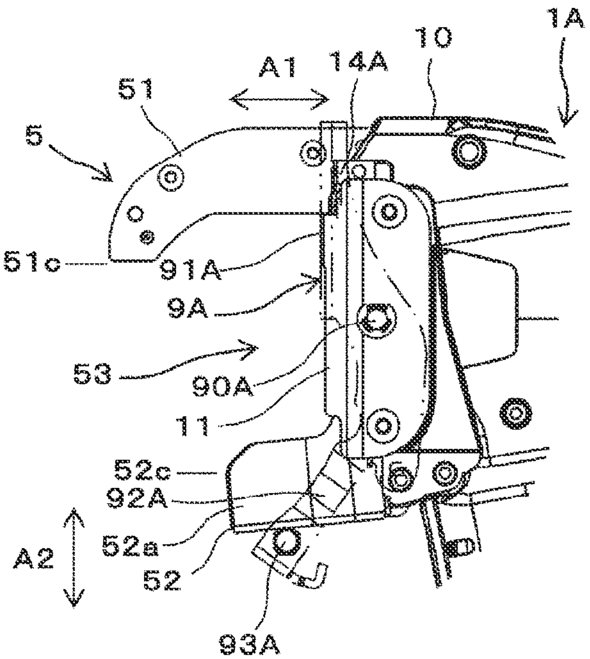
FIG. 13B is a side view depicting the modified embodiment of the output unit configured to detect the contact member.

The first output unit 14A may have a similar configuration to the first output unit 12A described with reference to FIG. 7. For example, an output thereof is changed by displacement of a movable element 140. In the present example, as shown in FIG. 13A, when the contact member 9A is moved to the standby position, the contact parts 91A of the contact member 9A are moved away from the movable element 140. In this way, in a state where the contact member 9A is moved to the standby position, the output of the first output unit 14A is set to an off state. In contrast, as shown in FIG. 13B, when the contact member 9A is moved to the actuation position, the contact parts 91A of the contact member 9A are moved in a direction of pushing the movable element 140. In this way, in a state where the contact member 9A is moved to the actuation position, the output of the first output unit 14A is set to an on state.

As shown in FIG. 13A, in the state where the second guide 52 is located at the first position, the displacing part 93A is pushed away from the first guide 51, so that the contact member 9A is moved to the standby position by rotation about the shaft 90A as a support point. In the state where the contact member 9A is moved to the standby position, the output of the first output unit 14A becomes off.

When the contact parts 91A are pressed against the reinforcing bars S, the contact parts 91A are moved in the first direction denoted with the arrow A1, so that the contact member 9A rotates about the shaft 90A as a support point and moves to the actuation position, as shown in FIG. 13B. In the state where the contact member 9A is moved to the standby position, the output of the first output unit 14A becomes on. In addition, when the contact member 9A is moved to the actuation position, the displacing part 93A is moved toward the first guide 51 by rotation of the connecting part 92A about the shaft 90A as a support point. Thereby, the displacing part 93A pushes the second guide 52, so that the second guide 52 is moved to the second position. Therefore, it is detected that the contact member 9A is moved to the actuation position, so that it can be determined that the second guide 52 is moved to the second position. In this way, the contact of the reinforcing bars S to the contact parts 91A and the movement of the displacing part 93A due to the contact of the reinforcing bars S to the contact parts 91A cause the second guide 52 to move from the first position to the second position.

When the trigger 10*t* is operated and it is thus detected that the output of the second output unit 13 becomes on, in a state where the contact member 9A is moved to the actuation position and it is thus detected that the output of the first output unit 14A becomes on, the control unit 100A shown in FIG. 8 controls the feeding motor 31 and the twisting motor 80 to execute the series of operations of binding the reinforcing bars S with the wire W, as described above. Alternatively, when the contact member 9A is moved to the actuation position and it is thus detected that the output of the first output unit 14A becomes on, in a state where the operator operates the trigger 10*t* and thus the output of the second output unit 13 becomes on, the control unit 100A may control the feeding motor 31 and the twisting motor 80 to execute the series of operations of binding the reinforcing bars S with the wire W.

As described with reference to FIGS. 9A and 9B, FIGS. 14A and 14B depict a configuration where the contact member 9B to which the reinforcing bars S are contacted and the connecting part 92B connected to the second guide 52 are constituted by separate components, other than being integrally constituted, and the contact member 9B linearly moves. In this configurations, the first output unit 14A configured to detect that the contact member 9B is moved to the actuation position is provided.

Figure 14A:
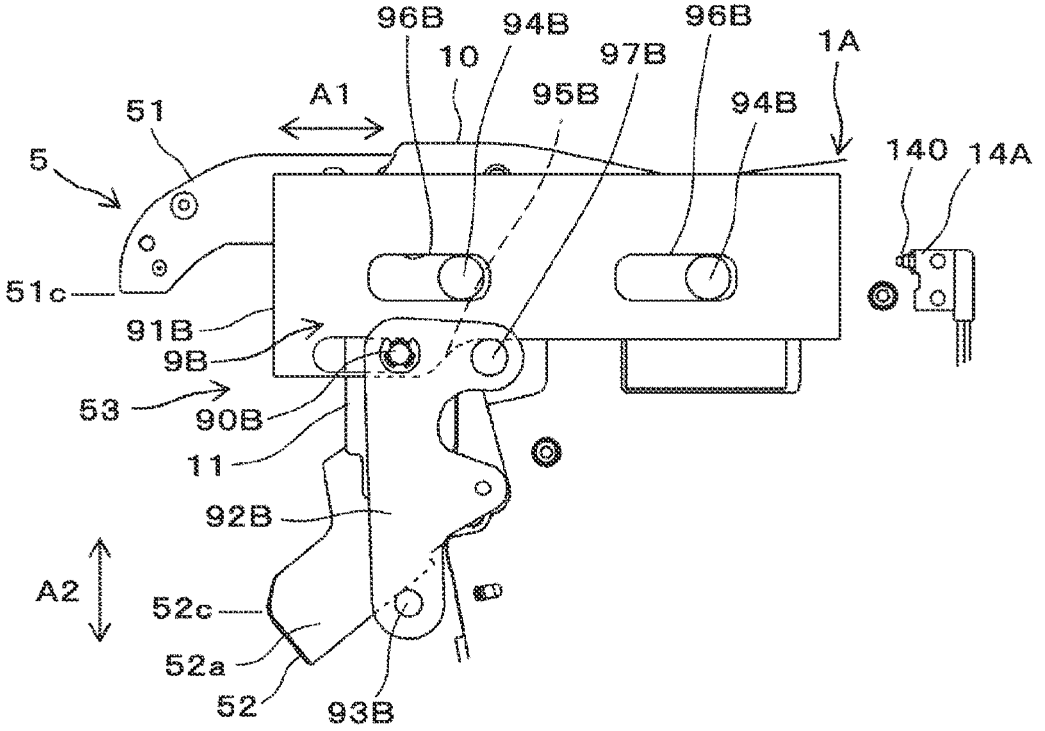
FIG. 14A is a side view depicting a modified embodiment of the output unit configured to detect the contact member.
Figure 14B:
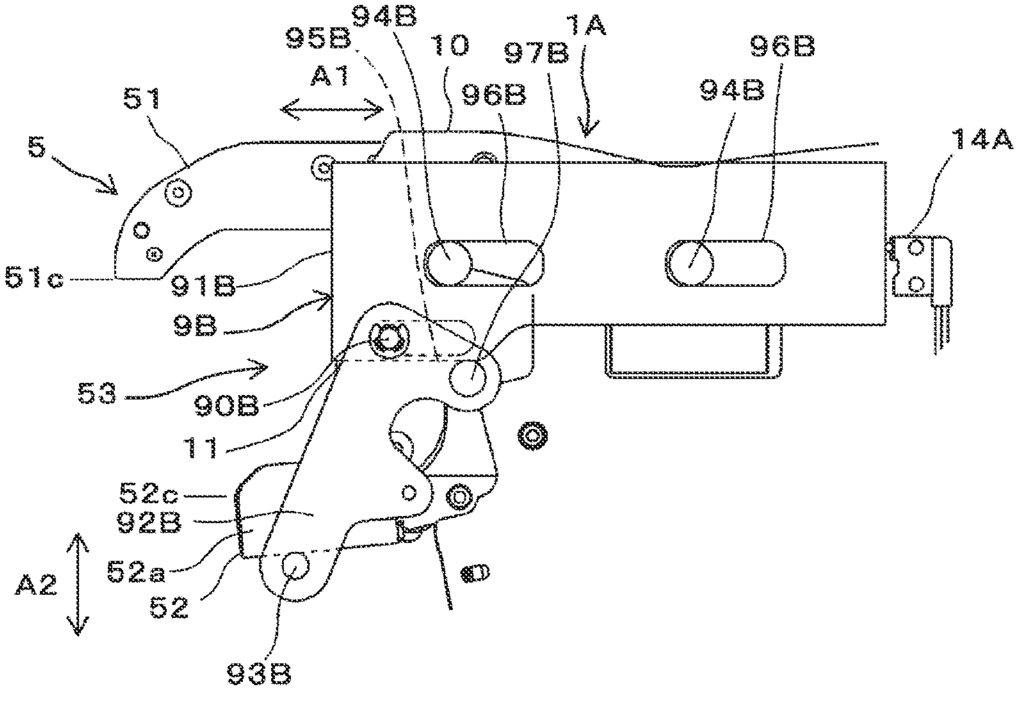
FIG. 14B is a side view depicting the modified embodiment of the output unit configured to detect the contact member.

As shown in FIG. 14A, when the contact member 9B is moved to the standby position, the contact member 9B is moved away from the movable element 140 of the first output unit 14A. In this way, in a state where the contact member 9B is moved to the standby position, the output of the first output unit 14A is set to an off state. In contrast, as shown in FIG. 14B, when the contact member 9B is moved to the actuation position, the contact member 9B is moved in a direction of pushing the movable element 140. In this way, in a state where the contact member 9B is moved to the actuation position, the output of the first output unit 14A is set to an on state.

In a state where the reinforcing bars S are not contacted to the contact parts 91B of the contact member 9B, the contact member 9B is urged in a direction, in which the contact parts 91B protrude from the cover part 11, by the urging member (not shown) and is thus moved to the standby position shown in FIG. 14A. In a state where the contact member 9B is moved to the standby position, the output of the first output unit 14A becomes off. In addition, when the contact member 9B is moved to the standby position, the connecting part 92B can rotate about the shaft 90B as a support point in a direction in which the actuated part 97B is moved following an uneven shape of the actuation part 95B of the contact member 9B and the displacing part 93B gets away from the first guide 51. Thereby, the second guide 52 is moved to the first position.

When the reinforcing bars S are pressed against the contact parts 91B, the contact member 9B is moved to the actuation position along the first direction denoted with the arrow A1, as shown in FIG. 14B. In a state where the contact member 9B is moved to the actuation position, the output of the first output unit 14A becomes on. In addition, when the contact member 9B is moved to the actuation position, the actuated part 97B of the connecting part 92B is moved following an uneven shape of the actuation part 95B of the contact member 9B, and the displacing part 93B is moved toward the first guide 51 by rotation of the connecting part 92B about the shaft 90B as a support point. Thereby, the displacing part 93B pushes the second guide 52, so that the second guide 52 is moved to the second position. Therefore, it is detected that the contact member 9B is moved to the actuation position, so that it can be determined that the second guide 52 is moved to the second position. In this way, the contact of the reinforcing bars S to the contact parts 91B and the movement of the displacing part 93B due to the contact of the reinforcing bars S to the contact parts 91B cause the second guide 52 to move from the first position to the second position.

When the trigger 10*t* is operated and it is thus detected that the output of the second output unit 13 becomes on, in a state where the contact member 9B is moved to the actuation position and it is thus detected that the output of the first output unit 14A becomes on, the control unit 100A shown in FIG. 8 controls the feeding motor 31 and the twisting motor 80 to execute the series of operations of binding the reinforcing bars S with the wire W, as described above. Alternatively, when the contact member 9B is moved to the actuation position and it is thus detected that the output of the first output unit 14A becomes on, in a state where the operator operates the trigger 10*t* and thus the output of the second output unit 13 becomes on, the control unit 100A may control the feeding motor 31 and the twisting motor 80 to execute the series of operations of binding the reinforcing bars S with the wire W.

As described with reference to FIGS. 11A and 11B, FIGS. 15A and 15B depict a configuration where the second guide 52 is moved to the first position and the second position by the rotating operation about the shaft 52*b* as a support point and the second guide 52 is urged in the moving direction from the first position to the second position by the urging member (not shown) and is held at the second position. In this configuration, the first output unit 14A configured to detect that the contact member is moved to the actuation position is provided. Here, the force of urging the contact member 9C in the moving direction to the standby position by the urging member (not shown) is set higher than the force of urging the second guide 52 in the moving direction from the first position to the second position by the urging member (not shown). Thereby, the contact member 9C is held at the standby position and the second guide 52 is also held at the first position.

Figure 15A:
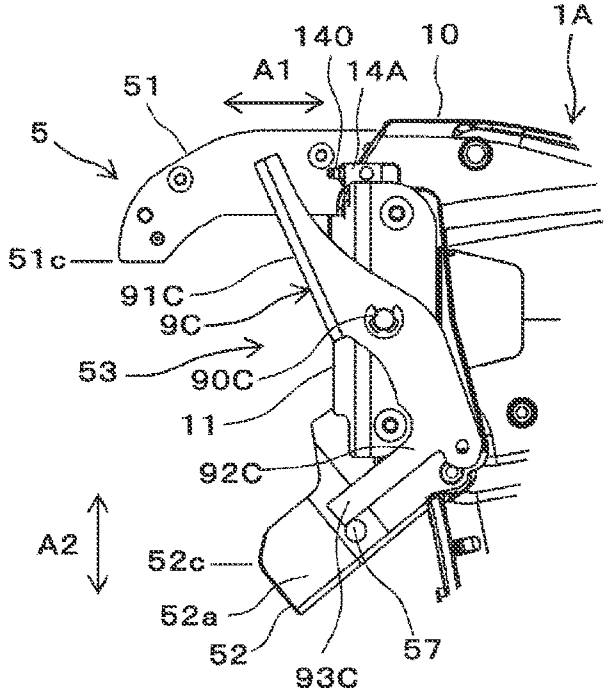
FIG. 15A is a side view depicting a modified embodiment of the output unit configured to detect the contact member.
Figure 15B:
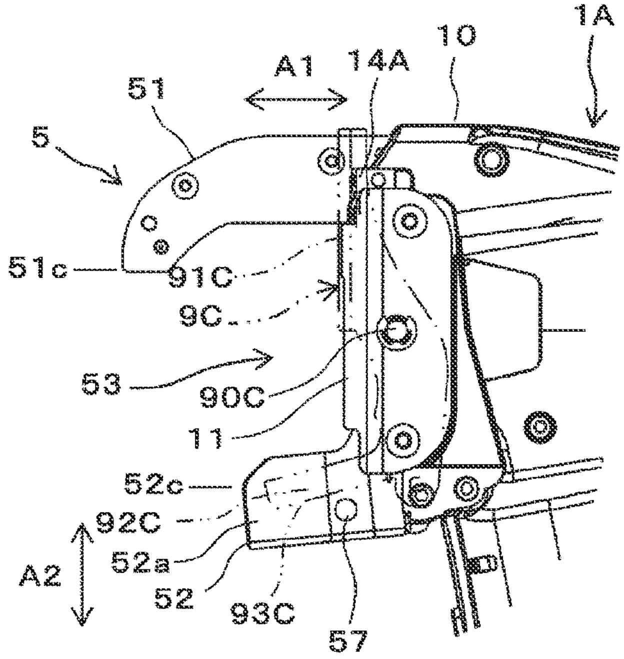
FIG. 15B is a side view depicting the modified embodiment of the output unit configured to detect the contact member.

As shown in FIG. 15A, when the contact member 9C is moved to the standby position, the contact parts 91C of the contact member 9C are moved away from the movable element 140 of the first output unit 14A. In this way, in a state where the contact member 9C is moved to the standby position, the output of the first output unit 14A is set to an off state. In contrast, as shown in FIG. 15B, when the contact member 9C is moved to the actuation position, the contact parts 91C of the contact member 9C are moved in the direction of pushing the movable element 140. In this way, in a state where the contact member 9C is moved to the actuation position, the output of the first output unit 14A is set to an on state.

In a state where the reinforcing bars S are not in contact with the contact parts 91C of the contact member 9C, the contact member 9C is urged in a direction, in which the contact parts 91C protrude from the cover part 11, by the urging member (not shown), and is thus moved to the standby position, as shown in FIG. 15A. In the state where the contact member 9C is moved to the standby position, the output of the first output unit 14A becomes off. In addition, when the contact member 9C is moved to the standby position, the displacing part 93C of the contact member 9C is moved away from the first guide 51. Thereby, the displaced part 57 of the second guide 52 is pushed by the displacing part 93C of the contact member 9C, so that the second guide 52 is moved to the first position.

When the contact parts 91C are pressed against the reinforcing bars S, the contact parts 91C are moved in the first direction denoted with the arrow A1, so that the contact member 9C rotates about the shaft 90C as a support point and moves to the actuation position. In a state where the contact member 9C is moved to the actuation position, the output of the first output unit 14A becomes on. In addition, when the contact member 9C is moved to the actuation position, the displacing part 93C is moved toward the first guide 51 by rotation of the connecting part 92C about the shaft 90C as a support point. Thereby, the second guide 52 is moved to the second position. Therefore, it is detected that the contact member 9C is moved to the actuation position, so that it can be determined that the second guide 52 is moved to the second position. In this way, the contact of the reinforcing bars S to the contact parts 91C, and the movement of the displacing part 93C due to the contact of the reinforcing bars S to the contact parts 91C cause the second guide 52 to move from the first position to the second position.

When the trigger 10*t* is operated and it is thus detected that the output of the second output unit 13 becomes on, in a state where the contact member 9C is moved to the actuation position and it is thus detected that the output of the first output unit 12A becomes on, the control unit 100A shown in FIG. 8 controls the feeding motor 31 and the twisting motor 80 to execute the series of operations of binding the reinforcing bars S with the wire W, as described above. Alternatively, when the contact member 9C is moved to the actuation position and it is thus detected that the output of the first output unit 14A becomes on, in a state where the operator operates the trigger 10*t* and thus the output of the second output unit 13 becomes on, the control unit 100A may control the feeding motor 31 and the twisting motor 80 to execute the series of operations of binding the reinforcing bars S with the wire W.

Note that, in FIGS. 13A, 13B, 14A, 14B, 15A and 15B, the output unit configured to detect that the contact member is moved to the actuation position may also be constituted by the non-contact sensor described with reference to FIGS. 12A and 12B.

Example of Reinforcing Bar Binding Machine of Second Embodiment

Figure 16:
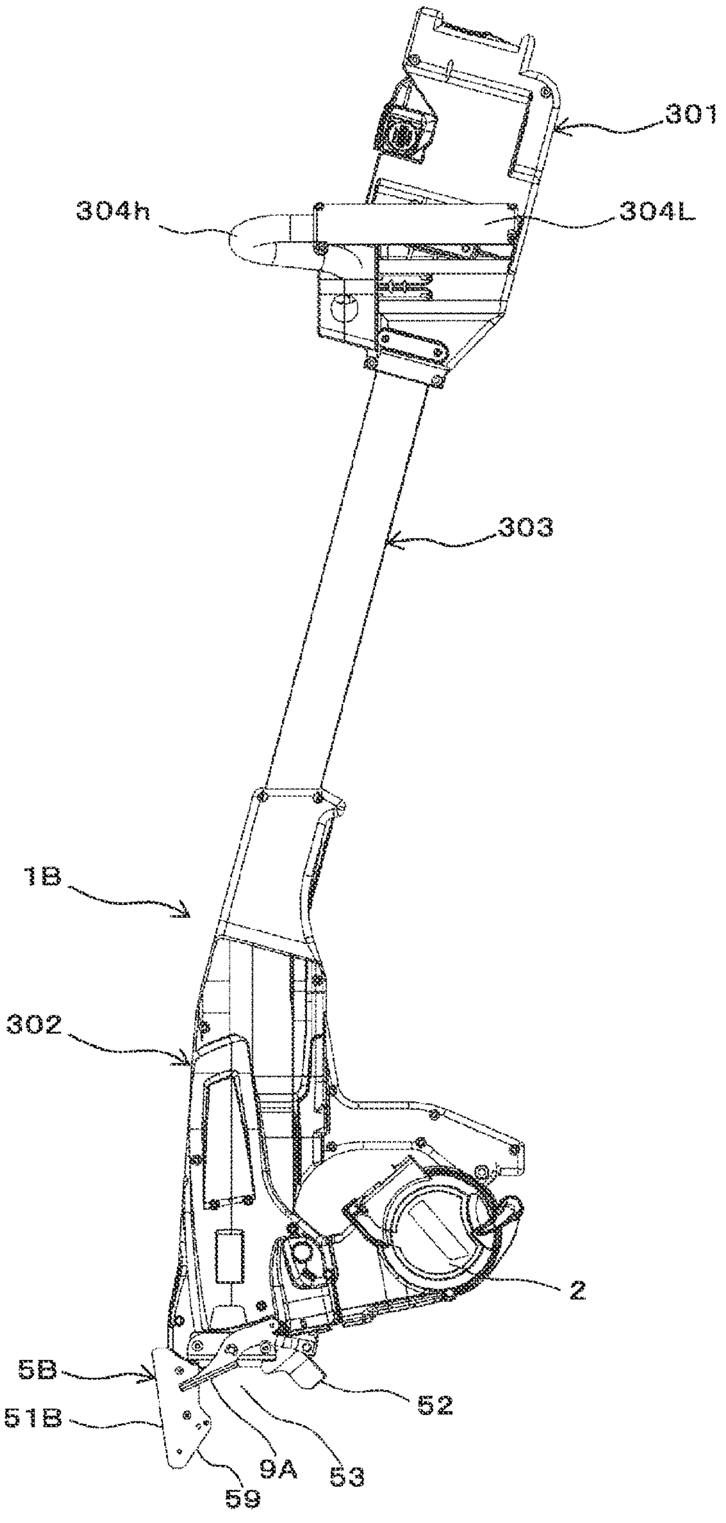
FIG. 16 is a side view depicting an example of an overall configuration of a reinforcing bar binding machine of a second embodiment.
Figure 17:
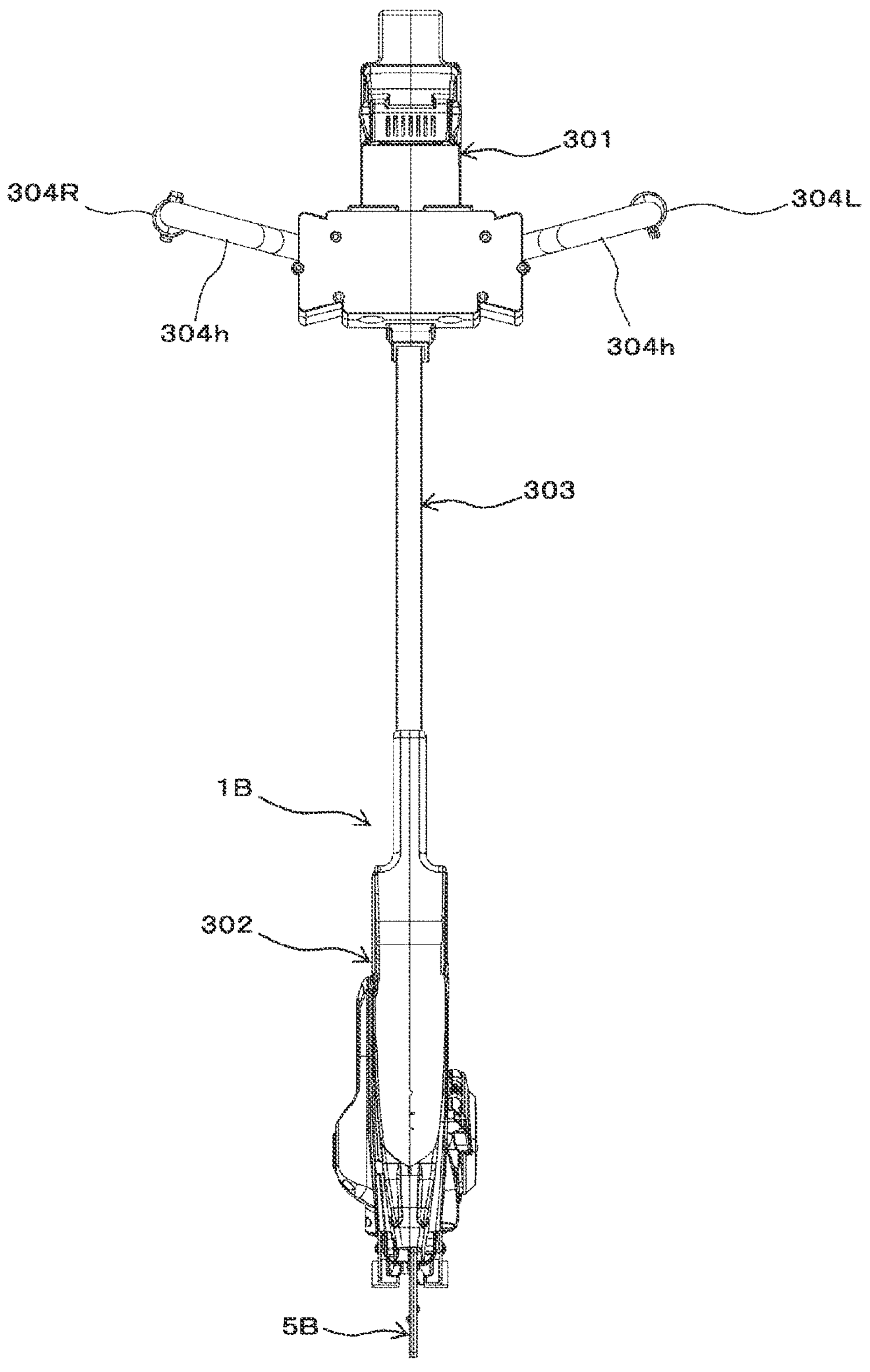
FIG. 17 is a top view depicting the example of the overall configuration of the reinforcing bar binding machine of the second embodiment.
Figure 18:
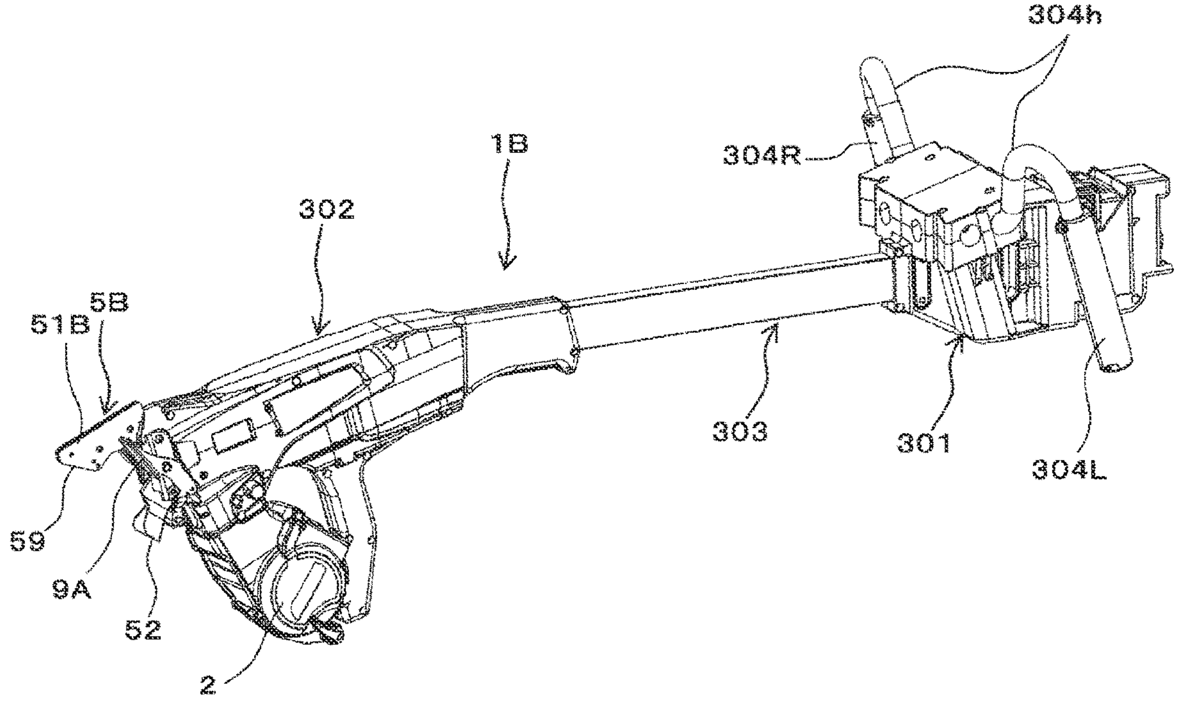
FIG. 18 is a perspective view depicting the example of the overall configuration of the reinforcing bar binding machine of the second embodiment.

FIG. 16 is a side view depicting an example of an overall configuration of a reinforcing bar binding machine of a second embodiment, FIG. 17 is a top view depicting the example of the overall configuration of the reinforcing bar binding machine of the second embodiment, and FIG. 18 is a perspective view depicting the example of the overall configuration of the reinforcing bar binding machine of the second embodiment.

A reinforcing bar binding machine 1B of the second embodiment includes a first body part 301, a second body part 302, and an elongated connecting part 303 configured to connect the first body part 301 and the second body part 302. The first body part 301 includes handle parts 304*h* having a pair of grip parts 304L and 304R that can be grasped by an operator.

Figure 19:
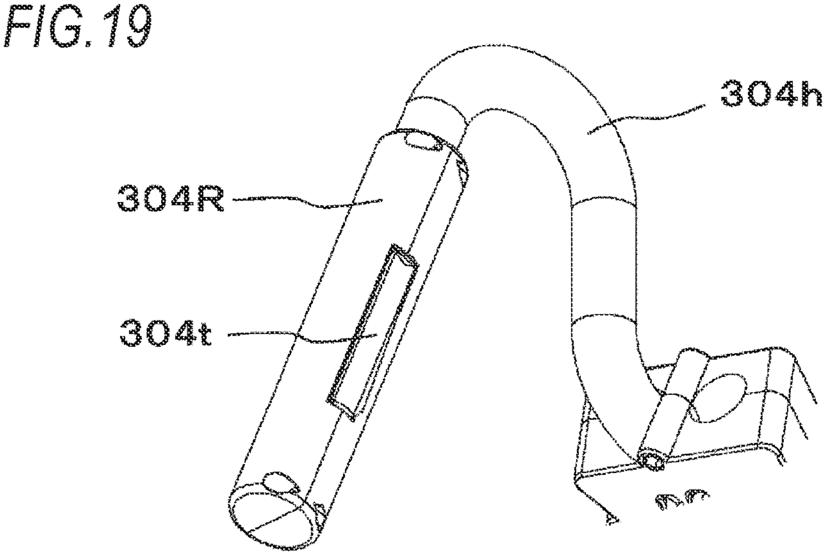
FIG. 19 is a perspective view depicting an example of a handle part.

FIG. 19 is a perspective view depicting an example of the handle part. The handle part 304*h* has an operation part 304*t* provided to the grip part 304R that is mainly grasped with a right hand. The operation part 304*t* is attached to the grip part 304R so as to be rotatable about a shaft (not shown) as a support point, and protrudes from a surface of the grip part 304R. The operation part 304*t* is grasped together with the grip part 304R by the operator, so that it is rotated with respect to the grip part 304R and is thus actuated.

Figure 20:
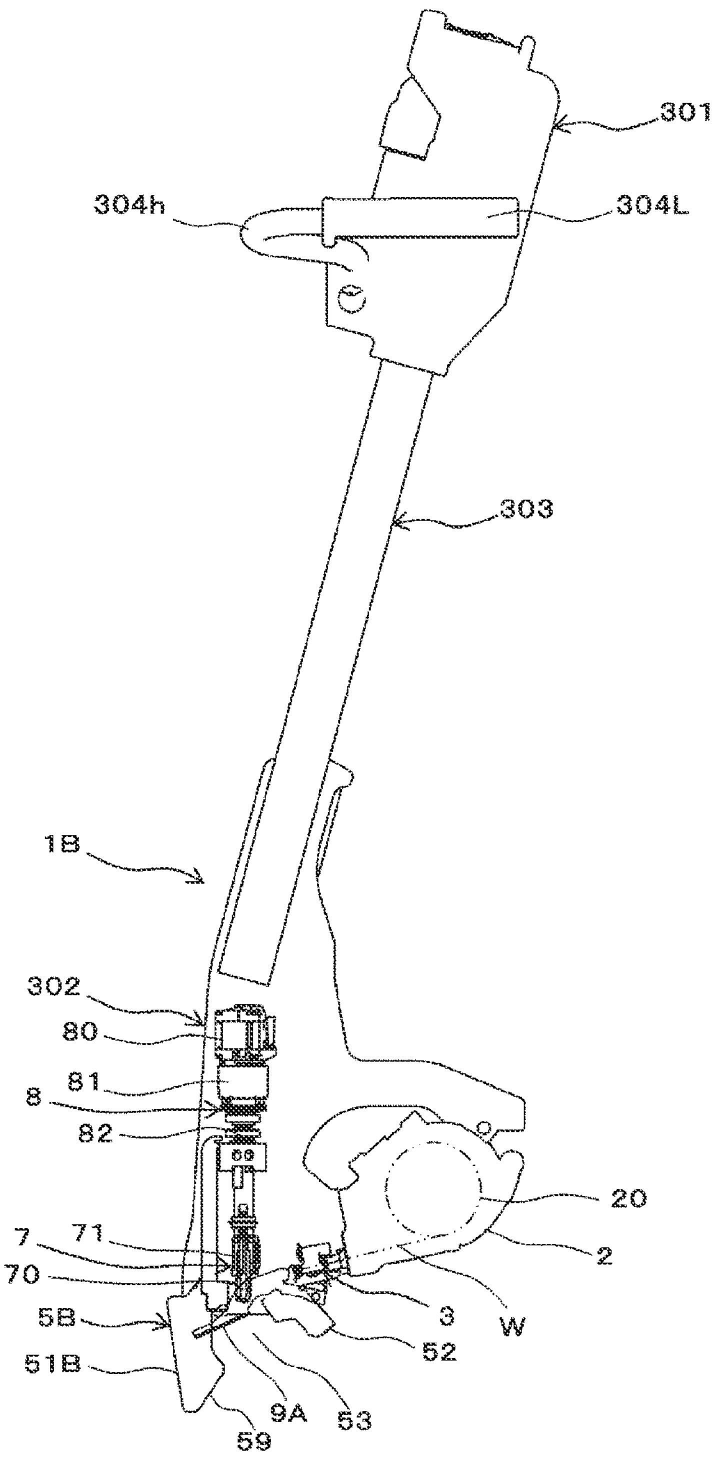
FIG. 20 is a side view depicting an example of an internal configuration of the reinforcing bar binding machine of the second embodiment.
Figure 21:
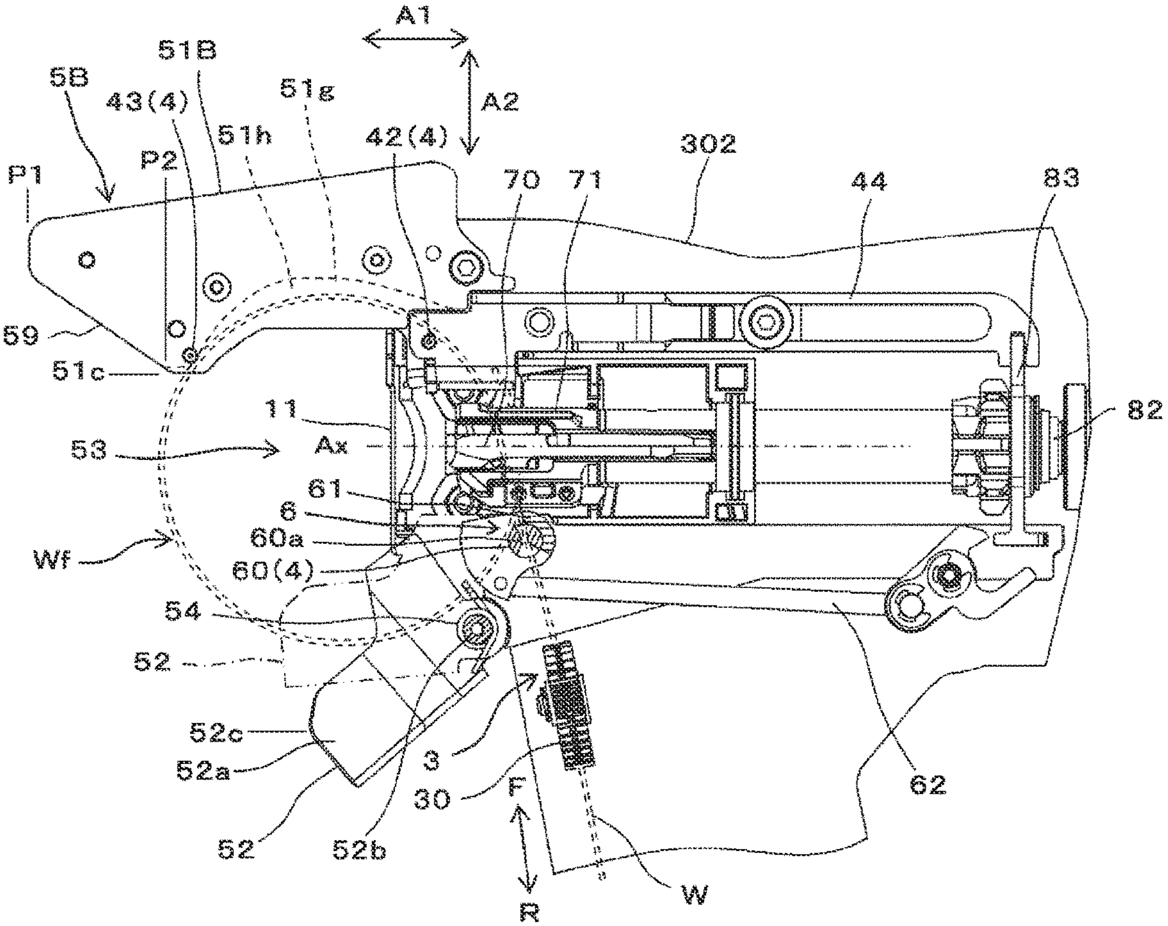
FIG. 21 is a side view depicting main parts of the internal configuration of the reinforcing bar binding machine of the second embodiment.

FIG. 20 is a side view depicting an example of an internal configuration of the reinforcing bar binding machine of the second embodiment, and FIG. 21 is a side view depicting main parts of the internal configuration of the reinforcing bar binding machine of the second embodiment.

The second body part 302 has an accommodation part 2 configured to rotatably accommodate a wire reel 20 on which the wire W is wound, and a feeding unit 3 configured to feed the wire W wound on the wire reel 20 accommodated in the accommodation part 2. The second body part 302 also has a regulation part 4 configured to curl the wire W fed by the feeding unit 3, and a guide part 5 configured to guide the wire W curled by the regulation part 4. The second body part 302 also has a cutting unit 6 configured to cut the wire W, a twisting unit 7 configured to twist the wire W, and a drive unit 8 configured to drive the cutting unit 6, the twisting unit 7, and the like.

In the reinforcing bar binding machine 1B, the guide part 5 is provided on one side of the second body part 302. In the present embodiment, the side on which the guide part 5 is provided is defined as the front. In the reinforcing bar binding machine 1B, the first body part 301 and the second body part 302 are connected by the connecting part 303, so that the guide part 5 and the handle part 304*h* are extended therebetween, as compared to a reinforcing bar binding machine with no connecting part 303.

The accommodation part 2 is configured so that the wire reel 20 can be attached/detached and supported. The feeding unit 3 has a pair of feeding gears 30 as a feeding member. When a motor (not shown) rotates the feeding gears 30 in a state where the wire W is sandwiched between the pair of feeding gears 30, the feeding unit 3 feeds the wire W. The feeding unit 3 can feed the wire W in a forward direction denoted with an arrow F and in a reverse direction denoted with an arrow R, according to a rotating direction of the feeding gears 30.

The cutting unit 6 is provided downstream of the feeding unit 3 with respect to the feeding of the wire W in the forward direction denoted with the arrow F. The cutting unit 6 has a fixed blade part 60, and a movable blade part 61 configured to cut the wire W in cooperation with the fixed blade part 60. The cutting unit 6 also has a transmission mechanism 62 configured to transmit motion of the drive unit 8 to the movable blade part 61.

The fixed blade part 60 has an opening 60*a* through which the wire W passes. The movable blade part 61 is configured to cut the wire W passing through the opening 60*a* of the fixed blade part 60 by a rotating operation about the fixed blade part 60 as a support point.

The regulation part 4 has a first regulation member to a third regulation member in contact with the wire W at a plurality of parts, in the present example, at least three places in a feeding direction of the wire W fed by the feeding unit 3, thereby curling the wire W along a feeding path Wf of the wire W shown with the broken line in FIG. 21.

The first regulation member of the regulation part 4 is constituted by the fixed blade part 60. The regulation part 4 also has a regulation member 42 as the second regulation member provided downstream of the fixed blade part 60 with respect to the feeding of the wire W in the forward direction denoted with the arrow F, and a regulation member 43 as the third regulation member provided downstream of the regulation member 42. The regulation member 42 and the regulation member 43 are each constituted by a cylindrical member, and the wire W is in contact with outer peripheral surfaces thereof.

In the regulation part 4, the fixed blade part 60, the regulation member 42 and the regulation member 43 are arranged on a curve in conformity to the spiral feeding path Wf of the wire W. The opening 60*a* of the fixed blade part 60 through which the wire W passes is provided on the feeding path Wf of the wire W. The regulation member 42 is provided on a diametrically inner side with respect to the feeding path Wf of the wire W. The regulation member 43 is provided on a diametrically outer side with respect to the feeding path Wf of the wire W.

Thereby, the wire W fed by the feeding unit 3 passes in contact with the fixed blade part 60, the regulation member 42 and the regulation member 43, so that the wire W is curled to follow the feeding path Wf of the wire W.

The regulation part 4 has a transmission mechanism 44 configured to transmit motion of the drive unit 8 to the regulation member 42. In operations of feeding the wire Win the forward direction by the feeding unit 3 and curling the wire W, the regulation member 42 is configured to move to a position at which it contacts the wire W, and in operations of feeding the wire W in the reverse direction and winding the wire W on the reinforcing bars S, the regulation member 42 is configured to move to a position at which it does not contact the wire W.

Figure 22A:
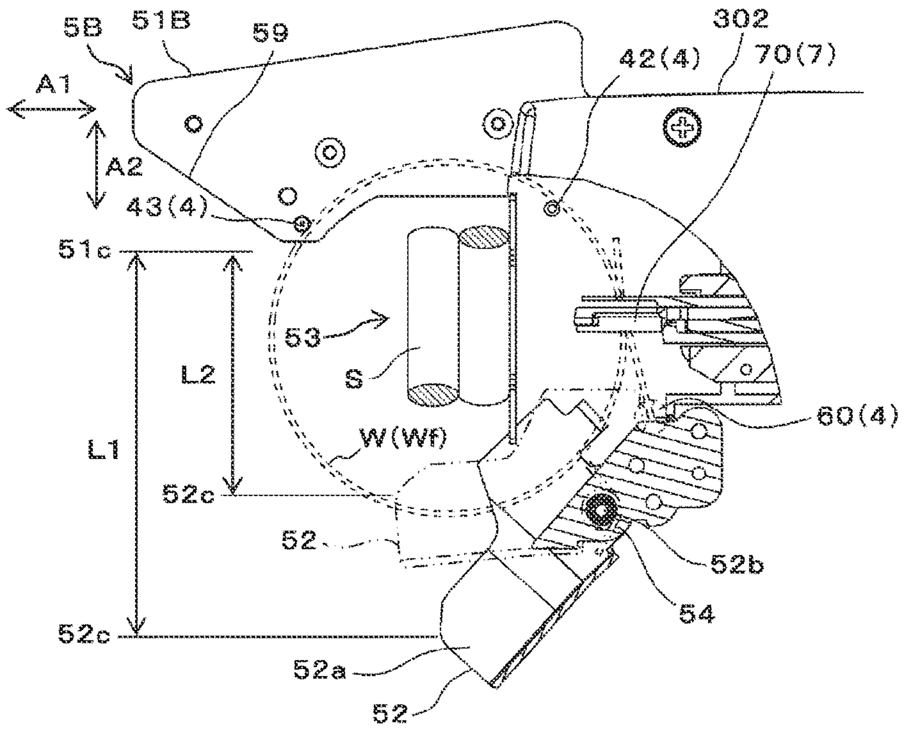
FIG. 22A is a side view depicting an example of the guide part.
Figure 22B:
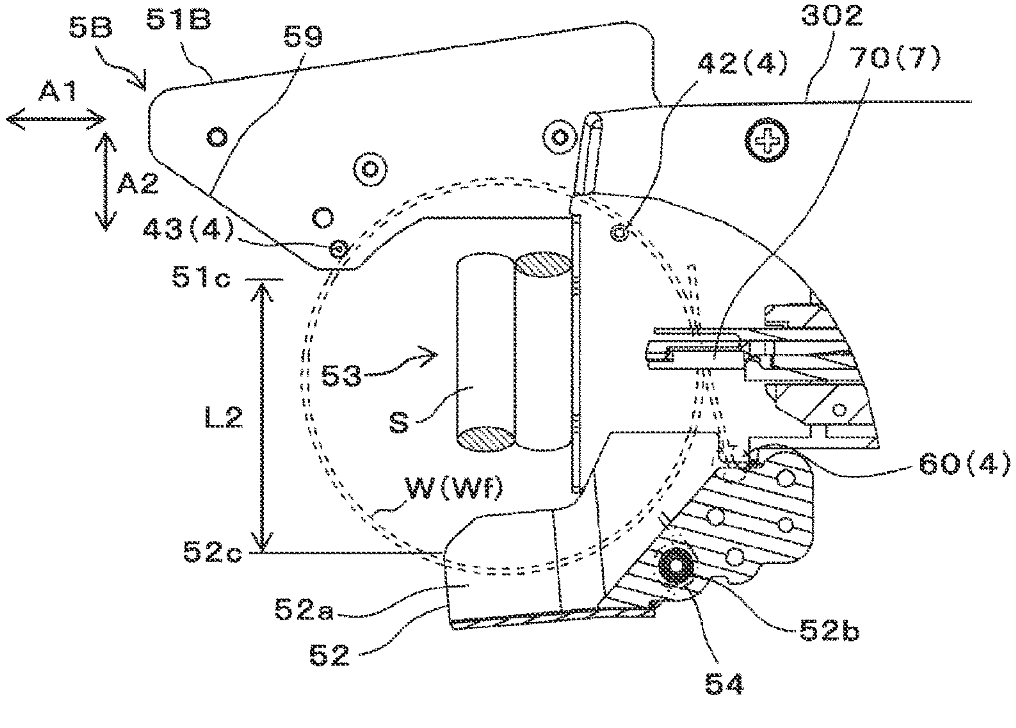
FIG. 22B is a side view depicting the example of the guide part.
Figure 23:
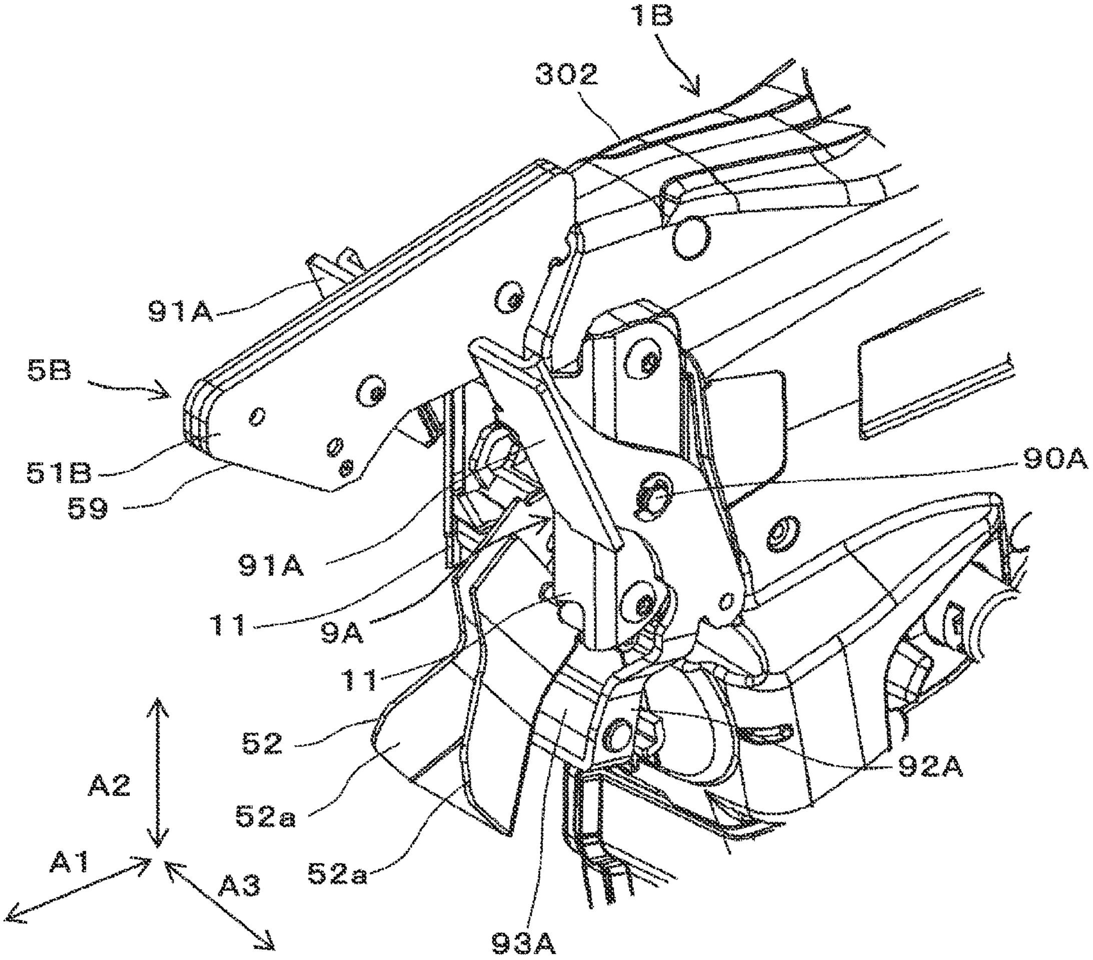
FIG. 23 is a perspective view depicting an example of the guide part and the contact member.

FIGS. 22A and 22B are side views depicting an example of the guide part, FIG. 23 is a perspective view depicting an example of the guide part and a contact member, and FIGS.

24A and 24B are side views depicting an example of the contact member. In the below, a configuration for actuating the pair of guides and operational effects are described.

A guide part 5B has a first guide 51B provided with the regulation member 43 of the regulation part 4 and configured to guide the wire W, and a second guide 52 configured to guide the wire W curled by the regulation part 4 and the first guide 51B to the twisting unit 7.

The first guide 51B is attached to an end portion on a front side of the second body part 302, and extends in a first direction denoted with an arrow A1. As shown in FIG. 21, the first guide 51B has a groove portion 51*h* having a guide surface 51*g* with which the wire W fed by the feeding unit 3 is in sliding contact. As for the first guide 51B, when a side attached to the second body part 302 is referred to as a base end-side and a side extending in the first direction from the second body part 302 is referred to as a tip end-side, the regulation member 42 is provided to the base end-side of the first guide 51B and the regulation member 43 is provided to the tip end-side of the first guide 51B. The base end-side of the first guide 51B is fixed to a metal part of the second body part 302 by a screw or the like. As used herein, the fixing does not mean fixing in a strict sense but includes slight movement. A gap through which the wire W can pass is formed between the guide surface 51*g* of the first guide 51B and the outer peripheral surface of the regulation member 42. A part of the outer peripheral surface of the regulation member 43 protrudes toward the guide surface 51*g* of the first guide 51.

The second guide 52 is attached to an end portion on the front side of the second body part 302. The second guide 52 is provided facing the first guide 51B in a second direction orthogonal to the first direction and denoted with an arrow A2. The first guide 51B and the second guide 52 are spaced by a predetermined interval in the second direction, and an insertion/pulling-out opening 53 in and from which the reinforcing bars S are inserted/pulled out is formed between the first guide 51B and the second guide 52, as shown in FIGS. 22A and 22B.

The guide part 5B has an induction part 59 configured to guide the reinforcing bars S to the insertion/pulling-out opening 53. The induction part 59 is provided on the tip end-side of the first guide 51B, and is provided with a surface along which an interval between the first guide 51B and the second guide 52 decreases from a tip end-side toward a base end-side of the induction part 59. Specifically, as shown in FIG. 21, the induction part 59 is constituted by an inclined surface inclined relative to the first direction denoted with the arrow A1 in a direction in which the interval between the first guide 51B and the second guide 52 decreases, from a tip end P1 of the first guide 51B toward a vicinity of an end portion P2 of the groove portion 51*h* on the tip end-side of the first guide 51B.

As shown in FIG. 23, the second guide 52 has a pair of side guides 52*a* facing each other in a third direction denoted with an arrow A3 orthogonal to the first direction and the second direction. As for the second guide 52, when a side attached to the second body part 302 is referred to as a base end-side and a side extending in the first direction from the second body part 302 is referred to as a tip end-side, a gap between the pair of side guides 52*a* gradually decreases from the tip end-side toward the base end-side. In the pair of side guides 52*a*, the base end-sides face each other with a gap through which the wire W can pass.

The second guide 52 is attached to the second body part 302 with being supported on the base end-side by a shaft 52*b*. An axis line of the shaft 52*b* faces toward the third direction. The second guide 52 can rotate about the shaft 52*b* as a support point with respect to the second body part 302. The second guide 52 can move in directions in which an end portion 52*c* on the tip end-side comes close to and gets away from an end portion 51*c* of the first guide 51B facing the second guide 52 in the second direction denoted with the arrow A2.

The end portion P2 of the groove portion 51*h* is exposed to the end portion 51*c* of the first guide 51B.

The second guide 52 is configured to rotate about the shaft 52*b* as a support point, thereby moving between a first position (refer to the solid line in FIG. 22A) at which a distance between the end portion 52*c* of the second guide 52 and the end portion 51*c* of the first guide 51B is a first distance L1 and a second position (refer to the dashed-two dotted line in FIG. 22A and the solid line in FIG. 22B) at which the distance between the end portion 52*c* of the second guide 52 and the end portion 51*c* of the first guide 51B is a second distance L2 shorter than the first distance L1.

In a state where the second guide 52 is located at the second position, the end portion 52*c* of the second guide 52 and the end portion 51*c* of the first guide 51B are opened therebetween. In a state where the second guide 52 is located at the first position, the interval between the end portion 52*c* of the second guide 52 and the end portion 51*c* of the first guide 51B is larger, so that the reinforcing bars S can be more easily inserted into the insertion/pulling-out opening 53 between the first guide 51B and the second guide 52.

In the state where the second guide 52 is located at the second position, the side guides 52*a* are positioned on the feeding path Wf of the wire W shown with the broken line in FIGS. 22A and 22B. In the state where the second guide 52 is located at the first position, as long as the interval between the end portion 52*c* of the second guide 52 and the end portion 51*c* of the first guide 51B is greater than the case where the second guide 52 is located at the second position, the side guides 52*a* may be positioned on the feeding path Wf of the wire W or the side guides 52*a* may be positioned on an outermore side than the feeding path Wf of the wire W, as shown with the solid line in FIG. 22A.

The second guide 52 is urged in a moving direction to the first position by an urging member 54 such as a tortional coil spring and is held at the first position.

The reinforcing bar binding machine 1B includes a contact member 9A configured to actuate the second guide 52 as the reinforcing bars S inserted in the insertion/pulling-out opening 53 between the first guide 51B and the second guide 52 are contacted thereto. The reinforcing bar binding machine 1B also includes a cover part 11 configured to cover the end portion on the front side of the second body part 302.

The cover part 11 is attached from the end portion on the front side of the second body part 302 over both left and right sides of the second body part 302 in the third direction. The cover part 11 is constituted by a metal plate or the like, and has a shape to cover a portion or all of the end portion on the front side of the second body part 302 and portions of both left and right sides on the front side of the second body part 302, between the base end-side of the first guide 51B and the base end-side of the second guide 52. While the second body part 302 is made of resin, the cover part 11 is made of metal, so that even when the contact member 9A and the reinforcing bars S are contacted to the cover part 11 made of metal, the wear of the cover part 11 can be reduced.

The contact member 9A is an example of the guide moving part, is rotatably supported by the shaft 90A and is attached to the second body part 302 via the cover part 11.

The contact member 9A has a bent shape, and has contact parts 91A provided on one side with respect to the shaft 90A and to be contacted to the reinforcing bars S and a connecting part 92A provided on the other side with respect to the shaft 90A and connected to the second guide 52. Specifically, the contact parts 91A are provided on one side with respect to the shaft 90A in the second direction, and the connecting part 92A is provided on the other side.

The contact member 9A has the shaft 90A provided adjacent to a center between the first guide 51B and the second guide 52. The contact member 9A also has a pair of contact parts 91A provided with an interval, through which the wire W binding the reinforcing bars S can pass, in the third direction denoted with the arrow A3 from the vicinity of a part supported by the shaft 90A toward the first guide 51B-side. The contact parts 91A extend to both left and right sides of the first guide 51B.

The contact member 9A also has the connecting part 92A provided from the part supported by the shaft 90A toward the second guide 52-side, and a displacing part 93A in contact with a part on an opposite side to a side of the second guide 52 facing the first guide 51B is provided on a tip end-side of the connecting part 92A.

The contact member 9A is configured to rotate about the shaft 90A as a support point with respect to the second body part 302, thereby moving between a standby position (FIG. 24A) at which the contact parts 91A protrude from the cover part 11 into the insertion/pulling-out opening 53 and an actuation position (FIG. 24B) at which the contact parts 91A come close to the cover part 11.

Figure 24A:
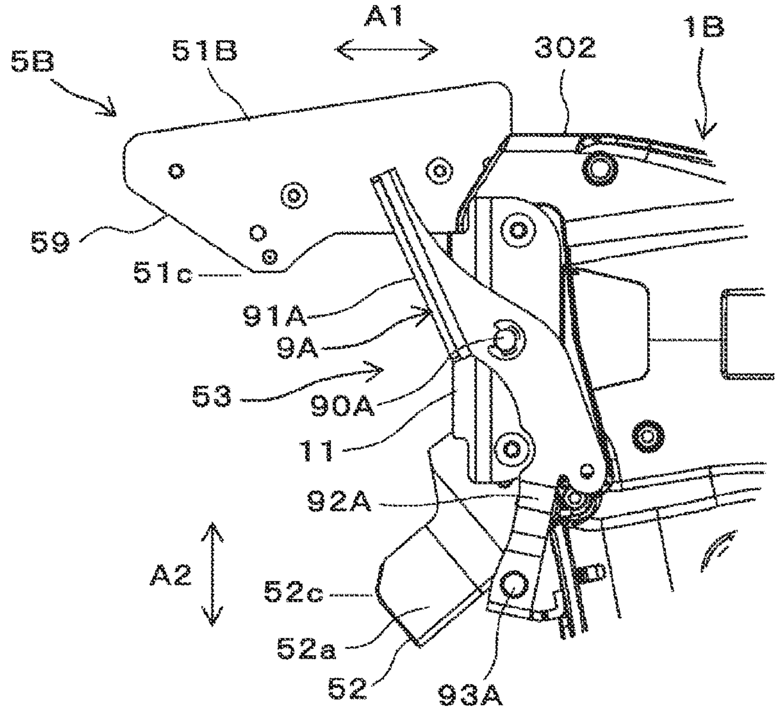
FIG. 24A is a side view depicting an example of the contact member.
Figure 24B:
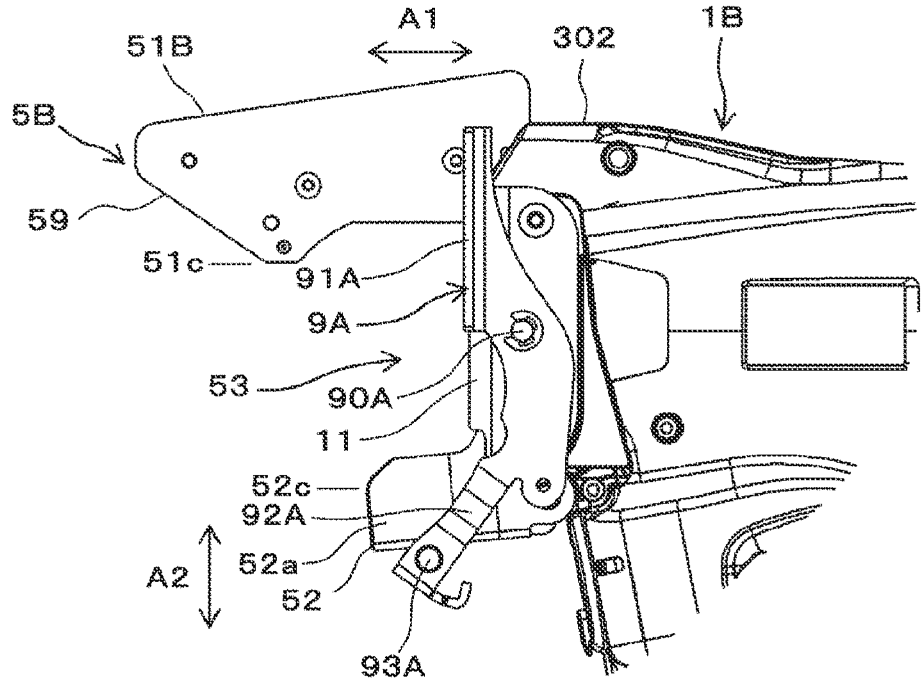
FIG. 24B is a side view depicting the example of the contact member.

In a state where the contact member 9A is moved to the actuation position shown in FIG. 24B, the contact member 9A has such a shape that the contact parts 91A extend from the shaft 90A toward the first guide 51B along the second direction denoted with the arrow A2. Therefore, the rotation of the contact member 9A about the shaft 90A as a support point causes the contact parts 91A to move in the first direction denoted with the arrow A1 along an arc whose center is the shaft 90A. During an operation of inserting the reinforcing bars S into the insertion/pulling-out opening 53 between the first guide 51B and the second guide 52, the reinforcing bar binding machine 1B is moved in the first direction denoted with the arrow A1. Due to the relative movement of the reinforcing bar binding machine 1B and the reinforcing bars S, the contact parts 91A are pushed by a force along the first direction denoted with the arrow A1, so that the contact member 9A is moved to the actuation position. Thereby, a moving direction of the contact parts 91A due to the rotation about the shaft 90A as a support point is determined as a direction along the direction of the force by which the reinforcing bars S push the contact parts 91A by the relative movement of the reinforcing bar binding machine 1B and the reinforcing bars S. Also, in a state where the contact member is moved to the actuation position shown in FIG. 24B, the contact member 9A has such a shape that the connecting part 92A is tilted forward from the shaft 90A with respect to the contact parts 91A and extends toward the second guide 52. Therefore, the rotation of the contact member 9A about the shaft 90A as a support point causes the displacing part 93A to move in the second direction denoted with the arrow A2 along an arc whose center is the shaft 90A. Thereby, in a state where the contact member 9A is urged by the urging member 54 and the second guide 52 is thus located at the first position, the displacing part 93A is pushed away from the first guide 51B by the second guide 52. For this reason, the contact member 9A is moved to the standby position by the rotation about the shaft 90A as a support point, so that the contact parts 91A protrude from the cover part 11. Note that, in the present example, the contact member 9A is configured to move by the force of the urging member 54 for urging the second guide 52. However, another urging member for urging the contact member 9A may also be provided.

When the contact parts 91A are pressed against the reinforcing bars S, the contact parts 91A of the contact member 9A are moved in the first direction. Thereby, the contact member 9A rotates about the shaft 90A as a support point and moves to the actuation position. When the contact member 9A is moved to the actuation position, the displacing part 93A is moved toward the first guide 51B by the rotation of the connecting part 92A about the shaft 90A as a support point. Thereby, the displacing part 93A pushes the second guide 52, so that the second guide 52 is moved to the second position. In this way, the contact of the reinforcing bars S to the contact parts 91A, and the movement of the displacing part 93A due to the contact of the reinforcing bars S to the contact parts 91A cause the second guide 52 to move from the first position to the second position.

The reinforcing bar binding machine 1B includes a first output unit 12A having a similar configuration to the configuration described with reference to FIG. 7 and configured to detect that the second guide 52 is moved to the second position. Note that, a first output unit 14A having a configuration equivalent to the configuration described with reference to FIGS. 12A and 12B and configured to detect that the second guide 52 is moved to the second position by a non-contact sensor may be provided.

Subsequently, the twisting unit 7 and the drive unit 8 are described with reference to each drawing. The twisting unit 7 includes an engaging part 70 to which the wire W is engaged, and an actuation part 71 configured to actuate the engaging part 70. The engaging part 70 is configured to rotate by an operation of the actuation part 71, thereby twisting the wire W wound on the reinforcing bars S.

The drive unit 8 includes a twisting motor 80 configured to drive the twisting unit 7 and the like, a decelerator 81 configured to perform deceleration and torque amplification, a rotary shaft 82 configured to drive and rotate via the decelerator 81 by the twisting motor 80, and a movable member 83 configured to transmit a drive force to the cutting unit 6 and the regulation member 42. The twisting unit 7 and the drive unit 8 are arranged so that centers of rotation of the rotary shaft 82, the actuation part 71 and the engaging part 70 are on the same axis. The centers of rotation of the rotary shaft 82, the actuation part 71 and the engaging part 70 are referred to as an axis line Ax.

The engaging part 70 is formed with a first passage through which the wire W fed to the cutting unit 6 by the feeding unit 3 passes, and a second passage through which the wire W curled by the regulation part 4 and guided to the twisting unit 7 by the guide part 5 passes.

The drive unit 8 is configured to move the actuation part 71 along an axis direction of the rotary shaft 82 by a rotating operation of the rotary shaft 82. The actuation part 71 is moved along the axis direction of the rotary shaft 82, so that the engaging part 70 holds a tip end-side of the wire W guided to the twisting unit 7 by the guide part 5.

In the drive unit 8, the movable member 83 is configured to move along the axis direction of the rotary shaft 82 in conjunction with the moving operation of the actuation part 71 along the axis direction of the rotary shaft 82, so that the motion of the movable member 83 is transmitted to the regulation member 42 by the transmission mechanism 44 and the regulation member 42 is thus moved to a position at which it does not contact the wire. In addition, the actuation part 71 is configured to move along the axis direction of the rotary shaft 82, so that the motion of the movable member 83 is transmitted to the movable blade part 61 by the transmission mechanism 62 and the movable blade part 61 is thus actuated to cut the wire W.

The drive unit 8 is configured to rotate the actuation part 71 moved along the axis direction of the rotary shaft 82 by the rotating operation of the rotary shaft 82. The actuation part 71 is configured to rotate about the axis of the rotary shaft 82, thereby twisting the wire W by the engaging part 70.

FIG. 8 is a functional block diagram of the reinforcing bar binding machine of the second embodiment. In the reinforcing bar binding machine 1B, a control unit 100B is configured to detect outputs of the first output unit 12A configured to be actuated as the contact member 9A is pressed against the reinforcing bars S, and a second output unit 15 configured to be actuated as the trigger 10*t* is operated. The control unit 100B is configured to control the feeding motor 31 configured to drive the feeding gears 30 and the twisting motor 80 configured to drive the twisting unit 7 and the like, in response to the outputs of the first output unit 12A and the second output unit 15, thereby executing a series of operations of binding the reinforcing bars S with the wire W.

Subsequently, operations of binding the reinforcing bars S with the wire W by the reinforcing bar binding machine 1B are described. The operator grips the handle parts 304*h* of the reinforcing bar binding machine 1B with both hands. That is, the operator grasps the grip part 304R of the handle part 304*h* with a right hand and grasps the grip part 304L of the handle part 304*h* with a left hand.

When the operation part 304*t* is grasped together with the grip part 304R by the operator, the operation part 304*t* rotates with respect to the grip part 304R and is thus actuated. When the operation part 304*t* is actuated, the output of the second output unit 15 becomes on, and the control unit 100B detects that the output of the second output unit 15 becomes on.

The operator grips the handle parts 304*h* of the reinforcing bar binding machine 1B with both hands, aligns a position of the guide part 5B with an intersection point of the two reinforcing bars S, and inserts the reinforcing bars S into the insertion/pulling-out opening 53.

In order to bind the reinforcing bars S at the feet of the operator, the reinforcing bar binding machine 1B is used with the guide part 5B facing downward in a state where the operator stands. In the state where the second guide 52 is moved to the second position, the interval of the insertion/pulling-out opening 53 in the second direction denoted with the arrow A2 is narrower, as compared to the state where the second guide 52 is moved to the first position. For this reason, when inserting the reinforcing bars S, it is difficult to insert the reinforcing bars S into the insertion/pulling-out opening 53 in a binding machine of the related art where the second guide 52 has been moved to the second position. Therefore, according to the reinforcing bar binding machine 1B, in a state where the reinforcing bars S are not inserted in the insertion/pulling-out opening 53, as shown in FIG. 24A, the second guide 52 is moved to the first position, so that an interval between the end portion 52*c* of the second guide 52 and the end portion 51*c* of the first guide 51A increases. In addition, according to the reinforcing bar binding machine 1B, the tip end-side of the first guide 51B is provided with the induction part 59 having a shape capable of guiding the reinforcing bars S into the insertion/pulling-out opening 53. Thereby, since the operator can cause the reinforcing bars S to butt against the induction part 59 and the induction part 59 to slide on the reinforcing bars S, it is easier to insert the reinforcing bars S into the insertion/pulling-out opening 53.

The operator presses the reinforcing bars S against the contact parts 91A of the contact member 9A by an operation of moving the reinforcing bar binding machine 1B in the direction of inserting the reinforcing bars S into the insertion/pulling-out opening 53.

Due to the operation of moving the reinforcing bar binding machine 1B in the direction of inserting the reinforcing bars S into the insertion/pulling-out opening 53, the contact member 9A is applied with a force along the moving direction of the reinforcing bar binding machine 1B, so that the contact parts 91A are pushed. Thereby, the contact parts 91A are moved in the first direction denoted with the arrow A1, so that the contact member 9A rotates about the shaft 90A as a support point, thereby moving to the actuation position, as shown in FIG. 24B.

When the two intersecting reinforcing bars S are inserted into the insertion/pulling-out opening 53, one reinforcing bar S is located at one side part of the first guide 51B and the other reinforcing bar S is located at the other side part of the first guide 51B. In contrast, the pair of contact parts 91A of the contact member 9A extends from between the first guide 51B and the second guide 52 toward both left and right sides of the first guide 51B. Thereby, the reinforcing bars S inserted in the insertion/pulling-out opening 53 are securely contacted to the contact parts 91A, so that the contact member 9A can be moved to the actuation position. In addition, the contact parts 91A of the contact member 9A are moved in the first direction denoted with the arrow A1 by the rotating operation about the shaft 90A as a support point. Thereby, the contact parts 91A can be pushed by the operation of moving the reinforcing bar binding machine 1B in the direction of inserting the reinforcing bars S into the insertion/pulling-out opening 53, and it is not necessary to move the reinforcing bar binding machine 1B in another direction so as to actuate the contact member 9A.

When the contact member 9A is moved to the actuation position, the rotation of the connecting part 92A about the shaft 90A as a support point causes the displacing part 93A to push the second guide 52 toward the first guide 51B, so that the second guide 52 is moved to the second position.

When the second guide 52 is moved to the second position, the output of the first output unit 12A becomes on, and the control unit 100B detects that the output of the first output unit 12A becomes on.

When it is detected that the output of the first output unit 12A becomes on, in a state where it is detected that the output of the second output unit 15, the control unit 100B controls the feeding motor 31 and the twisting motor 80 to execute the series of operations of binding the reinforcing bars S with the wire W. Alternatively, when the grip part 304R is grasped by the operator, so that the operation part 304*t* is actuated and the output of the second output unit 15 becomes on, in a state where the operation of pressing the reinforcing bars S against the contact parts 91A of the contact member 9A is performed and it is thus detected that the output of the first output unit 12A becomes on, the control unit may control the feeding motor 31 and the twisting motor 80 to execute a series of operations of binding the reinforcing bars S with the wire W. Note that, the operation part 304*t* and the second output unit 15 may not be provided, and when the operation of pressing the reinforcing bars S against the contact parts 91A of the contact member 9A is performed and it is thus detected that the output of the first output unit 12A becomes on, the control unit may control the feeding motor 31 and the twisting motor 80 to execute the series of operations of binding the reinforcing bars S with the wire W.

An example of the series of operations of binding the reinforcing bars S with the wire W is described. The feeding motor 31 is rotated in the forward direction and the feeding gears 30 are thus rotated in the forward direction, so that the wire W is fed in the forward direction denoted with the arrow F. The wire W fed in the forward direction by the feeding unit 3 passes through the fixed blade part 60, which is the first regulation member constituting the regulation part 4, and the regulation member 42 that is the second regulation member. The wire W having passed through the regulation member 42 is contacted to the guide surface 51*g* of the first guide 51B and is thus guided to the regulation member 43 that is the third regulation member.

Thereby, the wire W fed in the forward direction by the feeding unit 3 is contacted to the fixed blade part 60, the regulation member 42, the regulation member 43, and the guide surface 51*g* of the first guide 51B and is thus bent into an arc shape. Then, the wire W fed in the forward direction by the feeding unit 3 is contacted to the fixed blade part 60 and the regulation member 43 from an outer periphery direction of the arc shape and is contacted to the regulation member 42 between the fixed blade part 60 and the regulation member 43 from an inner periphery direction of the arc shape, so that a substantially circular curl is formed.

The end portion 51*c* of the first guide 51B and the end portion 52*c* of the second guide 52 are spaced by a predetermined interval in a state where the second guide 52 is moved to the second position. However, in the state where the second guide 52 is moved to the second position, the pair of side guides 52*a* is positioned on the feeding path Wf of the wire W, and the wire W fed in the forward direction by the feeding unit 3 is curled by the regulation part 4, as described above, so that the wire is guided between the pair of side guides 52*a* of the second guide 52.

The wire W guided between the pair of side guides 52*a* of the second guide 52 is fed in the forward direction by the feeding unit 3, so that the wire is guided to the engaging part 70 of the twisting unit 7 by the pair of side guides 52*a* of the second guide 52. Then, when it is determined that a tip end portion of the wire W is fed to a predetermined position, the control unit 100B stops the drive of the feeding motor 31. Thereby, the wire W is spirally wound around the reinforcing bars S. Note that, in a state where the second guide 52 is not moved to the second position and the output of the first output unit 12A is off, the control unit 100B does not perform the feeding of the wire W. Thereby, the wire W is not engaged to the engaging part 70 of the twisting unit 7, and occurrence of poor feeding is suppressed. That is, when the second guide 52 is located at the second position, the wire W can be guided to the engaging part 70 of the twisting unit 7.

After stopping the feeding of the wire W in the forward direction, the control unit 100B rotates the twisting motor 80 in the forward direction. The twisting motor 80 is rotated in the forward direction, so that the engaging part 70 is actuated by the actuation part 71 and the tip end-side of the wire W is held by the engaging part 70.

When it is determined that the twisting motor 80 is rotated until the wire W is held by the engaging part 70, the control unit 100B stops the rotation of the twisting motor 80, and rotates the feeding motor 31 in the reverse direction. When the twisting motor 80 is rotated until the wire W is held by the engaging part 70, the motion of the movable member 83 is transmitted to the regulation member 42 by the transmission mechanism 44, so that the regulation member 42 is moved to a position at which it is not contacted to the wire.

When the feeding motor 31 is rotated in the reverse direction, the feeding gears 30 are rotated in the reverse direction, so that the wire W is fed in the reverse direction denoted with the arrow R. By the operation of feeding the wire Win the reverse direction, the wire W is wound closely contacted to the reinforcing bars S.

When it is determined that the feeding motor 31 is rotated in the reverse direction until the wire W is wound on the reinforcing bars S, the control unit 100B stops the rotation of the feeding motor 31, and then rotates the twisting motor 80 in the forward direction. The twisting motor 80 is rotated in the forward direction, so that the movable blade part 61 is actuated via the transmission mechanism 62 by the movable member 83 and the wire W is thus cut.

After the wire W is cut, the twisting motor 80 is continuously rotated in the forward direction, thereby rotating the engaging part 70 to twist the wire W.

When it is determined that the twisting motor 80 is rotated in the forward direction until the wire W is twisted, the control unit 100B rotates the twisting motor 80 in the reverse direction. The twisting motor 80 is rotated in the reverse direction, so that the engaging part 70 is returned to the initial position and the held state of the wire W is thus released. Thereby, the wire W binding the reinforcing bars S can be pulled out from the engaging part 70.

When it is determined that the twisting motor 80 is rotated in the reverse direction until the engaging part 70 and the like are returned to the initial position, the control unit 100B stops the rotation of the twisting motor 80.

The operator moves the reinforcing bar binding machine 1B in a direction of pulling out the reinforcing bars S bound with the wire W from the insertion/pulling-out opening 53. When the force of pushing the contact parts 91A of the contact member 9A is not applied by the operation of moving the reinforcing bar binding machine 1B in the direction of pulling out the reinforcing bars S from the insertion/pulling-out opening 53, the second guide 52 is moved from the second position to the first position by the force of the urging member 54.

When the second guide 52 is moved to the first position, the contact member 9A is pushed in a direction in which the displacing part 93A gets away from the first guide 51B, and is moved to the standby position by the rotation about the shaft 90A as a support point, so that the contact parts 91A protrude from the cover part 11.

The operator's operation of moving the reinforcing bar binding machine 1B in the direction of pulling out the reinforcing bars S bound with the wire W from the Insertion/pulling-out opening 53 causes the second guide 52 to move to the first position, so that the interval between the end portion 52*c* of the second guide 52 and the end portion 51*c* of the first guide 51B increases. Thereby, the reinforcing bars S can be more easily pulled out from the insertion/pulling-out opening 53 and can be more easily moved to a next binding place.

Figure 26A:
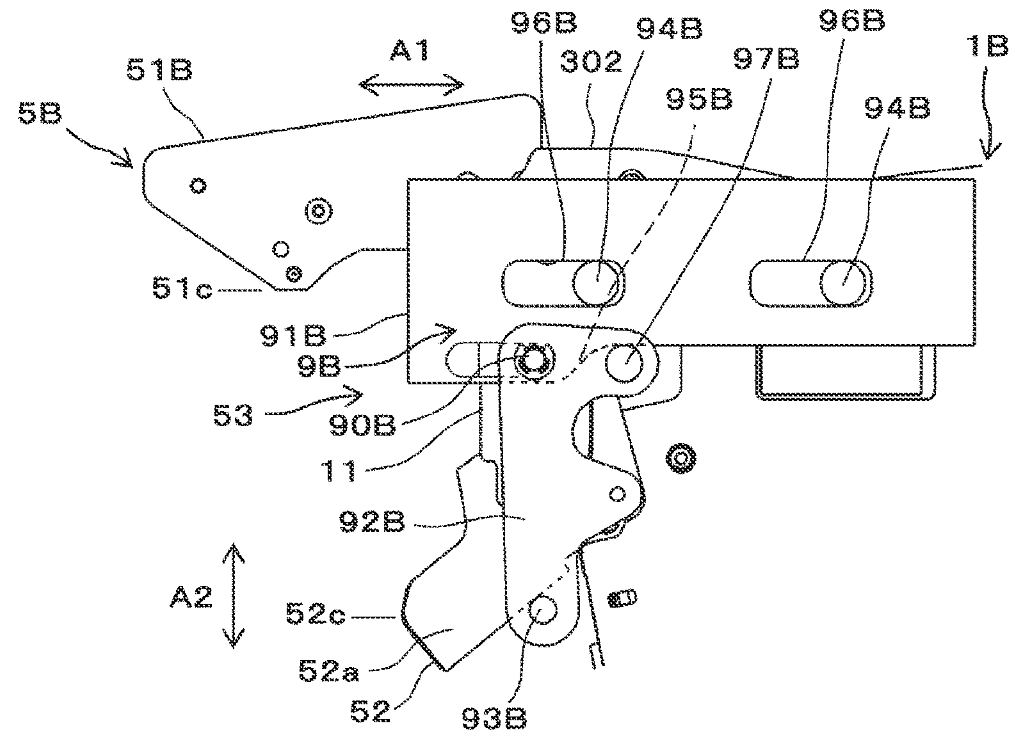
FIG. 26A is a side view depicting a modified embodiment of the guide moving part.
Figure 26B:
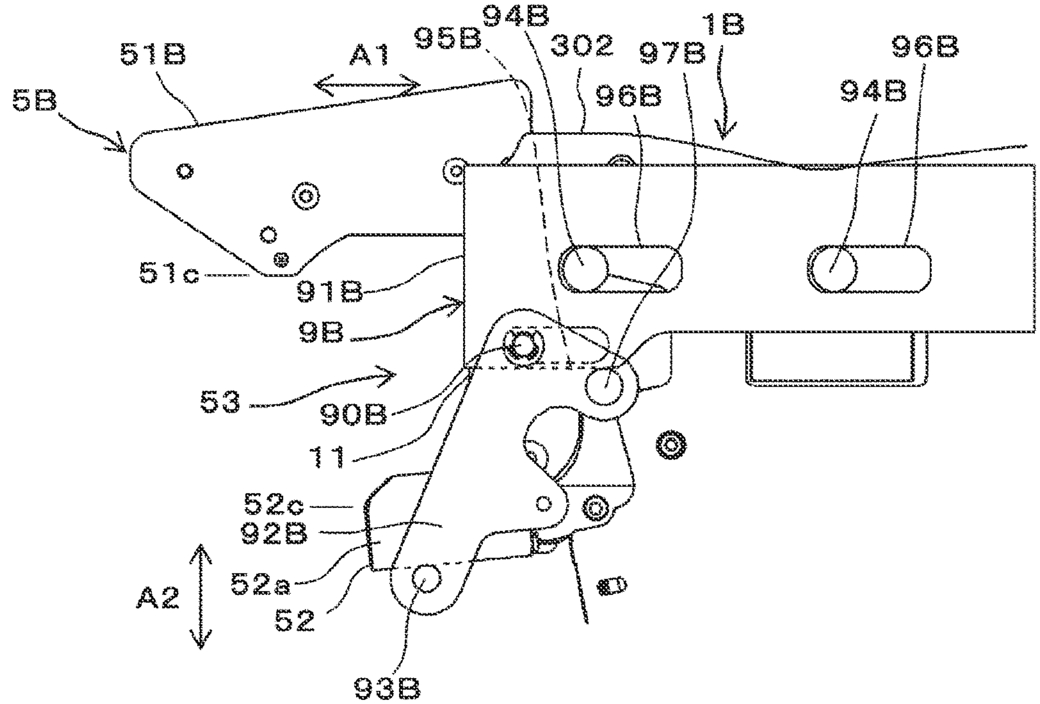
FIG. 26B is a side view depicting the modified embodiment of the guide moving part.

FIGS. 26A and 26B are side views depicting a modified embodiment of the guide moving part. In the guide moving part of the modified embodiment, a contact member 9B to which the reinforcing bars S are contacted, and a connecting part 92B connected to the second guide 52 are constituted by separate components, other than being integrally constituted. The contact member 9B is also configured to linearly move.

The contact member 9B is attached to a side part of the second body part 302 with being supported by a plurality of shafts 94B. The contact member 9B has a shape extending in the first direction denoted with the arrow A1, a tip end portion in the first direction is provided with contact parts 91B facing the insertion/pulling-out opening 53, and a part on one side in the second direction denoted with the arrow A2 is provided with an actuation part 95B for actuating the connecting part 92B. The actuation part 95B is constituted by a cam surface having an unevenness in the first direction.

The contact member 9B has long holes 96B in the first direction denoted with the arrow A1, and the shafts 94B are inserted in the long holes 96B. Thereby, the contact member 9B can be moved in the first direction denoted with the arrow A1 with respect to the second body part 302, and is configured to move between a standby position (FIG. 26A) at which the contact parts 91B protrude from the cover part 11 into the insertion/pulling-out opening 53 and an actuation position (FIG. 26B) at which the contact parts 91B come close to the cover part 11.

The contact member 9B is urged in a moving direction to the standby position by an urging member (not shown), and is held at the standby position.

The connecting part 92B is attached to the cover part 11 with being supported by a shaft 90B. The connecting part 92B is provided with an actuated part 97B, which can be sliding contacted to the actuation part 95B of the contact member 9B, on one side with the shaft 90B being interposed and is provided with a displacing part 93B, which is in contact with a part on an opposite side to a side of the second guide 52 facing the first guide 51B, on the other side with the shaft 90B being interposed.

In a state where the reinforcing bars S are not in contact with the contact parts 91B of the contact member 9B, the contact member 9B is urged in a direction, in which the contact parts 91B protrude from the cover part 11, by an urging member (not shown) separate from the urging member 54 for urging the second guide 52, thereby moving to the standby position shown in FIG. 26A. When the contact member 9B is moved to the standby position, the connecting part 92B can rotate about the shaft 90B as a support point in a direction in which the actuated part 97B is moved following an uneven shape of the actuation part 95B of the contact member 9B and the displacing part 93B gets away from the first guide 51B. Thereby, the second guide 52 is urged by the urging member 54 and is moved to the first position. The position of the second guide 52 is detected by the first output unit 12A described with reference to FIG. 7, and the output of the first output unit 12A becomes off in a state where the second guide 52 is moved to the first position.

When the reinforcing bars S are pressed against the contact parts 91B, the contact member 9B is moved to the actuation position along the first direction denoted with the arrow A1. When the contact member 9B is moved to the actuation position, the actuated part 97B of the connecting part 92B is moved following an uneven shape of the actuation part 95B of the contact member 9B, and the displacing part 93B is moved toward the first guide 51B by rotation of the connecting part 92B about the shaft 90B as a support point. Thereby, the displacing part 93B pushes the second guide 52, so that the second guide 52 is moved to the second position. In a state where the second guide 52 is moved to the second position, the output of the first output unit 12A becomes on. The position of the second guide 52 may also be detected by the first output unit 12B described with reference to FIGS. 12A and 12B. In this way, the contact of the reinforcing bars S to the contact parts 91B, and the movement of the displacing part 93B due to the contact of the reinforcing bars S to the contact parts 91B cause the second guide 52 to move from the first position to the second position.

Figure 25:
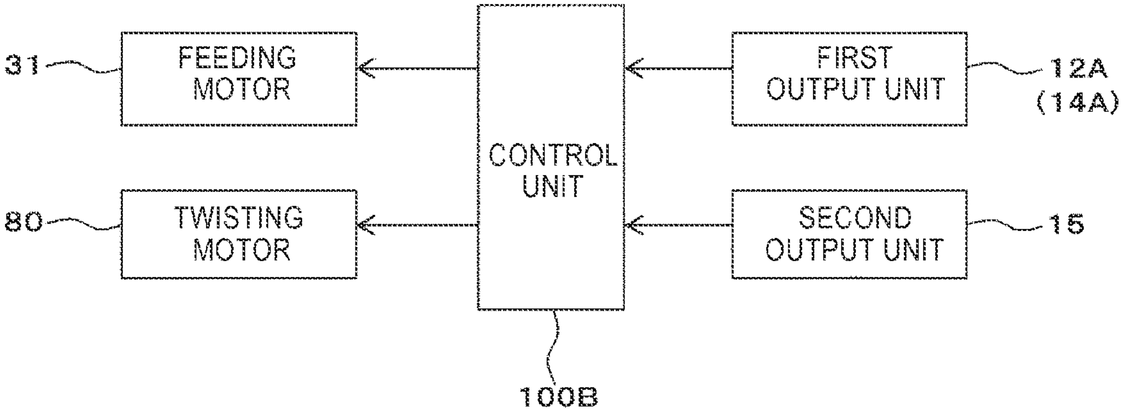
FIG. 25 is a functional block diagram of the reinforcing bar binding machine of the second embodiment.

When the contact member 9B is moved to the actuation position, so that the second guide 52 is moved the second position and it is detected that the output of the first output unit 12A becomes on, in a state where the operation part 304*t* is operated and it is thus detected that the output of the second output unit 15 becomes on, the control unit 100B shown in FIG. 25 controls the feeding motor 31 and the twisting motor 80 to execute a series of operations of binding the reinforcing bars S with the wire W, as described above. Alternatively, when the operation part 304*t* is operated and it is thus detected that the output of the second output unit 15 becomes on, in a state where the reinforcing bars S are pressed against the contact parts 91B of the contact member 9B and it is thus detected that the output of the first output unit 12A becomes on, the control unit 100B may control the feeding motor 31 and the twisting motor 80 to execute a series of operations of binding the reinforcing bars S with the wire W. Note that, the operation part 304*t* and the second output unit 15 may not be provided, and when the reinforcing bars S are pressed against the contact parts 91B of the contact member 9B and it is thus detected that the output of the first output unit 12A becomes on, the control unit may control the feeding motor 31 and the twisting motor 80 to execute the series of operations of binding the reinforcing bars S with the wire W.

The contact member 9B is provided with the long holes 96B in the first direction denoted with the arrow A1, and the shafts 94B are inserted in the long hole 96B, so that the contact member 9B linearly moves in the first direction. During the operation of inserting the reinforcing bars S into the insertion/pulling-out opening 53 between the first guide 51B and the second guide 52, the reinforcing bar binding machine 1B is moved in the first direction denoted with the arrow A1. Due to the relative movement of the reinforcing bar binding machine 1B and the reinforcing bars S, the contact parts 91B of the contact member 9B are pushed by the force along the first direction denoted with the arrow A1. Thereby, a moving direction of the contact member 9B becomes a direction along the direction of the force by which the reinforcing bars S push the contact parts 91B by the relative movement of the reinforcing bar binding machine 1B and the reinforcing bars S. In contrast, the contact member 9B and the connecting part 92B are constituted by separate components, so that the connecting part 92B can move the second guide 52 by rotation about the shaft 90B as a support point. Thereby, it is possible to optimize a moving direction of the contact member 9B that is pushed and actuated by the reinforcing bars S and a moving direction of the connecting part 92B for moving the second guide 52, respectively.

FIGS. 27A, 27B, 28A and 28B are side views depicting modified embodiments of the output unit configured to detect the contact member. In FIGS. 27A, 27B, 28A and 28B, when it is detected that the contact member is moved to the actuation position, it is determined that the second guide 52 is moved to the second position.

As described with reference to FIGS. 24A and 24B, FIGS. 27A and 27B depict a configuration where the second guide 52 is moved to the first position and the second position by the rotating operation about the shaft 52*b* as a support point and the second guide 52 is urged in the moving direction from the second position to the first position by the urging member (not shown) and is held at the first position. In this configuration, the first output unit 14A configured to detect that the contact member is moved to the actuation position is provided. Note that, in the present example, the contact member 9A is moved by the force of the urging member (not shown) for urging the second guide 52. However, another urging member for urging the contact member 9A may be provided.

Figure 27A:
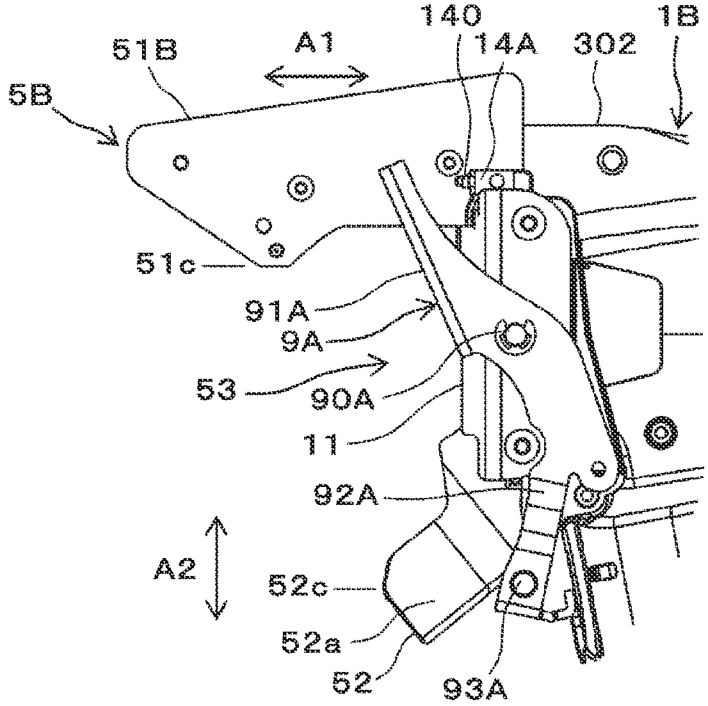
FIG. 27A is a side view depicting a modified embodiment of the output unit configured to detect the contact member.
Figure 27B:
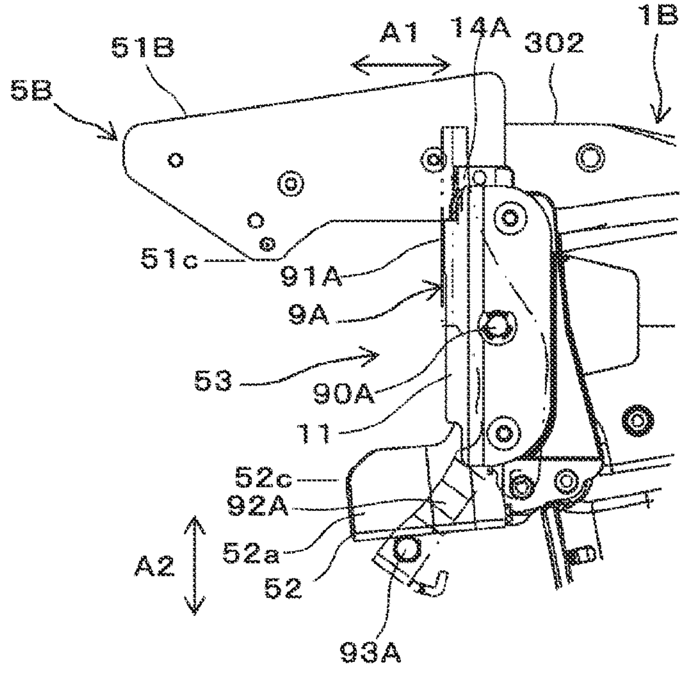
FIG. 27B is a side view depicting the modified embodiment of the output unit configured to detect the contact member.

The first output unit 14A may have a similar configuration to the first output unit 12A described with reference to FIG. 7. For example, an output thereof is changed by displacement of the movable element 140. In the present example, as shown in FIG. 27A, when the contact member 9A is moved to the standby position, the contact parts 91A of the contact member 9A are moved away from the movable element 140. In this way, in a state where the contact member 9A is moved to the standby position, the output of the first output unit 14A is set to an off state. In contrast, as shown in FIG. 27B, when the contact member 9A is moved to the actuation position, the contact parts 91A of the contact member 9A are moved in a direction of pushing the movable element 140. In this way, in a state where the contact member 9A is moved to the actuation position, the output of the first output unit 14A is set to an on state.

As shown in FIG. 27A, in the state where the second guide 52 is located at the first position, the contact member 9A is pushed in a direction in which the displacing part 93A gets away from the first guide 51, and is moved to the standby position by rotation about the shaft 90A as a support point. In the state where the contact member 9A is moved to the standby position, the output of the first output unit 14A becomes off.

When the contact parts 91A are pressed against the reinforcing bars S, the contact parts 91A are moved in the first direction denoted with the arrow A1, so that the contact member 9A rotates about the shaft 90A as a support point and moves to the actuation position, as shown in FIG. 27B. In the state where the contact member 9A is moved to the standby position, the output of the first output unit 14A becomes on. In addition, when the contact member 9A is moved to the actuation position, the displacing part 93A is moved toward the first guide 51B by rotation of the connecting part 92A about the shaft 90A as a support point. Thereby, the displacing part 93A pushes the second guide 52, so that the second guide 52 is moved to the second position. Therefore, it is detected that the contact member 9A is moved to the actuation position, so that it can be determined that the second guide 52 is moved to the second position. In this way, the contact of the reinforcing bars S to the contact parts 91A and the movement of the displacing part 93A due to the contact of the reinforcing bars S to the contact parts 91A cause the second guide 52 to move from the first position to the second position.

When the contact member 9A is moved to the actuation position and it is thus detected that the output of the first output unit 14A becomes on, in a state where the operation part 304*t* is operated and it is thus detected that the output of the second output unit 15 becomes on, the control unit 100B shown in FIG. 25 controls the feeding motor 31 and the twisting motor 80 to execute the series of operations of binding the reinforcing bars S with the wire W, as described above. Alternatively, when the operation part 304*t* is operated and it is thus detected that the output of the second output unit 15 becomes on, in a state where the reinforcing bars S are pressed against the contact parts 91A of the contact member 9A and it is thus detected that the output of the first output unit 14A becomes on, the control unit 100B may control the feeding motor 31 and the twisting motor 80 to execute the series of operations of binding the reinforcing bars S with the wire W. Note that, the operation part 304*t* and the second output unit 15 may not be provided, and when the reinforcing bars S are pressed against the contact parts 91A of the contact member 9A and it is thus detected that the output of the first output unit 14A becomes on, the control unit may control the feeding motor 31 and the twisting motor 80 to execute the series of operations of binding the reinforcing bars S with the wire W.

As described with reference to FIGS. 26A and 26B, FIGS. 28A and 28B depict a configuration where the contact member 9B to which the reinforcing bars S are contacted and the connecting part 92B connected to the second guide 52 are constituted by separate components other than being integrally constituted, and the contact member 9B linearly moves. In this configurations, the first output unit 14A configured to detect that the contact member 9B is moved to the actuation position is provided.

Figure 28A:
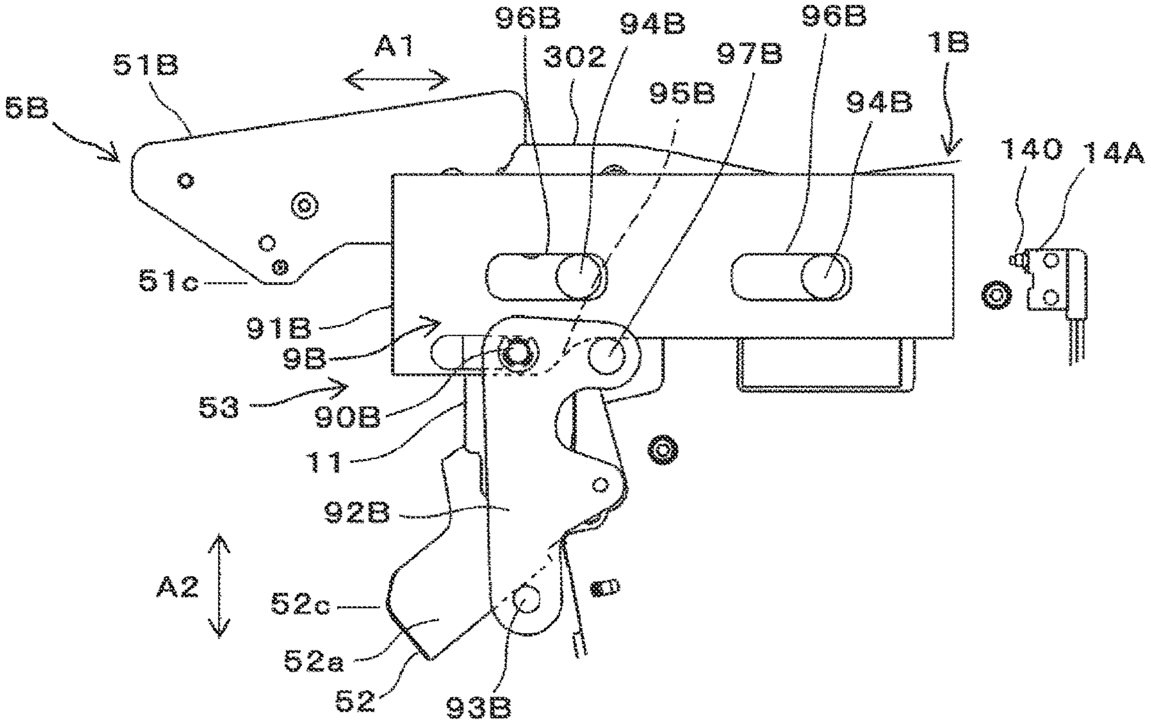
FIG. 28A is a side view depicting a modified embodiment of the output unit configured to detect the contact member.
Figure 28B:
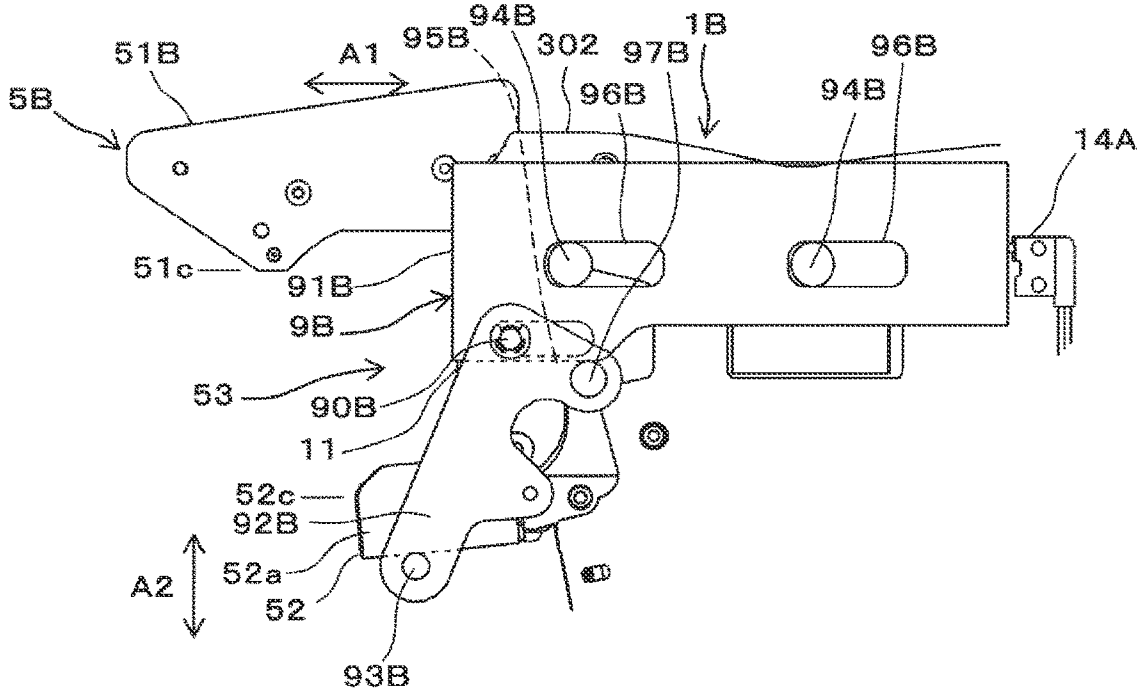
FIG. 28B is a side view depicting the modified embodiment of the output unit configured to detect the contact member.

As shown in FIG. 28A, when the contact member 9B is moved to the standby position, the contact member 9B is moved away from the movable element 140 of the first output unit 14A. In this way, in a state where the contact member 9B is moved to the standby position, the output of the first output unit 14A is set to an off state. In contrast, as shown in FIG. 28B, when the contact member 9B is moved to the actuation position, the contact member 9B is moved in a direction of pushing the movable element 140. In this way, in a state where the contact member 9B is moved to the actuation position, the output of the first output unit 14A is set to an on state.

In a state where the reinforcing bars S are not contacted to the contact parts 91B of the contact member 9B, the contact member 9B is urged in a direction, in which the contact parts 91B protrude from the cover part 11, by the urging member (not shown) and is thus moved to the standby position shown in FIG. 28A. In a state where the contact member 9B is moved to the standby position, the output of the first output unit 14A becomes off. In addition, when the contact member 9B is moved to the standby position, the connecting part 92B can rotate about the shaft 90B as a support point in a direction in which the actuated part 97B is moved following an uneven shape of the actuation part 95B of the contact member 9B and the displacing part 93B gets away from the first guide 51. Thereby, the second guide 52 is urged by another urging member (not shown) and is moved to the first position.

When the reinforcing bars S are pressed against the contact parts 91B, the contact member 9B is moved to the actuation position along the first direction denoted with the arrow A1, as shown in FIG. 28B. In a state where the contact member 9B is moved to the actuation position, the output of the first output unit 14A becomes on. In addition, when the contact member 9B is moved to the actuation position, the actuated part 97B of the connecting part 92B is moved following an uneven shape of the actuation part 95B of the contact member 9B, and the displacing part 93B is moved toward the first guide 51B by rotation of the connecting part 92B about the shaft 90B as a support point. Thereby, the displacing part 93B pushes the second guide 52, so that the second guide 52 is moved to the second position. Therefore, it is detected that the contact member 9B is moved to the actuation position, so that it can be determined that the second guide 52 is moved to the second position. In this way, the contact of the reinforcing bars S to the contact parts 91B and the movement of the displacing part 93B due to the contact of the reinforcing bars S to the contact parts 91B cause the second guide 52 to move from the first position to the second position.

When the contact member 9A is moved to the actuation position and it is thus detected that the output of the first output unit 14A becomes on, in a state where the operation part 304*t* is operated and it is thus detected that the output of the second output unit 15 becomes on, the control unit 100B shown in FIG. 25 controls the feeding motor 31 and the twisting motor 80 to execute the series of operations of binding the reinforcing bars S with the wire W, as described above. Alternatively, when the operation part 304*t* is operated and it is thus detected that the output of the second output unit 15 becomes on, in a state where the reinforcing bars S are pressed against the contact parts 91B of the contact member 9B and it is thus detected that the output of the first output unit 14A becomes on, the control unit 100B may control the feeding motor 31 and the twisting motor 80 to execute the series of operations of binding the reinforcing bars S with the wire W. Note that, the operation part 304*t* and the second output unit 15 may not be provided, and when the reinforcing bars S are pressed against the contact parts 91B of the contact member 9B and it is thus detected that the output of the first output unit 14A becomes on, the control unit may control the feeding motor 31 and the twisting motor 80 to execute the series of operations of binding the reinforcing bars S with the wire W.

Example of Reinforcing Bar Binding Machine of Third Embodiment

Figure 29:
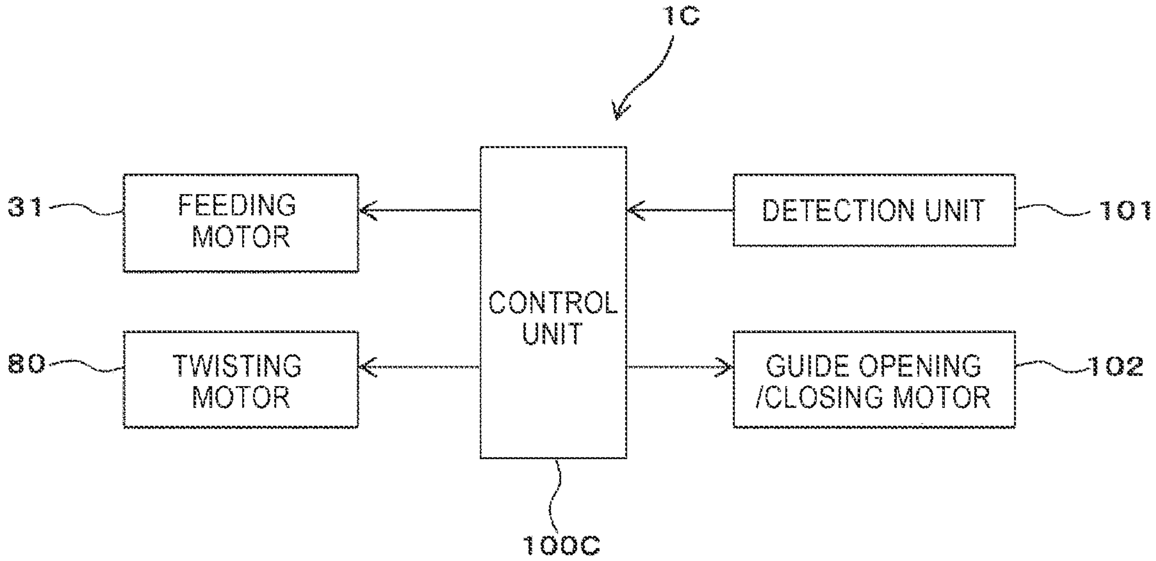
FIG. 29 is a functional block diagram of a reinforcing bar binding machine of a third embodiment.

FIG. 29 is a functional block diagram of a reinforcing bar binding machine of a third embodiment. A reinforcing bar binding machine 1C includes a detection unit 101 configured to detect reinforcing bars S. The detection unit 101 is constituted by a contact sensor such as a piezoelectric element, a non-contact sensor such as an image sensor, or the like, and is configured to detect that the reinforcing bars S are inserted in the insertion/pulling-out opening 53 between the first guide 51 or the first guide 51B and the second guide 52 shown in FIG. 1 and the like.

When it is detected from an output of the detection unit 101 that the reinforcing bars S are inserted in the insertion/pulling-out opening 53, a control unit 100C controls a guide opening/closing motor 102 to move the second guide 52 from the first position to the second position.

Note that, when it is detected that the second guide 52 is moved to the second position, the control unit 100C controls the feeding motor 31 configured to drive the feeding gears 30 and the twisting motor 80 configured to drive the twisting unit 7 and the like to execute the series of operations of binding the reinforcing bars S with the wire W.

Example of Reinforcing Bar Binding Machine of Fourth Embodiment

FIGS. 30A, 30B, 31A, 31B, 32A and 32B are side views depicting main parts of a reinforcing bar binding machine of a fourth embodiment.

A reinforcing bar binding machine of the fourth embodiment has a configuration where the contact member and the second guide are not operated in association with each other. A reinforcing bar binding machine 1D shown in FIGS. 30A and 30B includes a guide part 5 configured to guide a wire. The guide part 5 has a first guide 51 and a second guide 52. The first guide 51 and the second guide 52 are attached to an end portion on a front side of a body part 10, and extend in a first direction denoted with the arrow A1. The second guide 52 is provided facing the first guide 51 in a second direction orthogonal to the first direction and denoted with the arrow A2. The second guide 52 may be configured to move toward and away from the first guide 51 by rotation about a shaft (not shown) as a support point.

The reinforcing bar binding machine 1D includes a contact member 9D to which the reinforcing bars S inserted in the insertion/pulling-out opening 53 between the first guide 51 and the second guide 52 are contacted. The contact member 9D is rotatably supported by a shaft 90D and is attached to the body part 10 via the cover part 11. The contact member 9D is provided with contact parts 91D provided on one side with respect to the shaft 90D and to be contacted to the reinforcing bars S. The contact parts 91D of the contact member 9D extend from the shaft 90D toward the first guide 51 along the second direction denoted with the arrow A2.

The contact member 9D has the shaft 90D provided adjacent to a center between the first guide 51 and the second guide 52. The contact member 9D also has a pair of contact parts 91D provided between the first guide 51 and the second guide 52 from the vicinity of a part supported by the shaft 90D toward the first guide 51-side. The contact parts 91D are provided on both sides in the third direction with an interval through which the wire W binding the reinforcing bars S can pass. The contact parts 91D extend to both left and right sides of the first guide 51.

The contact member 9D is configured to rotate about the shaft 90D as a support point with respect to the body part 10, thereby moving between a standby position (FIG. 30A) at which the contact parts 91D protrude from the cover part 11 into the insertion/pulling-out opening 53 and an actuation position (FIG. 30B) at which the contact parts 91D come close to the cover part 11. The contact member 9D is urged in a moving direction to the standby position by an urging member (not shown) and is held at the standby position.

When the two intersecting reinforcing bars S are inserted into the insertion/pulling-out opening 53, one reinforcing bar S is located at one side part of the first guide 51 and the other reinforcing bar S is located at the other side part of the first guide 51. In a configuration where a pair of contact parts of a contact member is provided between the first guide and the second guide but does not extend to both left and right sides of the first guide, an area of the contact parts in which the reinforcing bars can be contacted is reduced, so that it may be difficult to cause the reinforcing bars to securely contact the contact parts.

In contrast, the pair of contact parts 91D of the contact member 9D extends from between the first guide 51 and the second guide 52 toward both left and right sides of the first guide 51. Thereby, the reinforcing bars S inserted in the insertion/pulling-out opening 53 are securely contacted to the contact parts 91D, so that the contact member 9D can be moved to the actuation position. In addition, the contact parts 91D of the contact member 9D are moved in the first direction denoted with the arrow A1 by the rotating operation about the shaft 90D as a support point. Thereby, the contact parts 91D can be pushed by the operation of moving the reinforcing bar binding machine 1D in the direction of inserting the reinforcing bars S into the insertion/pulling-out opening 53, and it is not necessary to move the reinforcing bar binding machine 1D in another direction so as to actuate the contact member 9A.

Figure 30A:
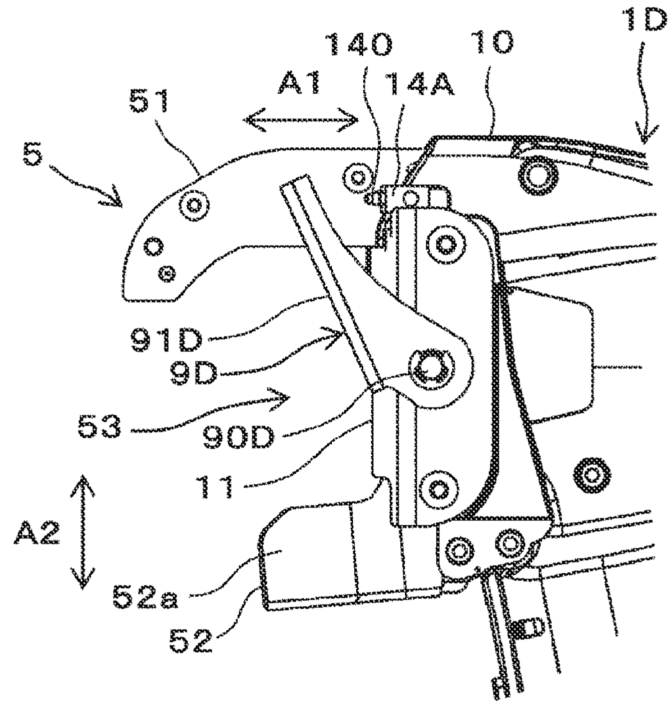
FIG. 30A is a side view depicting main parts of a reinforcing bar binding machine of a fourth embodiment.
Figure 30B:
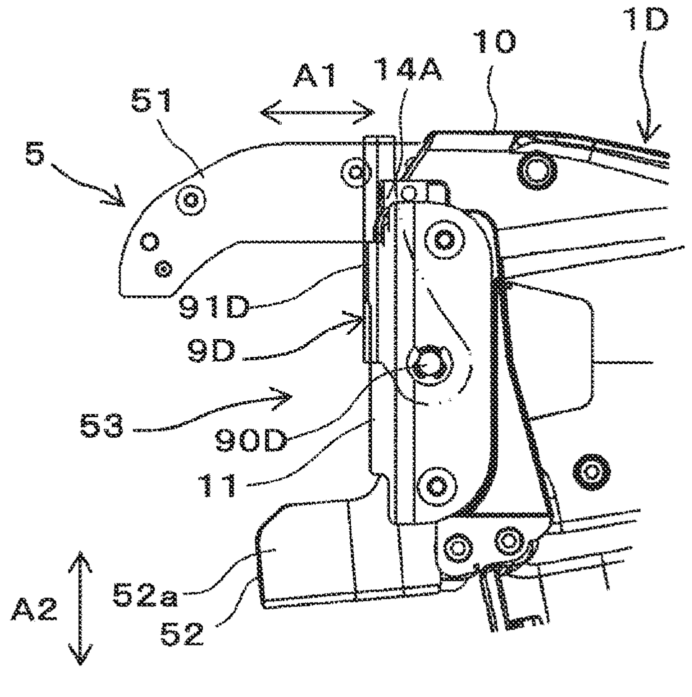
FIG. 30B is a side view depicting the main parts of the reinforcing bar binding machine of the fourth embodiment.

The reinforcing bar binding machine 1D includes a first output unit 14A configured to detect that the contact member 9D is moved to the actuation position. For example, the first output unit 14A is configured so that an output is changed by displacement of the movable element 140. In the present example, as shown in FIG. 30A, when the contact member 9D is moved to the standby position, the contact parts 91D of the contact member 9D are moved away from the movable element 140. In this way, in a state where the contact member 9D is moved to the standby position, the output of the first output unit 14A is set to an off state. In contrast, when the contact parts 91D are pressed against the reinforcing bars and the contact member 9D is thus moved to the actuation position, as shown in FIG. 30B, the contact parts 91D of the contact member 9D are moved in a direction of pushing the movable element 140. In this way, in a state where the contact member 9D is moved to the actuation position, the output of the first output unit 14A is set to an on state.

When the trigger 10*t* is operated and it is thus detected that the output of the second output unit 13 becomes on, in a state where the contact member 9D is moved to the actuation position and it is thus detected that the output of the first output unit 14A becomes on, the control unit 100A shown in FIG. 8 controls the feeding motor 31 and the twisting motor 80 to execute a series of operations of binding the reinforcing bars S with the wire W, as described above. Alternatively, when the reinforcing bars S are pressed against the contact parts 91D of the contact member 9D and it is thus detected that the output of the first output unit 14A becomes on, in a state where the operator operates the trigger 10*t* and thus the output of the second output unit 13 becomes on, the control unit 100A may control the feeding motor 31 and the twisting motor 80 to execute a series of operations of binding the reinforcing bars S with the wire W.

Figure 31A:
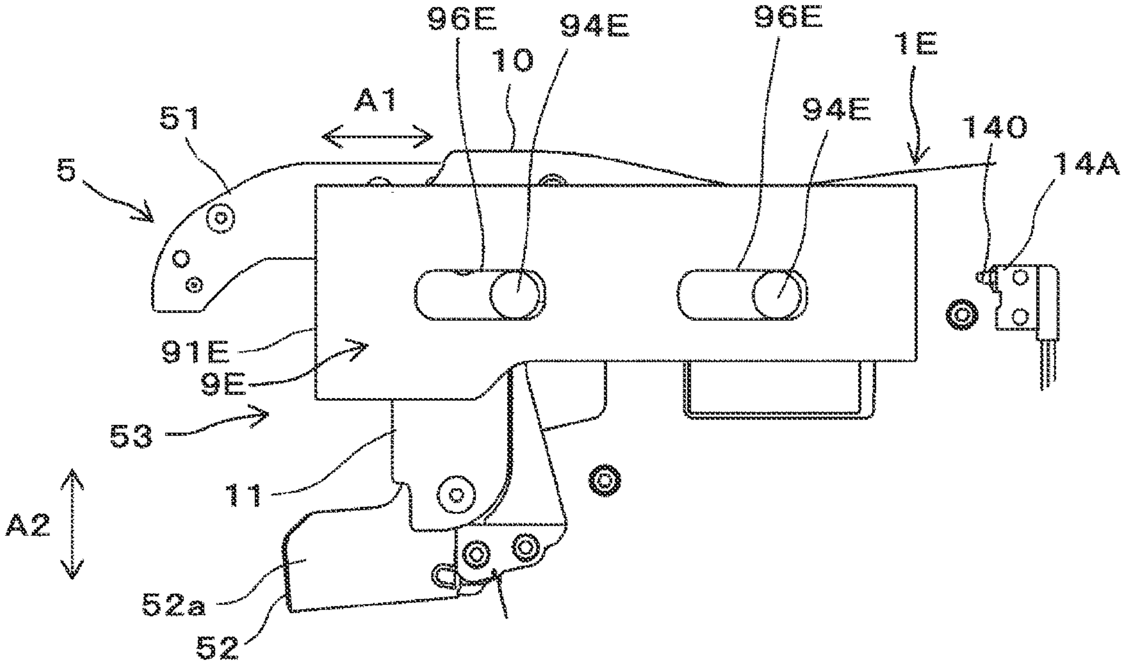
FIG. 31A is a side view depicting main parts of a reinforcing bar binding machine of the fourth embodiment.
Figure 31B:
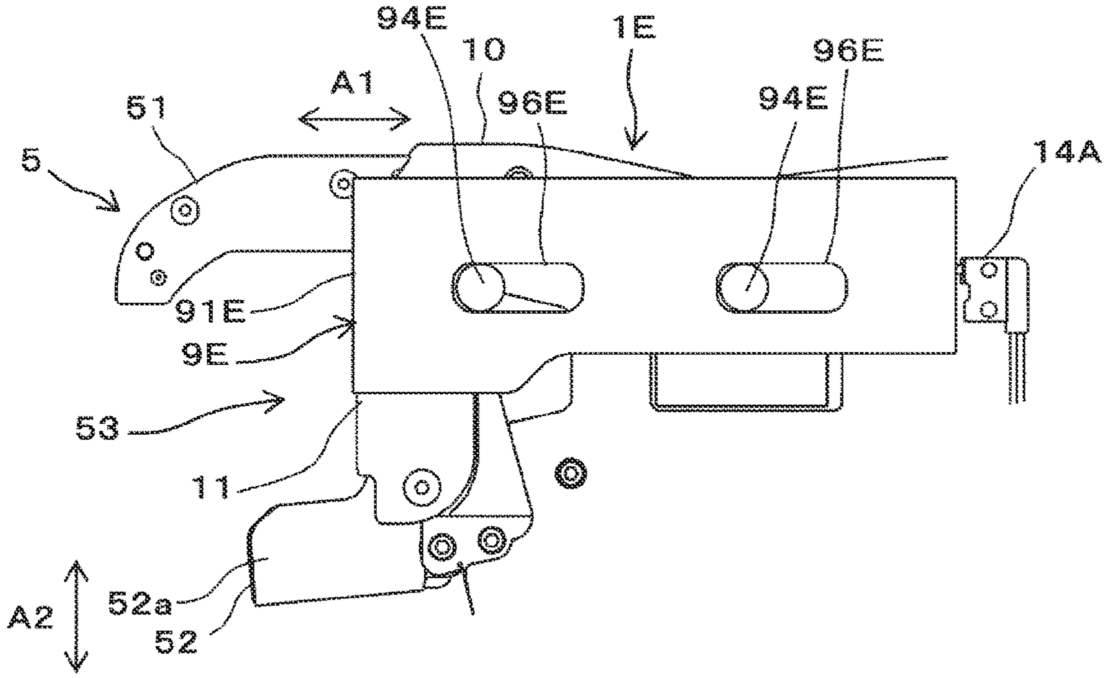
FIG. 31B is a side view depicting the main parts of the reinforcing bar binding machine of the fourth embodiment.

A reinforcing bar binding machine 1E shown in FIGS. 31A and 31B includes a guide part 5 configured to guide a wire. The guide part 5 has a first guide 51 and a second guide 52. The first guide 51 and the second guide 52 are attached to an end portion on a front side of a body part 10, and extend in a first direction denoted with the arrow A1. The second guide 52 is provided facing the first guide 51 in a second direction orthogonal to the first direction and denoted with the arrow A2. The second guide 52 may be configured to move toward and away from the first guide 51 by rotation about a shaft (not shown) as a support point.

The reinforcing bar binding machine 1E includes a contact member 9E to which the reinforcing bars S are contacted. The contact member 9E is supported by a plurality of shafts 90E and is attached to a side part of the body part 10. The contact member 9E has a shape extending in the first direction denoted with the arrow A1, and a tip end portion in the first direction is provided with contact parts 91E facing the insertion/pulling-out opening 53.

The contact member 9E has long holes 96E in the first direction denoted with the arrow A1, and shafts 94E are inserted in the long holes 96E. Thereby, the contact member 9E can be moved in the first direction denoted with the arrow A1 with respect to the body part 10, and is configured to move between a standby position (FIG. 31A) at which the contact parts 91E protrude from the cover part 11 into the insertion/pulling-out opening 53 and an actuation position (FIG. 31B) at which the contact parts 91E come close to the cover part 11.

The contact member 9E is urged in a moving direction to the standby position by an urging member (not shown), and is held at the standby position.

The reinforcing bar binding machine 1E includes a first output unit 14A configured to detect that the contact member 9E is moved to the actuation position. As shown in FIG. 31A, when the contact member 9E is moved to the standby position, the contact member 9E is moved away from the movable element 140 of the first output unit 14A. In this way, in a state where the contact member 9E is moved to the standby position, the output of the first output unit 14A is set to an off state. In contrast, when the contact parts 91E are pressed against the reinforcing bars and the contact member 9E is thus moved to the actuation position, as shown in FIG. 31B, the contact member 9E is are moved in a direction of pushing the movable element 140. In this way, in a state where the contact member 9E is moved to the actuation position, the output of the first output unit 14A is set to an on state.

When the trigger 10*t* is operated and it is thus detected that the output of the second output unit 13 becomes on, in a state where the contact member 9E is moved to the actuation position and it is thus detected that the output of the first output unit 14A becomes on, the control unit 100A shown in FIG. 8 controls the feeding motor 31 and the twisting motor 80 to execute a series of operations of binding the reinforcing bars S with the wire W, as described above. Alternatively, when the reinforcing bars S are pressed against the contact parts 91E of the contact member 9E and it is thus detected that the output of the first output unit 14A becomes on, in a state where the operator operates the trigger 10*t* and thus the output of the second output unit 13 becomes on, the control unit 100A may control the feeding motor 31 and the twisting motor 80 to execute a series of operations of binding the reinforcing bars S with the wire W.

Figure 32A:
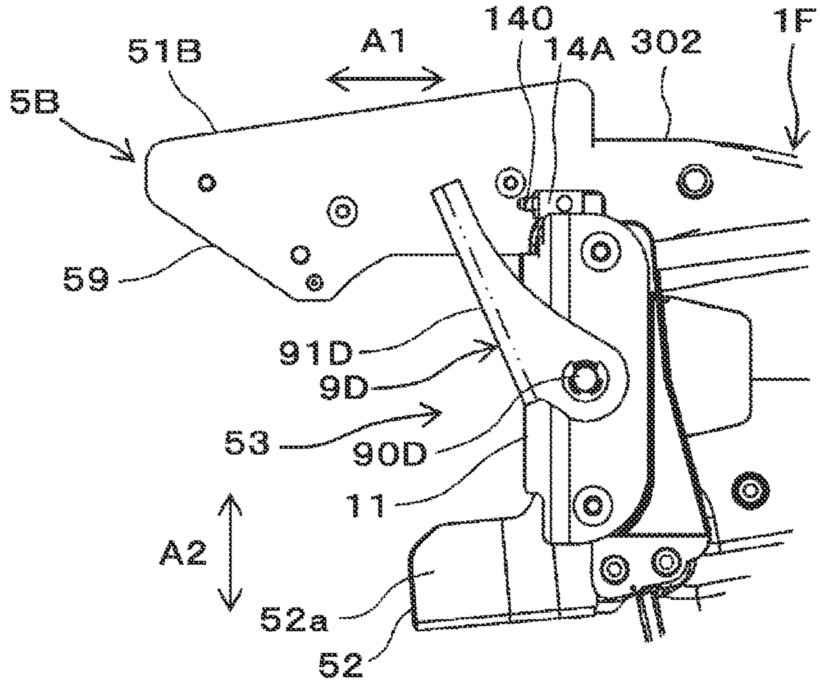
FIG. 32A is a side view depicting main parts of a reinforcing bar binding machine of the fourth embodiment.
Figure 32B:
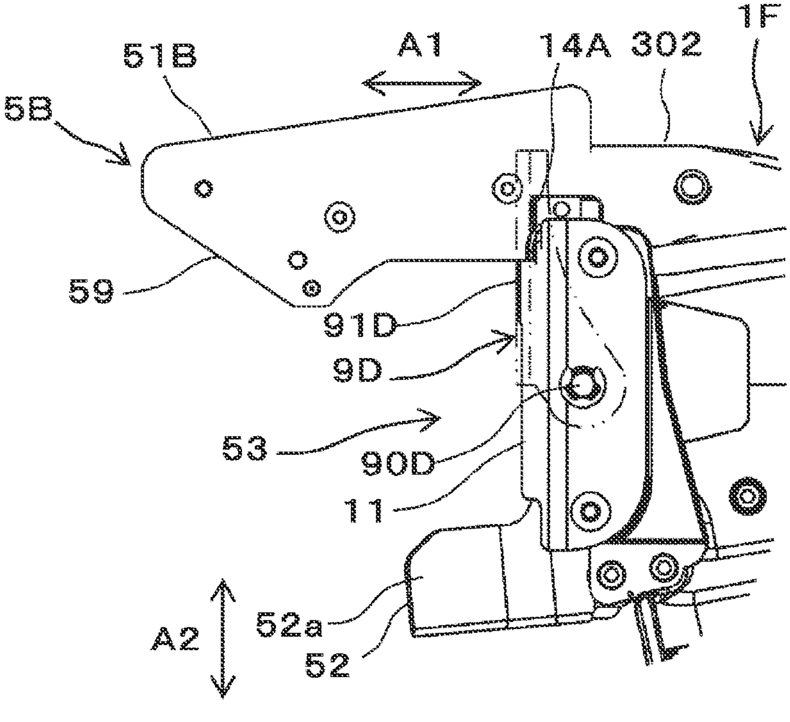
FIG. 32B is a side view depicting the main parts of the reinforcing bar binding machine of the fourth embodiment.

A reinforcing bar binding machine 1F shown in FIGS. 32A and 32B is applied to the reinforcing bar binding machine where the first body part 301 and the second body part 302 are connected by the elongated connecting part 303, as described with reference to FIG. 16 and the like. The reinforcing bar binding machine 1F includes a guide part 5B configured to guide a wire. The guide part 5B has a first guide 51B and a second guide 52. The first guide 51B and the second guide 52 are attached to an end portion on a front side of the second body part 302, and extend in a first direction denoted with the arrow A1. The second guide 52 is provided facing the first guide 51B in a second direction orthogonal to the first direction and denoted with the arrow A2. The second guide 52 may be configured to move toward and away from the first guide 51B by rotation about a shaft (not shown) as a support point.

The guide part 5B has an induction part 59 configured to guide the reinforcing bars to the insertion/pulling-out opening 53. The induction part 59 is provided on a tip end-side of the first guide 51B.

The reinforcing bar binding machine 1F includes a contact member 9D to which the reinforcing bars S inserted in the insertion/pulling-out opening 53 between the first guide 51B and the second guide 52 are contacted. The contact member 9D is rotatably supported by a shaft 90D and is attached to the second body part 302 via the cover part 11. The contact member 9D is provided with contact parts 91D provided on one side with respect to the shaft 90D and to be contacted to the reinforcing bars S. The contact parts 91D of the contact member 9D extend from the shaft 90D toward the first guide 51B along the second direction denoted with the arrow A2.

The contact member 9D has the shaft 90D provided adjacent to a center between the first guide 51B and the second guide 52. The contact member 9D also has a pair of contact parts 91D provided between the first guide 51B and the second guide 52 from the vicinity of a part supported by the shaft 90D toward the first guide 51B-side. The contact parts 91D are provided on both sides in the third direction with an interval through which the wire W binding the reinforcing bars S can pass. The contact parts 91D extend to both left and right sides of the first guide 51B.

The contact member 9D is configured to rotate about the shaft 90D as a support point with respect to the second body part 302, thereby moving between a standby position (FIG. 32A) at which the contact parts 91D protrude from the cover part 11 into the insertion/pulling-out opening 53 and an actuation position (FIG. 32B) at which the contact parts 91D come close to the cover part 11. The contact member 9D is urged in a moving direction to the standby position by an urging member (not shown) and is held at the standby position.

When the two intersecting reinforcing bars S are inserted into the insertion/pulling-out opening 53, one reinforcing bar S is located at one side part of the first guide 51B and the other reinforcing bar S is located at the other side part of the first guide 51B. In contrast, the pair of contact parts 91D of the contact member 9D extends from between the first guide 51B and the second guide 52 toward both left and right sides of the first guide 51B. Thereby, the reinforcing bars S inserted in the insertion/pulling-out opening 53 are securely contacted to the contact parts 91D, so that the contact member 9D can be moved to the actuation position. In addition, the contact parts 91D of the contact member 9D are moved in the first direction denoted with the arrow A1 by the rotating operation about the shaft 90D as a support point. Thereby, the contact parts 91D can be pushed by the operation of moving the reinforcing bar binding machine 1F in the direction of inserting the reinforcing bars S into the insertion/pulling-out opening 53, and it is not necessary to move the reinforcing bar binding machine 1F in another direction so as to actuate the contact member 9A.

The reinforcing bar binding machine 1F includes a first output unit 14A configured to detect that the contact member 9D is moved to the actuation position. As shown in FIG. 32A, when the contact member 9D is moved to the standby position, the contact parts 91D of the contact member 9D are moved away from the movable element 140. In this way, in a state where the contact member 9D is moved to the standby position, the output of the first output unit 14A is set to an off state. In contrast, when the contact parts 91D are pressed against the reinforcing bars and the contact member 9D is thus moved to the actuation position, as shown in FIG. 32B, the contact parts 91D of the contact member 9D are moved in a direction of pushing the movable element 140. In this way, in a state where the contact member 9D is moved to the actuation position, the output of the first output unit 14A is set to an on state.

When the contact member 9D is moved to the actuation position and it is thus detected that the output of the first output unit 14A becomes on, in a state where the operation part 304*t* is operated and it is thus detected that the output of the second output unit 15 becomes on, the control unit 100B shown in FIG. 25 controls the feeding motor 31 and the twisting motor 80 to execute a series of operations of binding the reinforcing bars S with the wire W, as described above. Alternatively, when the grip part 304R is grasped to actuate the operation part 304*t* by the operator and thus the output of the second output unit 15 becomes on, in a state where the reinforcing bars S are pressed against the contact parts 91D of the contact member 9D and it is thus detected that the output of the first output unit 14A becomes on, the control unit 100B may control the feeding motor 31 and the twisting motor 80 to execute a series of operations of binding the reinforcing bars S with the wire W. Note that, the operation part 304*t* and the second output unit 15 may not be provided, and when the reinforcing bars S are pressed against the contact parts 91D of the contact member 9D and it is thus detected that the output of the first output unit 14A becomes on, the control unit may control the feeding motor 31 and the twisting motor 80 to execute the series of operations of binding the reinforcing bars S with the wire W.

The subject application is based on Japanese Patent Application No. 2018-168247 filed on Sep. 7, 2018, the contents of which are incorporated herein by reference.

REFERENCE SIGNS LIST

1A, 1B, 1C . . . reinforcing bar binding machine, 10 . . . body part, 10*h* . . . handle part, 10*t* . . . trigger, 11 . . . cover part, 12A, 12B, 14A . . . first output unit, 120, 140 . . . movable element, 13, 15 . . . second output unit, 2 . . . accommodation part, 20 . . . wire reel, 3 . . . feeding unit, 30 . . . feeding gear, 31 . . . feeding motor, 4 . . . regulation part, 42 . . . regulation member, 43 . . . regulation member, 44 . . . transmission mechanism, 5, 5B . . . guide part, 51, 51B . . . first guide, 51*g* . . . guide surface, 51*h* . . . groove portion, 51*c* . . . end portion, 52 . . . second guide, 52*a* . . . side guide, 52*b* . . . shaft, 52*c* . . . end portion, 53 . . . insertion/pulling-out opening, 54 . . . urging member, 55 . . . long hole, 56 . . . shaft, 57 . . . displaced part, 58 . . . detection element, 59 . . . induction part, 6 . . . cutting unit, 60 . . . fixed blade part, 60*a* . . . opening, 61 . . . movable blade part, 62 . . . transmission mechanism, 7 . . . twisting unit, 70 . . . engaging part, 71 . . . actuation part, 8 . . . drive unit, 80 . . . twisting motor, 81 . . . decelerator, 82 . . . rotary shaft, 83 . . . movable member, 9A, 9B, 9C . . . contact member (guide moving part), 90A, 90B, 90C . . . shaft 91A, 91B, 91C . . . contact part, 92A, 92B, 92C . . . connecting part, 93A, 93B, 93C . . . displacing part, 94B . . . shaft, 95B . . . actuation part, 96B . . . long hole, 97B . . . actuated part, 100A, 100B, 100C . . . control unit, 101 . . . detection unit, 102 . . . guide opening/closing motor, 301 . . . first body part, 302 . . . second body part, 303 . . . connecting part, 304*h* . . . handle part, 304L, 304R . . . grip part, 304*t* . . . operation part, W . . . wire

The invention claimed is:

1. A binding machine comprising:

a body part;

a feeding unit configured to feed a wire, the feeding unit including a feeding gear;

a first guide and a second guide extending in a first direction from an end portion on one side of the body part, arranged with an interval, in which a binding object is inserted, in a second direction orthogonal to the first direction, and configured to guide the wire fed by the feeding unit;

a twisting unit configured to twist the wire guided by the first guide and the second guide, the twisting unit including a twisting motor, and a guide moving part configured to change the interval from a first distance to a second distance shorter than the first distance, the guide moving part being rotatably supported by a shaft, wherein the second guide is supported to be movable toward and away from the first guide, and wherein a binding operation is executed in response to detecting that the second guide is moved to a position where the interval is the second distance.

2. The binding machine according to claim 1, wherein the twisting unit has an engaging part to which the wire is engaged, and wherein when the interval becomes the second distance, the wire fed by the feeding unit is guided to the engaging part by the first guide and the second guide.

3. The binding machine according to claim 1, further comprising a regulation part configured to define a feeding path of the wire by curling the wire fed by the feeding unit so as to follow around the binding object inserted between the first guide and the second guide, the regulation part having an outer peripheral surface which is in contact with the wire fed by the feeding unit, wherein when the interval becomes the second distance, the first guide and the second guide are positioned on the feeding path of the wire defined by the regulation part.

4. The binding machine according to claim 1, wherein the first guide is supported to be movable toward and away from the second guide.

5. The binding machine according to claim 3, wherein the regulation part is provided to the first guide.

6. The binding machine according to claim 1, wherein the guide moving part has a contact part to which the binding object inserted between the first guide and the second guide is contacted, and wherein when the binding object contacts the contact part, the guide moving part changes the interval from the first distance to the second distance.

7. The binding machine according to claim 1, wherein the guide moving part is configured to be in contact with the binding object and includes a displacing part configured to move as the binding object contacts the guide moving part, and wherein the displacing part is moved, so that the guide moving part changes the interval from the first distance to the second distance.

8. The binding machine according to claim 6, wherein the guide moving part is configured to rotate as the contact part moves in the first direction.

9. The binding machine according to claim 6, wherein the guide moving part is configured to linearly move as the contact part moves in the first direction.

10. The binding machine according to claim 6, wherein the contact part is provided on each of both sides of a virtual plane comprising a feeding path of the wire.

11. The binding machine according to claim 10, wherein the contact part is provided on each of both sides of the first guide or the second guide in a third direction.

12. The binding machine according to claim 1, further comprising:

a detection sensor configured to detect the binding object inserted between the first guide and the second guide, wherein the interval is changed from the first distance to the second distance when the detection sensor detects the binding object.

* * * * *